(12) United States Patent
Ogawa

(10) Patent No.: US 7,248,953 B2
(45) Date of Patent: Jul. 24, 2007

(54) WHEEL-STATE OBTAINING APPARATUS, AND VEHICLE-STATE OBTAINING APPARATUS

(75) Inventor: Atsushi Ogawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 53 days.

(21) Appl. No.: 10/523,830

(22) PCT Filed: Jul. 23, 2003

(86) PCT No.: PCT/JP03/09360

§ 371 (c)(1),
(2), (4) Date: Feb. 8, 2005

(87) PCT Pub. No.: WO2004/016455

PCT Pub. Date: Feb. 26, 2004

(65) Prior Publication Data

US 2005/0235744 A1    Oct. 27, 2005

(30) Foreign Application Priority Data

Aug. 14, 2002   (JP) .............................. 2002-236257

(51) Int. Cl.
*B60C 23/04*   (2006.01)
(52) U.S. Cl. ................... 701/29; 73/146.2; 340/445
(58) Field of Classification Search .................... None
See application file for complete search history.

(56) References Cited

U.S. PATENT DOCUMENTS

| 4,567,460 A | 1/1986 | Gebler |
| 5,827,957 A | 10/1998 | Wehinger |
| 6,142,026 A * | 11/2000 | Ohashi et al. ............. 73/865.9 |
| 6,218,935 B1 | 4/2001 | Corcoran et al. |
| 6,275,148 B1 | 8/2001 | Takamura et al. |
| 6,278,363 B1 | 8/2001 | Bezek et al. |
| 6,359,556 B1 * | 3/2002 | Katou ......................... 340/506 |
| 6,446,023 B1 * | 9/2002 | Ernst .......................... 702/138 |
| 6,499,343 B1 * | 12/2002 | Haas et al. ................... 73/146 |
| 6,604,416 B2 * | 8/2003 | Tsujita ........................ 73/146.5 |

(Continued)

FOREIGN PATENT DOCUMENTS

DE    199 51 273 A1    6/2001

(Continued)

*Primary Examiner*—Michael J. Zanelli
(74) *Attorney, Agent, or Firm*—Oliff & Berridge, PLC

(57) ABSTRACT

A wheel-state obtaining apparatus for a vehicle, including wheel-side devices (10–16) each having an air pressure sensor (32) for detecting an air pressure of a wheel tire of the vehicle, and a body-side device (18) having receiver antennas (20–26) and arranged to receive wheel-side information from the wheel-side devices through the receiver antennas and extract air-pressure information representative of the detected air pressure, that is, detected-air-pressure information, and wherein the body-side device includes an estimating portion (54) which is operable, in the event of a failure of any of the receiver antennas to receive the wheel-side information, to estimate the tire air pressure on the basis of detected speeds of the wheel, and obtain estimated-air-pressure information representative of the estimated air pressure. Thus, the wheel-state obtaining apparatus is capable of obtaining information on the air pressure even in the event of a failure of the receiver antennas (20–26) to receive the wheel-side information.

50 Claims, 29 Drawing Sheets

U.S. PATENT DOCUMENTS

| | | | |
|---|---|---|---|
| 6,609,418 B2 * | 8/2003 | Yamagiwa et al. | 73/146 |
| 6,671,609 B2 * | 12/2003 | Nantz et al. | 701/93 |
| 6,946,954 B2 * | 9/2005 | Piech et al. | 340/444 |
| 6,965,306 B2 * | 11/2005 | Tsujita et al. | 340/448 |
| 6,998,974 B2 * | 2/2006 | Bergerhoff et al. | 340/444 |
| 7,034,672 B2 * | 4/2006 | Dinello et al. | 340/447 |
| 7,057,526 B2 * | 6/2006 | Yanase | 340/870.16 |
| 2002/0019685 A1 | 2/2002 | Ries-Mueller | |
| 2002/0044050 A1 | 4/2002 | Derbyshire et al. | |
| 2003/0000296 A1 | 1/2003 | Schmitt | |

FOREIGN PATENT DOCUMENTS

| | | |
|---|---|---|
| DE | 100 29 282 A1 | 12/2001 |
| EP | 1 044 829 A2 | 10/2000 |
| JP | A 58-118937 | 7/1983 |
| JP | A 6-191247 | 7/1994 |
| JP | 07-52621 A | 2/1995 |
| JP | 10-264621 A | 10/1998 |
| JP | A 10-309914 | 11/1998 |
| JP | A 10-504783 | 12/1998 |
| JP | 11-20427 A | 1/1999 |
| JP | 11-20428 A | 1/1999 |
| JP | 11-20429 A | 1/1999 |
| JP | 2000-238515 A | 9/2000 |
| JP | A 2002-205517 | 7/2002 |
| JP | A 2004-515395 | 5/2004 |
| WO | WO 96/06747 | 3/1996 |
| WO | WO 99/61265 | 12/1999 |
| WO | WO 02/47924 A1 | 6/2002 |
| WO | WO 03/006268 A1 | 1/2003 |

* cited by examiner

WHEEL-STATE OBTAINING APPARATUS, AND VEHICLE-STATE OBTAINING APPARATUS

TECHNICAL FIELD

The present invention relates to a vehicle-state obtaining apparatus arranged to obtain information indicative of a state of a vehicle

BACKGROUND ART

JP-A-2000-238515 describes a wheel-state obtaining apparatus, which includes wheel-side devices respectively provided on a plurality of wheels of a vehicle, and a body-side device disposed on a body of the vehicle, and wherein wheel-side information is transmitted from the wheel-side devices to the body-side device, so that information indicative of the states of the wheels is obtained. Each of the wheel-side devices includes an air-pressure detecting device operable to detect an air pressure of a tire of the corresponding wheel, and a transmitter device operable to transmit information indicative or representative of the air pressure detected by the air-pressure detecting device, while the body-side device includes a receiver device operable to receive the information transmitted from the wheel-side devices, and an air-pressure-information obtaining device operable to extract the information representative of the air pressure, from the wheel-side information received from the wheel-side devices. Each wheel-side device is arranged to transmit the wheel-side information at a predetermined first time interval while the detected tire air pressure is changing at a relatively low rate, and at a predetermined second time interval shorter than the first time interval, while the tire air pressure is changing at a relatively high rate. Accordingly, the body-side device receives the wheel-side information at the first time interval while the tire air pressure of each wheel is changing at the relatively low rate, and at the second time interval while the tire air pressure of the wheel is changing at the relatively high rate.

In the wheel-state obtaining apparatus described above, the wheel-side information including the information representative or indicative of the air pressure is transmitted from each wheel-side device, and the transmitted information is received by the body-side device, and the information representative of the air pressure is extracted from the received wheel-side information. Where the body-side device cannot receive the wheel-side information due to a noise, for example, the wheel-state obtaining apparatus cannot obtain the air pressure information.

DISCLOSURE OF THE INVENTION

It is therefore an object of the present invention to make it possible to obtain, with a higher degree of stability, information indicative of a state of a vehicle, such as a tire air pressure of each wheel, by using a plurality of information obtaining devices.

This object may be achieved according to any one of the following modes of the present invention. It is to be understood that the present invention is not limited to the technical features or any combinations thereof which will be described. It is to be further understood that a plurality of elements or features included in any one of the following modes of the invention are not necessarily provided all together, and that the invention may be embodied with selected at least one of the elements or features described with respect to the same mode.

(1) A wheel-state obtaining apparatus comprising:

a wheel-side device provided for each of at least one of a plurality of wheels of a vehicle and including a first-wheel-state detecting device operable to detect a first state of the corresponding wheel; and a body-side device disposed on a body of the vehicle and including (a) a detected-information obtaining device operable to obtain detected information representative of the first state of the above-indicated corresponding wheel detected by the first-wheel-state detecting device, (b) a vehicle-state detecting device operable to detect a state of the vehicle, (c) an estimated-information obtaining device operable to estimate the first state of the above-indicated corresponding wheel on the basis of at least the state of the vehicle detected by the vehicle-state detecting device, and obtain estimated information representative of the estimated first state, and (d) a determining device operable to determine one of the detected information and the estimated information, as wheel-state information representative of the first state of the above-indicated corresponding wheel.

The wheel-state obtaining apparatus according to the above mode (1) is provided with the detected-information obtaining device and the estimated-information obtaining device, as devices for obtaining information representative of one state of the vehicle. Accordingly, even when one of the detected-information and estimated-information obtaining devices is not able to obtain the corresponding detected or estimated information, the present apparatus is capable of obtaining the other information representative of the state of the wheel in question.

In the present wheel-state obtaining apparatus, one of the estimated information and the detected information is determined as the wheel-state information representative of the first state of the wheel. That is, the wheel-state information representative of the first state of the wheel in question may be obtained as either the estimated information or the detected information. In other words, the first state of the wheel in question is directly detected, or estimated (indirectly obtained).

The determining device may be arranged to select one of the estimated information and the detected information as the wheel-state information, according to a predetermined rule. Alternatively, the determining device may be arranged to normally select a predetermined one of the estimated information and the detected information, and select the other information only when a predetermined condition is satisfied. For instance, the determining device may be arranged to alternately select the estimated information and the detected information, or repeatedly use one of the estimated information and the detected information for two or more cycles of control once that information has been selected. Alternatively, the determining device may be arranged to compare the first state of the wheel represented by the estimated information and the first state represented by the detected information, with each other, and select the estimated or detected information which must be given to the vehicle operator with higher priority. Where the first state of the wheel in question is represented by a quantity, the determining device may be arranged to select the estimated or detected information whose quantity deviates from an optimum value by a larger amount. Further, the determining device may be arranged to normally select a predetermined one of the detected information and the estimated information, and select the other information where the selection of the predetermined one information would cause an undesirable result, or select a predetermined one of the detected and estimated information, in principle, and select the other information where the selection of the other information is more desirable. For example, the determining device selects, as the wheel-state information, the detected information when the first state of the wheel has been detected by the first-state detecting device, and the estimated information when the first state has not been detected by the first-state detecting device. Alternatively, the determining device selects, in principle, the detected information when the first state of the wheel has been detected, but selects the estimated information if a predetermined condition is satisfied even when the first state has been detected. Conversely, the determining device may be arranged to normally select the estimated information, and select the detected information if the accuracy of the estimated information is lower than a predetermined lower limit. The condition used to select one of the estimated information and the detected information will be described in detail.

The first-wheel-state detecting device, which is operable to detect the first state of the wheel, may be arranged to detect a first-wheel-state quantity representative of the first state of the wheel, or to indicate whether the first state of the wheel is optimum (for example, whether the first-wheel-state quantity is held within a predetermined optimum range, or larger than a predetermined lower limit). Where the first state of the wheel is an air pressure of a tire of the wheel in question, for instance, the first-wheel-state detecting device may be an air-pressure detecting device operable to detect a value of the air pressure of the wheel tire, or alternatively a pressure switch operable to determine whether the air pressure is normal (whether the air pressure is held within a predetermined optimum range). Thus, the first state of the wheel may be represented by a physical quantity, or by information indicating whether the physical quantity is optimum or not. The first state of the wheel is interpreted to comprehend those physical quantity and information. Similar interpretation applies to the first state estimated by the estimated-information obtaining device, and the state of the vehicle detected by the vehicle-state detecting device.

The estimated-information obtaining device, which is arranged to estimate the first state of the wheel on the basis of the state of the vehicle, may be arranged to estimate the first state of the wheel on the basis of only one state of the vehicle or a plurality of states of the vehicle. Where the first state of the wheel is a temperature of a tire of the wheel, the estimated-information obtaining device may be arranged to estimate the tire temperature or overheating of the tire, on the basis of only a total or cumulative running time of the vehicle after an ignition switch of the vehicle has been turned from its OFF state to its ON state, or alternatively, on the basis of not only the cumulative running time, but also an ambient temperature of the vehicle and a load acting on the tire. Further, the estimated value of the first state of the wheel may be obtained on the basis of the detected value of the first state of the wheel represented by the detected information obtained by the detected-information obtained device. Where the first state of the wheel is estimated on the basis of the latest detected value, as described below, for example, a final estimated value of the first state of the wheel may be obtained on the basis of the detected value and a provisional estimated value of the first state, and weights given to these detected and provisional estimated values. For instance, the final estimated value z may be estimated according to the following equation:

$$z = x\alpha + y(1-\alpha)$$

In the above equation, "x" represents the detected value, and "y" represents the provisional estimated value, while "$\alpha$" ($0 \leq \alpha < 1$) represents the weight given to the detected value x.

The vehicle-state detecting device may be arranged to detect a second state of the wheel other than the first state, or an operating state of a device of the vehicle (a device installed or built in the vehicle, such as a drive system, a power-transmission system, a braking system, a steering system, and a suspension system), an operating state of a member manually operated by a driver or operator of the vehicle (such as a steering member, a brake operating member, and an accelerating member), or a running state of the vehicle, for example. On the basis of the detected operating state of the device of the vehicle or of the manually operated member or the detected running state of the vehicle, it is possible to estimate the state of the wheel (for example, braking state, driving state or steering state of the wheel, forces acting on the wheel, air pressure or temperature of the tire, or rotating state of the wheel). The above-indicated parameters are suitably used to estimate the first state of the wheel.

(2) A wheel-state obtaining apparatus according to the above mode (1), wherein the determining device includes an individually determining portion operable for each of the plurality of wheel, independently of each other, such that one of the detected information and the estimated information is determined as the wheel-state information for each of the plurality of wheels.

(3) A wheel-state obtaining apparatus according to the above mode (1), wherein the determining device includes an overall determining portion operable for all of the plurality of wheels, such that one of the detected information and the estimated information is determined as the wheel-state information, commonly for all of the plurality of wheels.

The determining device may be arranged to select one of the detected information and the estimated information, for each of the plurality of wheels, independently of each other, or select the detected or estimated information commonly for all of the wheels. For example, the determining device is arranged such that a determination as to whether a predetermined condition for selecting the detected or estimated information is satisfied is effected for each of the wheels, independently of each other, or alternatively effected for the plurality of wheels as a whole. Further, it is possible to select one of the detected information and the estimated information, for each of two or more groups of the wheels, each group consisting of at least one wheel.

(4) A wheel-state obtaining apparatus according to any one of the above modes (1)–(3), wherein the determining device includes a detection-failure estimated-information determining portion operable to determine the detected information as the wheel-state information when the first state of the above-indicted corresponding wheel has been detected by the first-wheel-state detecting device, and determine the estimated information as the wheel-state information when the first state has not been detected by the first-wheel-state detecting device.

In the wheel-state obtaining apparatus according to the above mode (4), the detected information is selected, in principle, as the wheel-state information. When the first state of the wheel has been detected by the first-wheel-state detecting device, the first state of the wheel is obtained on the basis of the detected information, for example. The first state of the wheel represented by the detected information was directly detected by the first-wheel-state detecting device, and is therefore more accurate than the first state represented by the estimated information. Accordingly, the first state of the wheel can be more accurately obtained according to the above mode (4), than where the first state is always obtained on the basis of the estimated information. The detected information may be referred to as "directly obtained information", as distinguished from the estimated information which may be referred to as "indirectly obtained information".

When the first state of the wheel in question has not been detected by the first-wheel-state detecting device, the determining device determines the estimated information as the wheel-state information. Thus, the first state of the wheel can be obtained even when the first state has not been detected by the first-wheel-state detecting device. Namely, the first state is necessarily obtained at a predetermined timing of detection of the first state. In the present wheel-state obtaining apparatus, the estimated-information obtaining device may be arranged to obtain the estimated information while the detected-information obtaining apparatus is not in operation to obtain the detected information. In this case, the information representative of the first state of the wheel can be obtained at a relatively short time interval.

(5) A wheel-state obtaining apparatus according to any one of the above modes (1)–(4), wherein the wheel-side device further includes (a) a wheel-side-information transmitting device operable to transmit, in a wireless fashion, wheel-side information representative of the first state of the above-indicated corresponding wheel detected by the first-wheel-state detecting device, and (b) an electric power source operable to supply the wheel-side-information transmitting device and the first-wheel-state detecting device with an electric energy, and the body-side device further includes a receiving device operable to receive the wheel-side information transmitted from the wheel-side device, the detected-information obtaining device including a detected-information extracting portion operable to extract from the wheel-side information the detected information representative of the first state of the corresponding wheel.

The wheel-side-information transmitting device of the wheel-side device may be arranged to transmit the wheel-side information at a predetermined time interval, namely, periodically, or non-periodically, for instance, when the transmission of the information representative of the first state of the wheel is required, or when the first-wheel-state detecting device has a predetermined output amount or state. That is, the wheel-side-information transmitting device may transmit the wheel-side information in response to a request received from the body-side device, or according to a condition of the wheel-side device. Where the wheel-side information is transmitted periodically, the transmission time interval or frequency may be changed as needed, as in the prior art apparatus.

The wheel-side information transmitted from the wheel-side-information transmitting device of the wheel-side device is received by the receiving device of the body-side device, and the information representative of the first state of the wheel is extracted from the wheel-side information received by the receiving device, to obtain the detected information. Thus, the detected information is obtained by extraction from the wheel-side information received by the receiving device, and may therefore be referred to as "received information". Since the detected information is transmitted in a wireless or radio-communication fashion, it may be referred to as "radio-transmitted information" or "wireless-transmitted information".

On the other hand, the vehicle-state detecting device is connected through a signal line to the estimated-information obtaining device, and the information representative of the state of the vehicle detected by the vehicle-state detecting device is supplied through the signal line to the estimated-information obtaining device, so that the first state of the wheel is estimated on the basis of the information received by the estimated-information obtaining device. In this respect, the estimated information may be referred to as "cable-transmission-dependent information" or "wire-transmission-dependent information".

The electric power source provided in the wheel-side device is different and separate from an electric power source provided in the body-side device, and may be independent of, or dependent on the electric power source provided in the body-side device. The electric power source in the wheel-side device may be a power source not having an electricity generating function or a charging function, that is, may be a battery. However, the electric power source in the wheel-side device may have at least one of the electricity generating function and the charging function. For instance, the electric power source in the wheel-side device may be provided with an electric generator operated by a rotary motion of the wheel, for example, an electric generator of electromagnetic induction type, or an electric generator of mechanical motion type. Alternatively, the electric power source has a function of generating electricity utilizing a contact of the tire with the road surface (for example, by utilizing piezoelectric elements), or has solar cells disposed on the surface of the wheel. Further alternatively, the electric power source in the wheel-side device may be charged with an electric energy supplied from the body-side device by transmission of a high-frequency wave.

(6) A wheel-state obtaining apparatus according to the above mode (5), wherein the determining device includes a reception-condition-dependent determining portion operable to determine one of the detected information and the estimated information as the wheel-state information, on the basis of a condition of reception of the wheel-side information by the receiving device.

The determining device may be arranged to determine one of the detected information and the estimated information as the wheel-state information, depending upon whether the wheel-side information has been normally received by the receiving device, or whether the receiving device has difficulty in receiving the wheel-side information (for example, whether a ratio of reception of the wheel-side information is higher than a predetermined threshold, or whether the receiving device is normal or abnormal).

(7) A wheel-state obtaining apparatus according to the above mode (5) or (6), wherein the determining device includes a determining portion operable to determine the estimated information as the wheel-state information when the wheel-side information has not been normally received by the receiving device, and determine the detected information as the wheel-state information when the wheel-side information has been normally received by the receiving device.

(8) A wheel-state obtaining apparatus according to the above mode (7), wherein the determining portion determines the estimated information as the wheel-state information when the wheel-side information received by the receiving device is abnormal, and determines the estimated information as the wheel-state information when the wheel-state information received by the receiving device is normal.

In the wheel-state obtaining apparatus according to the above mode (7), the estimated information is determined as the wheel-state information when the wheel-side information has not been received by the receiving device. The wheel-side information is not received by the receiving device (a) even when the receiving device is normal, where the wheel-side information is not transmitted from the wheel-side device due to an abnormality of the wheel-side device, or during a period in which the wheel-side information is not transmitted from the wheel-side device which is arranged to transmit the wheel-side information at a predetermined interval, or where the wheel-side information is not received by the receiving device due to a noise included in the wheel-side information, or (b) when the wheel-side information is not received by the receiving device due to an abnormality of the receiving device. The case (a) includes: a partial loss of the wheel-side information as received by the receiving device and a consequent failure of the detected-information extracting portion to extract the detected information representative of the first state of the wheel; abnormality of the wheel-side information received by the receiving device. Where the wheel-side device is arranged to transmit the wheel-side information at the predetermined interval, the above-indicated period in which the wheel-side information is not transmitted is a period from the moment of the last transmission of the wheel-side information to the moment of the next transmission. The interval of transmission of the wheel-side information from the wheel-side-information transmitting device of the wheel-side device may be considered to be equal to the interval of reception of the wheel-side information by the receiving device of the body-side device, under a predetermined condition. The interval of reception is a period from the moment of the last reception of the wheel-side information to the moment of the next reception.

Where the wheel-side information is transmitted from the wheel-side device periodically at a predetermined interval, and the estimated information is obtained between the moments of transmission, the estimated information representative of the first state of the wheel is obtained at a relatively short time interval by the body-side device, even where the transmission interval is relatively long. In other words, the transmission interval of the wheel-side device may be prolonged, and the amount of electric energy required to transmit the wheel-side information can be accordingly reduced. Accordingly, the arrangement to obtain the estimated information at an interval shorter than the transmission interval is particularly advantageous, where the electric power source is a battery, since the service life of the battery can be prolonged.

(9) A wheel-state obtaining apparatus according to any one of the above modes (5)–(8), wherein the determining device includes a reception-failure estimated-information determining portion operable to determine the estimated information as the wheel-state information when the wheel-side information has not been received by the receiving device, at a predetermined timing of reception of the wheel-side information by the receiving device.

(10) A wheel-state obtaining apparatus according to the above mode (9), wherein the wheel-side-information transmitting device includes a periodically transmitting portion operable to transmit the wheel-side information at a predetermined interval of transmission.

Where the timing of reception of the wheel-side information by the receiving device is known to the body-side device, the reception-failure determining portion of the determining device determines the estimated information as the wheel-side information when the wheel-side information has not been received by the receiving device at the predetermined timing of reception, or within a predetermined period after the predetermined timing or reception. Where the wheel-side-information transmitting device of the wheel-side device is arranged to transmit the wheel-side information at a predetermined interval of transmission as in the apparatus according to the above mode (10), the timing of reception of the wheel-side information is known to the receiving device.

The estimated information is determined as the wheel-state information when the wheel-side information has not been transmitted at the predetermined timing of transmission, due to an abnormality of the wheel-side device, so that the wheel-side information has not been received by the receiving device, or when the wheel-side information has not been received by the receiving device due to an abnormality of the receiving device.

The wheel-state obtaining apparatus according to the above modes (9) and (10) is advantageous in that the first state of the wheel can be obtained even where the wheel-side information is not or cannot be received by the receiving device.

Where the wheel-side device is operable to transmit the wheel-side information at a selected one of a plurality of different transmission intervals, as in the prior art apparatus, the receiving device is preferably arranged to receive the wheel-side information at the reception interval which is equal to the shortest transmission interval.

(11) A wheel-state obtaining apparatus according to any one of the above modes (5)–(10), wherein the wheel-side-information transmitting device includes a periodically transmitting portion operable to transmit the wheel-side information at a predetermined interval of transmission, and the estimated-information obtaining device is operable to obtain the estimated information during a predetermined interval of reception of the wheel-side information by the receiving device.

In the wheel-state obtaining apparatus according to the above mode (11), the firs state of the wheel is estimated during the predetermined interval of reception of the wheel-side information, so that the estimated information is obtained at least once during each period of reception of the wheel-side information. The estimated information may be obtained only once or a plurality of times during each period of reception of the wheel-side device by the receiving device. During each period of reception, the estimated information may be obtained at a predetermined interval, or in response to a signal received form an external device.

(12) A wheel-state obtaining apparatus according to any one of the above modes (5)–(11), wherein the determining device includes a reception-condition determining portion operable to determine whether a ratio of reception of the wheel-side information by the receiving device is relatively high or low, and a reception-condition-dependent determining portion operable to determine the detected information as the wheel-state information when the reception-condition determining portion determines that the ratio of reception is relatively high, and determine the estimated information as the wheel-state information when the reception-condition determining portion determines that the ratio of reception is relatively low.

The ratio of reception of the wheel-side information by the receiving device is considered to be relatively low in a condition in which there is a high possibility of generation of a noise. The determination as to whether the possibility of generation of the noise can be effected on the basis of the running state of the vehicle. During straight running of the vehicle at an almost constant speed, the possibility of generation of the noise is lower, and the ratio of reception of the wheel-side information by the receiving device is higher, than during acceleration or deceleration of the vehicle. During running of the vehicle on a relatively flat (non-undulated) or good roadway, the possibility of generation of the noise is lower, and the ratio of reception of the wheel-side information is higher, than during running of the vehicle on a bad roadway.

(13) A wheel-state obtaining apparatus according to any one of the above modes (1)–(12), wherein the vehicle-state detecting device includes a second-wheel-state detecting device operable to detect a second state of each of at least one of the plurality of wheels, the second state being different from the first state.

In the wheel-state obtaining apparatus according to the above mode (13), the first state of the wheel in question (wheel whose first state is estimated) is estimated on the basis of the second state of the wheel in question, or on the basis of the second state of a plurality of wheels including the wheel in question. Where the first state is an air pressure of the tire of the wheel in question, while the second state is a rotating speed, for example, the tire air pressure of the wheel in question may be estimated on the basis of a plurality of values of the rotating speed of the wheel in question. It is known that there is a predetermined relationship between an amount of change of a spring constant of the wheel tire and an amount of change of the air pressure of the tire. The amount of change of the spring constant is obtained on the basis of the two or more values of the rotating speed of the wheel in question. For example, the tire air pressure may be obtained on the basis of a resonance frequency obtained by frequency analysis of the two or more speed values of the wheel in question, and a predetermined relationship between the amount of change of the resonance frequency and the amount of change of the spring constant of the tire. Alternatively, the tire air pressure may be obtained by using an external disturbance observer. Thus, the air pressure of the tire may be estimated on the basis of the resonance frequency or by using the external disturbance observer.

Where the rotating speed of the wheel in question is excessively higher than an average value of the rotating speeds of a plurality of wheels including the wheel in question, the tire air pressure of the wheel in question is considered to be abnormal.

The first state of the wheel in question may be estimated on the basis of only the second state, or on the basis of not only the second state but also any additional physical value or values. For example, the first state may be estimated by taking into account any other state of the vehicle, such as a third state of the wheel different from the second state, or a driving state of the vehicle, or the first state of the other wheel or wheels. The third state may be that of the wheel in question or that of any other wheel or wheels. Information representative of the third state may be transmitted from the wheel-side device, by radio communication with the body-side device, together with or independently of the information representative of the first state, or supplied directly to the body-side device through a signal line, for example.

Where the tire air pressure as the first state of the wheel in question is estimated on the basis of the rotating speed of the wheel as its second state, the estimation may be made by taking account of a temperature of the tire as the third state of the wheel in question, or the running speed of the vehicle as another state of the vehicle, for example. JP-A-2000-238516 describes that the tire air pressure of the wheel in question estimated on the basis of a plurality of values of the rotating speed of the wheel is influenced by the temperature of the tire and the running speed of the vehicle. The tire air pressure of the wheel in question may be estimated by taking account of the tire air pressure of any other wheel or wheels. For instance, the tire air pressure of the wheel in question may be estimated on the basis of the angular velocities of the wheel in question and any other wheel, and the tire air pressure or pressures of the other wheel or wheels. The effective radius of a tire decreases with a decrease in the tire air pressure, so that the angular velocity of the wheel increases with the decrease of the tire air pressure. In this case, the estimation of the tire air pressure is based on the dynamic load radius of the wheel.

(14) A wheel-state obtaining apparatus according to any one of the above modes (5)–(13), wherein the estimated-information obtaining device includes a detected-state estimating portion operable to estimate the first state of the above-indicated corresponding wheel after last reception of the wheel-side information by the receiving device, on the basis of at least the first state of the above-indicated corresponding wheel represented by the wheel-side information received last by the receiving device.

In the wheel-state obtaining apparatus according to the above mode (14), the first state of the wheel in question represented by the last obtained detected information is utilized to estimate the first state. The accuracy of estimation of the first state can be improved where the first state estimated on the basis of the state of the vehicle is obtained by taking account of the first state which was directly detected last.

The first state represented by the detected information (detected first state) may be coincident with the first state estimated on the basis of the state of the vehicle (estimated first state), under some condition. However, the estimated first state may be different from the detected first state. To reduce this difference, the estimated first state is estimated on the basis of the last detected value of the first state.

(15) A wheel-state obtaining apparatus according to the above mode (14), wherein the vehicle-state detecting device includes a second-wheel-state detecting device operable to detect a second state of each of at least one of the plurality of wheels, the second state being different from the first state, and the detected-state estimating estimates the first state of the above-indicated corresponding wheel, on the basis of the first state represented by the wheel-side information received last by the receiving device, and the second state detected by the second-wheel-state detecting device.

In the wheel-state obtaining apparatus according to the above mode (15), the first state of the wheel in question which has been detected last by the first-wheel-state detecting device to obtain the last detected information is estimated on the basis of the second state of the wheel in question and the first state represented by the last detected information.

(16) A wheel-state obtaining apparatus according to any one of the above modes (13)–(15), wherein the detected-state estimating portion includes an estimating portion operable to estimate the first state of the corresponding wheel, according to a predetermined rule on the basis of the second state of each of the above-indicated at least one of the plurality of wheels detected by the second-wheel-state detecting device, and a rule-changing portion operable to change the predetermined rule on the basis of the first state of the above-indicated corresponding wheel represented by the detected information which has been extracted by the detected-information obtaining device from the last received wheel-side information.

The accuracy of estimation of the first state of the wheel in question can be improved by changing the rule used for the estimation, on the basis of the first state of the wheel represented by the detected information obtained last by the detected-information obtaining device.

(17) A wheel-state obtaining apparatus according to any one of the above modes (13)–(16), wherein the detected-state estimating portion includes a provisionally estimating portion operable to obtain a provisional estimated value of the first state of the above-indicated corresponding wheel on the basis of the second state of each of the above-indicated at least one of the plurality of wheels detected by the second-wheel-state detecting device, and an estimated-information obtaining portion operable to compensate the provisional estimated value of the first state on the basis of the first state represented by the detected information extracted from the wheel-side information which has been received last by the receiving device, the estimated-information obtaining portion determining the compensated provisional estimated value of the first state as the estimated information.

In the wheel-state obtaining apparatus according to the above mode (17), the first state of the wheel in question which has been provisionally estimated by the provisionally estimating portion to obtain the provisional estimated value is compensated on the basis of the first state represented by the latest detected information. Information representative of the provisional estimated value of the first state may be referred to as "provisional estimated information".

(18) A wheel-state obtaining apparatus according to any one of the above modes (13)–(16), wherein the detected-state estimating portion includes a provisionally estimating portion operable to obtain a provisional estimated value of the first state of the above-indicated corresponding wheel on the basis of the second state of each of the above-indicated at least one of the plurality of wheels detected by the second-wheel-state detecting device, and a final-estimated-value obtaining portion operable to compensate the provisional estimated value of the first state on the basis of a predetermined relationship between the first state represented by the detected information extracted from the wheel-side information received last by the receiving device, and the provisional estimated value obtained at a moment substantially coincident with a moment at which the wheel-side information was received last by the receiving device, the final-estimated-value obtaining portion determining the compensated provisional estimated value of the first state as a final estimated value of the first state.

In the wheel-state obtaining apparatus according to the above mode (18), the provisional estimated value of the first state of the wheel in question is compensated to obtain the final estimated value, on the basis of the predetermined relationship between the last detected value of the first state and the provisional estimated value obtained at substantially the same moment as the last detected value of the first state. Thus, the provisional estimated value of the first state is compensated for a difference with respect to the last detected value, by using a predetermined compensating coefficient. For instance, the compensating coefficient is a ratio of the last detected value and the corresponding provisional estimated value, or a difference between these two values.

In the wheel-state obtaining apparatus, the relationship between the lasted detected value of the first state and provisional estimated value of the first state is obtained and thus updated each time the wheel-side information is received by the receiving device. However, this arrangement is not essential. For example, the relationship may be a relationship between a plurality of detected values of the first state and a plurality of provisional estimated values of the first state, or may be updated each time the wheel-side information has been received a predetermined number of times. Alternatively, the relationship is obtained when the ignition switch of the vehicle is turned on, and is continuously used while the ignition switch is held in the on state.

(19) A wheel-state obtaining apparatus according to any one of the above modes (1)–(18), wherein the estimated-information obtaining device includes an other-wheel-dependent estimating portion operable to estimate the first state of the above-indicated corresponding wheel on the basis of the first state of at least one other wheel of the plurality of wheels, for obtaining the estimated information representative of the estimated first state.

(20) A wheel-state obtaining apparatus according to the above mode (19), wherein the first-wheel-state detecting device is provided for each of at least two wheels of the plurality of wheels, and the vehicle-state detecting device includes a second-wheel-state detecting device operable to detect a second state of each of the above-indicated at least two wheels, which second state is different from the first state, the other-wheel-dependent estimating portion obtaining the estimated information of one of two wheels of the plurality of wheels, by estimating the first state of the above-indicted one of the two wheels, on the basis of the second state of the two wheels detected by the second-wheel-state detecting device, and the first state of the other of the two wheels detected by the first-wheel-state detecting device.

The first state of the wheel in question is estimated on the first state of another wheel. Namely, the first state of one of two wheels can be estimated on the basis of the first state of the other wheel, and a relationship between the first states of the two wheels which is obtained on the basis of the second states of the two wheels.

The wheel-side devices are provided for the respective two wheels including the wheel in question, so that the first states of the two wheels are detected by the first-wheel-state detecting devices of the respective two wheel-side devices. In this case, the first state of the wheel in question is estimated on the basis of the first state of the other wheel represented by the detected information, which may be obtained at a moment different from the moment at which the detected information representative of the first state of the wheel in question is obtained. Thus, the first state of the wheel in question can be effectively estimated by utilizing the first state represented by the detected information of the other wheel.

The estimation of the first state of the wheel in question on the basis of the first state of another wheel is based on a predetermined relationship between the state of the vehicle (second state of the two wheels) and the first states of the two wheels.

Where the first state is a tire air pressure of each wheel, while the second state (state of the vehicle) is an angular velocity of the wheel, for example, the estimation of the first state of the wheel in question on the basis of the first state of another wheel can be made if the angular velocities of the two wheels change with the tire air pressures, and are not significantly influenced by any other factors, and if the two wheels are placed in substantially the same condition except for the tire air pressure. Thus, the estimation requires some conditions of the vehicle, which include, for example, at least one of a condition that the amounts of slipping of the two wheels are within a predetermined range of tolerance; a condition that the loads acting on the two wheels are substantially equal to each other; a condition that the roadway surface with which the wheels are held in rolling contact are substantially flat; and a condition that the running speed of the vehicle is held within a predetermined range.

For example, the states of the wheel in question and another wheel are actually detected to determine whether the vehicle is placed in the required condition or conditions for estimation of the first state of the wheel in question on the basis of the first state of another wheel. However, this determination may be based on the detected running state of the vehicle. For instance, it is determined that the vehicle is placed in the required conditions, if the vehicle is running straight at a speed within a predetermined range, on a flat roadway surface, without an excessively slipping tendency of the wheels.

The two wheels including the wheel in question may be limited to the front right and left wheels, or the rear right and left wheels. The front right and left wheels, and the rear right and left wheels have a comparatively small difference in the load acting thereon during braking or acceleration of the vehicle, except during turning or cornering of the vehicle, so that these right and left wheels usually satisfy the required conditions indicated above.

(21) A wheel-state obtaining apparatus according to any one of the above modes (1)–(20), wherein the vehicle-state detecting device includes a second-wheel-state detecting device operable to detect a second state of each of at least one of the plurality of wheels, the above-indicated at least one of the plurality of wheels including another wheel different from the above-indicated corresponding wheel, the second state being different from the first state, and wherein the estimated-information obtaining device includes a relation-dependent estimated-information obtaining portion operable to estimate the first state of he above-indicated corresponding wheel to obtain the estimated information representative of the estimated first state of the above-indicated corresponding wheel, on the basis of at least the second state of the above-indicated another wheel detected by the second-wheel-state detecting device, and on the basis of a predetermined relationship between the second states of the above-indicated corresponding wheel and the above-indicated another wheel.

In the wheel-state obtaining apparatus according to the above mode (21), the first state of the wheel in question (above-indicated corresponding wheel) is estimated on the basis of the second state of another wheel and the predetermined relationship between the second states of the wheel in question and the above-indicated another wheel. The estimation of the first state of the wheel in question does not necessarily require detection of the second state of the wheel in question, where the relationship between the second states of the two wheels is known.

Where the first state is an amount of change of a load acting on each of the two wheels, and the second state is a braking force applied to each wheel, while the wheel in question is a front wheel, and the above-indicated another wheel is a rear wheel, for example, the amount of change of the front wheel is detected by the first-wheel-state detecting device, and the braking force of the rear wheel is detected by the second-wheel-state detecting device. In this case, the ratio of the braking force of the rear wheel and the braking force of the front wheel is predetermined and known. On the basis of this ratio of the braking forces of the front and rear wheels, the braking force of the front wheel can be estimated, and a total braking force applied to the vehicle can be estimated, so that the deceleration value of the vehicle can be estimated. Based on the thus estimated deceleration value of the vehicle, the amount of change of the load acting of the front wheel can be estimated.

Thus, the amount of change of the load of the front wheel can be estimated on the basis of the predetermined relationship between the braking forces of the front and rear wheels, more precisely, the known ratio of the braking forces of the front and rear wheels, without having to detect the braking force of the front wheel.

(22) A wheel-state obtaining apparatus according to any one of the above modes (1)–(21), wherein the vehicle-state detecting device includes a second-wheel-state detecting device operable to detect a quantity of a second state of each of at least two wheels of the plurality of wheels, the above-indicated at least two wheels including the above-indicated corresponding wheel, the second state being different from the first state, and wherein the estimated-information obtaining device includes an estimated-information obtaining portion operable to estimate the first state of the corresponding wheel to obtain the estimated information representative of the estimated first state of the above-indicated corresponding wheel, on the basis of at least a relationship between the quantity of the second state of the corresponding wheel detected by the second-wheel-state detecting device, and an average of the quantities of the second states of the above-indicated at least two wheels detected by the second-wheel-state detecting device.

The first state of the wheel in question can be estimated on the basis of a relationship between the quantity of the second state of the wheel in question and the average of the quantities of the second states of the at least two wheels including the wheel in question. Where the first state is whether the air pressure of the tire of the wheel in question is normal or abnormal, and the second state is the rotating speed of the wheels, for example, it is possible to determine that the tire air pressure of the wheel in question is not normal, if the ratio of the rotating speed of the wheel in question to the average of the rotating speeds of the at least two wheels is higher than a predetermined threshold.

(23) A wheel-state obtaining apparatus according to any one of the above modes (1)–(22), wherein the vehicle-state detecting device includes a second-wheel-state detecting device operable to detect a second state of the above-indicated corresponding wheel, the second state being different from the first state, and the estimated-information obtaining device (includes (a) a first-estimated-information obtaining portion operable to estimate the first state of the corresponding wheel on the basis of the first state of at least one other wheel of the plurality of wheels, to obtain first estimated information, and (b) a second-estimated-information obtaining portion operable to estimate the first state of the above-indicated corresponding wheel on the basis of the second state of the above-indicated corresponding wheel, to obtain second estimated information, and wherein the determining device (55) includes a selecting portion operable to select one of the first estimated information and the second estimated information, when the determining device determines the estimated information as the wheel-state information.

Two or more methods are available to estimate the first state of the wheel in question on the basis of a state of the vehicle. The estimated-information obtaining device provided in the wheel-state obtaining apparatus according to the above mode (23) includes the first-estimated-information obtaining portion and the second-estimated-information obtaining portion, and the selecting portion of the determining device selects one of the first estimated information and the second estimated information which are respectively obtained by the first-estimated-information obtaining portion and the second-estimated-information obtaining portion. The selecting portion may be arranged to select a predetermined one of the two or more methods of estimation, or select one of the methods depending upon the situation.

For example, the plurality of methods of estimation are sequentially selected according to a predetermined rule, or an appropriate one of the methods is selected depending upon the condition of the vehicle when the estimated information is obtained, such that the accuracy of estimation according to the selected method is the highest under the specific condition of the vehicle at the time of estimation. Alternatively, one of the methods of estimation is given the highest priority, so that this one method is selected as a rule, and another of the methods is selected when a predetermined condition is satisfied.

(24) A wheel-state obtaining apparatus according to any one of the above modes (1)–(23), wherein the determining device includes (a) a vehicle-state detecting portion operable to detect a state of the vehicle, and (b) a vehicle-state-dependent determining portion operable to determine one of the detected information and the estimated information as the wheel-state information, on the basis of the state of the vehicle detected by the vehicle-state detecting portion.

(25) A wheel-state obtaining apparatus according to the above mode (24), wherein the vehicle-state detecting portion includes a vehicle-running-state detecting portion operable to detect a running state of the vehicle, and the vehicle-state-dependent determining portion includes a vehicle-running-state-dependent determining portion operable to determine one of the detected information and the estimated information as the wheel-state information, on the basis of the running state of the vehicle detected by the vehicle-running-state detecting portion.

The determination of one of the detected information and the estimated information as the wheel-state information need not be based on the condition of reception of the wheel-side information. For example, the determination may be based on the detected state of the vehicle, as in the apparatus according to the above mode (24). The state of the vehicle includes: a state of the wheels; a running state of the vehicle; an operating state or presence of an abnormality of at least one device provided on the vehicle; and an operating state of at least one member manually operated by the operator of the vehicle. The state of the vehicle may also include a condition of the roadway surface with which the wheels are held in contact. The condition of the roadway surface has a large influence on the state of the vehicle, or determines the state of the vehicle.

The running state of the vehicle may be represented by: running speed (level of the speed, or whether the vehicle is running at a high speed); acceleration values (acceleration values in the longitudinal and lateral directions of the vehicle); running path (whether the vehicle is turning or cornering, or running straight); and slipping states of the wheels. These running states of the vehicle can be detected by a running-speed sensor, an acceleration sensor, a yaw rate sensor, wheel speed sensors, etc., or alternatively on the basis of the operating states of a vehicle-drive system, a braking system, a steering system and any other devices installed on the vehicle, and the operating states of an accelerating member (accelerator pedal), a brake operating member (a brake pedal), a steering member (steering wheel) and any other members manually operated by the vehicle operator.

The vehicle-state-dependent determining portion may be arranged to determine the estimated information as the wheel-state information, when the detected state of the vehicle (including the state of the wheels) is suitable for the estimation of the first state of the wheel in question. For example, the detected state of the vehicle is determined to be suitable for the estimation, when a rule or algorithm for the estimation is applicable in the detected state of the vehicle, or when the accuracy of detection of the vehicle state on which the first state of the wheel in question is estimated is higher than a predetermined lower limit. Where the first state is the air pressure of the tire, and the second state is the rotating speed of the wheel, and where the tire air pressure is estimated on the basis of a plurality of values of the rotating speed of the wheel in question, the estimated information is selected as the wheel-state information, when the rotating speed of the wheel in question changes with the tire air pressure, and is not significantly influenced by any other factors. For instance, it is determined that the accuracy of estimation of the first state on the state of the vehicle is not sufficiently high, if the rotating speed of the wheel in question is influenced by the condition of the roadway surface or if the amount of slipping of the wheel in question is relatively large. To this end, it is required to determine whether the accuracy of estimation of the first state of each wheel is higher than a predetermined threshold, or determine whether the state of the vehicle as a whole permits accurate estimation of the first state of the wheel in question.

The vehicle-state-dependent determining portion of the determining device in the apparatus according to the above mode (25) may be arranged to determine, as a rule, the detected information as the wheel-state information, and determine the estimated information as the wheel-state information, when the detected running state of the vehicle has become coincident with a predetermined state. Alternatively, the vehicle-state-dependent determining portion is arranged to determine, as a rule, the estimated information as the wheel-state information, and determine the detected information as the wheel-state information, when the detected running state of the vehicle has become coincident with a predetermined state.

(26) A wheel-state obtaining apparatus according to any one of the above modes (1)–(25), wherein the determining device includes (a) a roadway-surface detecting portion operable to detect a condition of a roadway surface on which the vehicle is running, and (b) a roadway-condition-dependent determining portion (S154) operable to determine one of the detected information and the estimated information as the wheel-state information, on the basis of the condition of the roadway surface detected by the roadway-surface detecting portion.

The roadway-condition-dependent determining portion may be arranged to determine the estimated information as the wheel-state information, when the flatness of the roadway surface detected by the roadway-surface detecting portion is higher than a predetermined value. The condition of the roadway surface may be detected on the basis of changes of the rotating speeds of the wheels, or an output of a roadway-surface detector arranged to detect the condition of the roadway surface on the basis of a state of reflection of an electromagnetic wave from the roadway surface.

(27) A wheel-state obtaining apparatus according to any one of the above modes (1)–(26), wherein the determining device includes a determining portion operable to determine the estimated information as the wheel-state information, when a state of change of the estimated information as obtained by the estimated-information obtaining device is smaller than a predetermined state.

When the state of change of the estimated information is smaller than the predetermined state, the estimated information may be continuously selected as the wheel-state information. When the state of change of the estimated information is larger than the predetermined state, the reliability of the estimated information is considered to be low, and continuous use of the estimated information is not desirable, so that the detected information is preferably selected as the wheel-state information.

(28) A wheel-state obtaining apparatus according to any one of the above modes (1)–(27), wherein the determining device includes an independently determining portion operable to determine one of the detected information and the estimated information as the wheel-state information representative of the first state of each of the plurality of wheels, such that the detected information is selected as the wheel-state information of at least one of the plurality of wheels, while the estimated information is selected as the wheel-state information of the other of the plurality of wheels.

For example, the independently determining portion is arranged to make the determination or selection of one of the detected information and the estimated information, for each of the wheels, or for each group of the wheels. Accordingly, it is possible that the detected information is selected for some of the wheels, while the estimated information is selected for the other wheel or wheels.

The independently determining portion may be arranged to select either the estimated information or the detected information for each of the wheels or for each group of the wheels, depending upon the states of change of the first state represented by the estimated information, states of slipping of the wheels, or operating states (abnormal or normal states) of the corresponding wheel-side devices or the second-wheel-state detecting device. The individual wheels or different groups of wheels may have different situations in connection with the states of change of the estimated first state, states of slipping and operating states of the wheel-side devices and second-wheel-state detecting device, so that the selection of the detected or estimated information is desirably effected for each of the wheels or each group of the wheels, independently of each other.

(29) A wheel-state obtaining apparatus according to any one of the above modes (5)–(28), wherein the wheel-side device further includes a transmission control device operable to control a state of transmission of the wheel-side information from the wheel-side-information transmitting device.

The transmission control device may be arranged to permit or inhibit the transmission of the wheel-side information at a predetermined interval, or change the interval of transmission of the wheel-side information, or commands the wheel-side-information transmitting device to transmit the wheel-side information. The transmission control device may control the wheel-side-information transmitting device on the basis of the first state of the corresponding wheel detected by the first-wheel-state detecting device, or on the basis of a command received from the body-side device, as described below.

(30) A wheel-state obtaining apparatus according to the above mode (29), wherein the transmission control device includes at least one of (a) a transmission permitting/inhibiting portion operable to permit or inhibit transmission of the wheel-side information from the wheel-side-information transmitting device, on the basis of a state of change of the first state of the corresponding wheel detected by the first-wheel-state detecting device, and (b) a transmission restricting portion operable to restrict the transmission of the wheel-side information from the wheel-side-information transmitting device, when the change of the first state detected by the first-wheel-state detecting device is slower than a predetermined threshold.

For instance, the transmission permitting/inhibiting portion is arranged to permit the transmission of the wheel-side information from the wheel-side-information transmitting device when the rate of change of the first state of the wheel in question detected by the first-wheel-state detecting device is higher than a predetermined threshold, and inhibit the transmission when the rate of change is not higher than the threshold.

The transmission restricting portion may be arranged to restrict the transmission of the wheel-side information when the rate of change of the detected first state of the wheel in question is lower than a predetermined threshold. The restriction of the transmission includes inhibition of the transmission, prolongation of the transmission interval, and reduction of the wheel-side information to be transmitted.

(31) A wheel-state obtaining apparatus according to the above mode (29)–(30), wherein the wheel-side device further includes (a) a wheel-side-information generating device operable o generate the wheel-side information on the basis of the first state of the above-indicated corresponding wheel detected by the first-wheel-state detecting device, and (b) a generating-device control device operable to control the wheel-side-information generating device on the basis of a state of change of the first state detected by the first-wheel-state detecting device.

The generating-device control device may be arranged to reduce the amount of the wheel-side information generated by the wheel-side-information generating device, when the change of the first state is smaller than a predetermined threshold. For instance, the wheel-side-information generating device is controlled by the generating-device control device, so as to transmit the wheel-side information which merely indicates whether the first state of the corresponding wheel is normal or abnormal, rather than the wheel-side information which represents a quantity of the first state. In this case, the time required for transmitting the wheel-side information can be shortened, and the amount of electric energy required for the transmission can be reduced.

(32) A wheel-state obtaining apparatus according to any one of the above modes (29–(31), wherein the body-side device further includes a transmission-state-control-information transmitting device operable to transmit to the wheel-side device transmission-state control information indicative of a state of transmission of the wheel-side information from the wheel-side-information transmitting device, and the wheel-side device further includes a body-side-information receiving device operable to receive information from the body-side device, the transmission control device controlling the wheel-side-information transmitting device according to the transmission-state control information received by the body-side-information receiving device.

In the wheel-state obtaining apparatus according to the above mode (32), the state of transmission of the wheel-side information from the wheel-side device is controlled on the basis of the information received from the body-side device. In other words, the state of transmission of the wheel-side information from the wheel-side device is controlled by the body-side device.

The transmission-state control information transmitted from the transmission-state-control-information transmitting device may indicate the transmission interval of the wheel-side information, permit or inhibit the transmission of the wheel-side information at the predetermined transmission interval, or requires the transmission per se of the wheel-side information at a given point of time.

(33) A wheel-state obtaining apparatus according to the above mode (32), wherein the transmission-state-control-information transmitting device is operable to transmit to the wheel-side device at least one of (a) information which permits the transmission of the wheel-side information, and (b) information which requires the transmission of the wheel-side information, when an accuracy of the estimated information obtained by the estimated-information obtaining device is lower than a predetermined threshold.

(34) A wheel-state obtaining apparatus according to any one of the above modes (1)–(33), wherein the first-wheel-state detecting device includes at least one of (a) an air-pressure-state detecting device operable to detect a state of an air pressure in a tire of the corresponding wheel, (b) a temperature-state detecting device operable to detect a state of a temperature of the tire, (c) a force-state detecting device operable to detect a state of forces acting on the above-indicated wheel, and (d) a rotation-state detecting device operable to detect a state of rotation of the above-indicated corresponding wheel.

(35) A wheel-state obtaining apparatus according to any one of the above modes (1)–(34), wherein the first-wheel-state detecting device includes an air-pressure-state detecting device operable to detect a state of an air pressure in a tire of each of at least one of the plurality of wheels, and the vehicle-state detecting device includes a speed detecting device operable to detect a rotating speed of each of at least one of the plurality of wheels, the estimated-information obtaining device including an estimated-air-pressure-information obtaining portion operable to estimate the air pressure of each of the above-indicated at least one of the plurality of wheels on the basis of the rotating speed detected by the speed detecting device, to obtain estimated-air-pressure information representative of the estimated air pressure.

In the wheel-state obtaining apparatus according to the above mode (35), the air pressure of the tire of the wheel in question is detected by the air-pressure-state detecting device. Thus, the present wheel-state obtaining apparatus may be referred to as "an air-pressure obtaining apparatus".

As described above, the air pressure of the tire is detected as the first state of the wheel in question. The air-pressure-state detecting device may be arranged to detect a value of the air pressure of the tire, or effect detection as to whether the air pressure is normal or not. Further, the vehicle-state detecting device is the speed detecting device to detect the rotating speed of the wheel, which is one form of a state of rotation of the wheel.

Where the air-pressure-state detecting device is arranged to detect the value of the air pressure of the wheel tire, the estimated-air-pressure-information obtaining portion may be arranged to estimate the value of the tire air pressure, or to effect estimation as to whether the tire air pressure is normal or not. Where the air-pressure-state detecting device is arranged to effect detection as to whether the tire air pressure is normal or not, the estimated-air-pressure-information obtaining portion may be arranged to estimate the value of the tire air pressure, or effect estimation as to whether the tire air pressure is normal or not. These possible combinations of the air-pressure-state detecting device and the estimated-air-pressure-information obtaining portion are applicable to the modes which will be described.

(36) A wheel-state obtaining apparatus according to any one of the above modes (1)–(35), wherein the first-wheel-state detecting device includes a temperature-state detecting device operable to detect a state of a temperature of a tire of each of at least one of the plurality of wheels, and the vehicle-state detecting device includes a running-time/distance detecting device operable to detect at least one of a cumulative running time and a cumulative running distance of the vehicle, the estimated-information obtaining device including an estimated-temperature-state-information obtaining portion operable to estimate the state of the temperature of the tire of each of the above-indicated at least one of the plurality of wheels, on the basis of at least one of the cumulative running time and distance detected by the running-time/distance detecting device, to obtain estimated-temperature-state information representative of the estimated state of the temperature.

In the wheel-state obtaining apparatus according to the above mode (36), the temperature state of the tire of the wheel in question is detected by the temperature-state detecting device, as the first state of the wheel. The temperature-state detecting device may be arranged to detect a value of the temperature of the tire, or effect detection as to whether the tire has been overheated (whether the tire temperature is higher than a predetermined upper limit). The tire temperature rises with an increase in the total or cumulative running time or distance of the vehicle. Thus, the present wheel-state obtaining apparatus may be referred to as "a tire-temperature-state obtaining apparatus", or "a tire-temperature obtaining apparatus".

The temperature state of the tire may be estimated on the basis of the cumulative running time or distance of the vehicle after an ignition switch of the vehicle has been turned on. The temperature of the tire is higher when the cumulative running time or distance is relatively long, than when it is relatively short. It is possible to determine that the tire has been overheated, if the cumulative running time or distance of the vehicle has exceeded a predetermined threshold.

The cumulative running time or distance of the vehicle may be obtained on the basis of the running state of the vehicle. In this sense, the vehicle-state detecting device is considered to include a running-state detecting device operable to detect the running state of the vehicle. The cumulative running time of the vehicle may be a sum of times after the ignition switch has been turned on and during which the running speed of the vehicle is higher than a predetermined value. The cumulative running distance may be a sum of running distances after the ignition switch has been turned on. The temperature of the tire is higher when the number of repetitions of acceleration and deceleration of the vehicle is relatively large than when it is relatively small. Accordingly, the temperature state of the tire may be estimated by taking into account the accelerating and decelerating states of the vehicle.

The vehicle-state detecting device may include a rotation-state detecting device operable to detect a rotating state of the wheel. On the basis of the rotating speed of the wheel, which is one form of the state of rotation of the wheel, the vehicle running speed and distance can be obtained.

(37) A wheel-state obtaining apparatus according to any one of the above modes (1)–(36), wherein the first-wheel-state detecting device includes a temperature-state detecting device operable to detect a state of a temperature of a tire of each of at least one of the plurality of wheels, and the vehicle-state detecting device includes (a) a load detecting device operable to detect a load acting on each of the above-indicated at least one of the plurality of wheels, (b) a running-state detecting device operable to detect a running state of the vehicle, and (c) an ambient-temperature detecting device operable to detect an ambient temperature of the vehicle, the estimated-information obtaining device including an estimated-temperature-state-information obtaining portion operable to estimate the state of the temperature of the tire of each of the above-indicated at least one of the plurality of wheels, on the basis of the detected load acting on the above-indicated each wheel and the detected ambient temperature and running state of the vehicle, to obtain estimated-temperature-state information representative of the estimated state of the temperature.

The load detecting device may be arranged to directly detect a load acting on each wheel, or estimate the load on the basis of the vehicle weight, and the vehicle attitude (which may be estimated from the running condition of the vehicle). Alternatively, the load detecting device is arranged to estimate the wheel load, on the basis of a relative distance between a unsprung member and a sprung member of the wheel, for each wheel. The relative distance may be detected by a floor-level sensor arranged to detect the floor level of the vehicle. The temperature of the tire tends to be higher when the average load acting on the wheels is relatively large than when it is relatively small. The tire temperature also tends to be higher when the ambient temperature of the vehicle is relatively high than when it is relatively low, and when the cumulative running time or distance obtained on the basis of the running state of the vehicle is relatively long than when it is relatively short.

The accuracy of the estimated information is low when the ambient temperature of the vehicle has abruptly changed due to starting of the vehicle from a garage or running into a tunnel, or when a change of the wheel loads is excessively large. In such cases, it is desirable to determine the detected information as the wheel-state information. Where the temperature state of the wheel is estimated on the basis of the ambient temperature or the wheel load, as described above, the estimated temperature state may abruptly change. However, the actual temperature of the tire will not immediately change with a change in the environment. Accordingly, it is possible to determine the detected information as the wheel-state information when the change of the ambient temperature is larger than a threshold, and/or when the change of the wheel load is larger than a threshold.

A determination as to whether the change of the wheel load is larger than the threshold may be effected on the estimated load value or the actually detected load value. However, the determination may be effected on the basis of the condition of the roadway surface on which the vehicle is running. The roadway surface condition may be obtained on the basis of the rotating speeds or acceleration values of the wheels, or states of changes of relative distances between the unsprung and sprung members of the vehicle. Where the roadway surface is found to be bad, it is possible to determine that the change of the wheel loads is larger than the threshold.

(38) A wheel-state obtaining apparatus according to any one of the above modes (1)–(37), wherein the first-wheel-state detecting device includes a force-detecting device operable to detect at least one force acting on each of at least one of the plurality of wheels, and the vehicle-state detecting device includes at least one of (a) a driving-state detecting device operable to detect a driving state of the vehicle, (b) a braking-state detecting device operable to detect a braking state of the vehicle, and (c) a turning-state detecting device operable to detect a turning state of the vehicle, the esti-mated-information obtaining device including an estimated-force-information obtaining portion operable to estimate the above-indicated at least one force acting on each of the above-indicated at least one of the plurality of wheels on the basis of at least one of the detected accelerating, braking and turning states of the vehicle, to obtain estimated-force information representative of the estimated at least one force.

In the wheel-state obtaining apparatus according to the above mode (38), at least one force acting on the wheel in question is detected, so that the present wheel-state obtaining apparatus may be referred to as "a tire-force detecting apparatus". The at least one force acting on the tire of the wheel in question is the first state of the wheel. The force-detecting device may be arranged to detect at least one of forces acting on the wheel tire in the lateral, longitudinal and vertical directions of the vehicle.

The driving-state detecting device may include at least one of a drive-system-state detecting device operable to detect an operating state of a drive system of the vehicle; a power-transmission-system-state detecting device operable to detect an operating state of a power-transmission system of the vehicle; and an accelerating-member-state detecting device operable to detect an operating state of an accelerating member (e.g., accelerator pedal). On the basis of the driving state of the vehicle, the drive torque transmitted to each drive wheel of the vehicle and a rotating state of the drive shaft can be obtained, and the forces acting on the drive wheels in the longitudinal direction of the vehicle can be estimated.

The braking-state detecting device may includes at least one of: a braking-force detecting device operable to detect a braking force or braking torque applied to each wheel; and a braking-member-state detecting device operable to detect an operating state of a brake operating member (e.g., a brake pedal). Where the vehicle is provided with a braking device of friction type arranged to force a friction member onto a rotor rotating with each wheel, to thereby brake the wheel, the braking-state detecting device may include a device operable to detect a braking force applied from the friction member to the rotor. Where the braking device of friction type is a hydraulically operated braking device having a wheel brake cylinder, the braking-state detecting device may be arranged to detect a hydraulic pressure applied to the wheel brake cylinder, or a hydraulic pressure equivalent to the wheel brake cylinder pressure, such as a hydraulic pressure in a master cylinder. The braking-state detecting device can detect the braking state of the vehicle, on the basis of which the force acting on the wheel in the longitudinal direction of the vehicle can be estimated.

The turning-state detecting device may be arranged to detect the turning or cornering state of the vehicle, on the basis of the steering angle of the steering wheel of the vehicle and the running speed of the vehicle. Alternatively, the turning-state detecting device is arranged to detect the turning state on the basis of a yaw rate of the vehicle, the lateral acceleration of the vehicle, an operating state of a front or rear steering device, or a steering angle of the wheel in question. The turning-state detecting device may include at least one of; a steering angle sensor; a vehicle-speed sensor; a yaw rate sensor; and a lateral-acceleration sensor. The turning-state detecting device can estimate the force acting on the wheel in question in the lateral direction.

The force acting on the wheel in the longitudinal direction can be obtained on the basis of the driving and braking states of the vehicle, while the force acting on the wheel in the lateral direction (which may be a force acting on the wheel in a direction perpendicular to the longitudinal direction of the vehicle, or a cornering force acting on the wheel in a direction perpendicular to the running direction of the vehicle) can be obtained on the basis of the turning state (steering state) of the vehicle. The force acting on the wheel in the vertical direction may be obtained on the basis of the vehicle weight and the vehicle attitude (which may be obtained on the basis of the vehicle running states such as the driving, braking and turning states). For example, the forces acting on the rear wheels in the vertical direction are relatively large when the vehicle is in a driving or accelerating state and the forces acting on the front wheels in the vertical direction are relatively large when the vehicle is in a braking state. Further, the forces acting on the right wheels or left wheels are relatively large in a turning state of the vehicle, depending upon the direction in which the vehicle is turning.

On the basis of the forces acting on the wheels in the longitudinal, lateral and vertical directions, it is possible to obtain the friction coefficient of the roadway surface, and the corning power and self-aligning torque of the vehicle.

The determining device may be arranged to determine the detected information as the wheel-state information, during a traction control or an anti-lock braking control, for example, in view of a fact that it is difficult to estimate with high accuracy the force acting on each wheel in the longitudinal direction, on the basis of the driving and braking states of the vehicle, while the driving forces or braking forces applied to the individual wheels are controlled independently of each other.

(39) A wheel-state obtaining apparatus comprising:

a wheel-side device provided for each of at least one of a plurality of wheels of a vehicle and including (a) a first-wheel-state detecting device operable to detect a first state of the above-indicated corresponding wheel, and (b) a wheel-side-information transmitting device operable to transmit, in a wireless fashion, wheel-side information representative of the first state of the above-indicated corresponding wheel detected by the first-wheel-state detecting device; and a body-side device disposed on a body of the vehicle and including (c) a receiving device operable to receive the wheel-side information transmitted from the wheel-side device, (d) a detected-information obtaining device operable to obtain received-information representative of the first state of the above-indicated corresponding wheel, from the wheel-side information received by the receiving device, (e) a vehicle-state detecting device operable to detect a state of the vehicle, (f) an estimated-information obtaining device operable to estimate the first state of the above-indicated corresponding wheel, on the basis of at least the state of the vehicle detected by the vehicle-state detecting device, and obtain estimated information representative of the estimated first state, and (g) an obtaining-device selecting portion operable to select one of the estimated-information obtaining device and the detected-information obtaining device.

The received-information may be referred to as "detected information".

The wheel-state obtaining apparatus according to the above mode (39) may incorporate any of the technical features described above with respect to the foregoing modes (1)–(38).

(40) A wheel-state obtaining apparatus comprising:

a wheel-side device provided for each of at least one of a plurality of wheels of a vehicle and including (a) a first-wheel-state detecting device operable to detect a first state of the corresponding wheel, and (b) a wheel-side-information transmitting device operable to transmit, in a wireless fashion, wheel-side information representative of the first state of the above-indicated corresponding wheel detected by the first-wheel-state detecting device; and a body-side device disposed on a body of the vehicle and including (c) a receiving device operable to receive the wheel-side information transmitted from the wheel-side device, (d) a detected-information obtaining device operable to obtain detected-information representative of the first state of the corresponding wheel, from the wheel-side information received by the receiving device, (e) a vehicle-state detecting device operable to detect a state of the vehicle, and (f) an estimated-information obtaining device operable, when the wheel-side information has not been received by the receiving device, to estimate the first state of the above-indicated corresponding wheel, on the basis of at least the state of the vehicle detected by the vehicle-state detecting device, and obtain estimated information representative of the estimated first state.

In the wheel-state obtaining apparatus according to the above mode (40), the first state of the wheel in question is estimated on the basis of the detected state of the vehicle, when the wheel-side information has not been received by the receiving device.

The present wheel-state obtaining apparatus may incorporate any of the technical features described above with respect to the foregoing modes (1)–(39).

(41) A vehicle-state obtaining apparatus comprising:

a remote detecting device including a first detecting device, and a transmitting device operable to transmit, in a wireless fashion, first-detecting-device information including information indicative of an output of the first detecting device; and an information processing device including (a) a remote-information obtaining device including a receiving device operable to receive the first-detecting-device information transmitted in a wireless fashion from the remote detecting device, the remote-information obtaining device being operable to obtain remote information representative of a state of the vehicle, on the basis of the first-detecting-device information received by the receiving device, (b) a wire-transmission-dependent-information obtaining device including a second detecting device and operable to obtain wire-transmission-dependent information representative of the state of the vehicle, on the basis of second-detecting-device information which has been transmitted from the second detecting device through a signal line and which includes information indicative of an output of the second detecting device, and (c) an information determining device operable to determine one of the wire-transmission-dependent information and the remote information, as vehicle-state information representative of the state of the vehicle.

In the vehicle-state obtaining apparatus according to the above mode (41), the first-detecting-device information including the information indicative of the output of the first detecting device is transmitted in a wireless fashion (by radio communication) to the receiving device of the information processing device. When the first-detecting-device information has been received by the receiving device, the remote information representative of a state of the vehicle is obtained on the basis of the received first-detecting-device information. On the other hand, the second-detecting-device information including the information indicative of the output of the second detecting device is transmitted through the signal line to the wire-transmitted-information obtaining device. On the basis of the received second-detecting-device information, the wire-transmission-dependent-information obtaining device obtains the wire-transmission-dependent information representative of the state of the vehicle. The information determining device is arranged to determine or select one of the remote information and the wire-transmission-dependent information as the vehicle-state information representative of the state of the vehicle. In the present apparatus, the information representative of the state of the vehicle can be obtained, even in the event of an abnormality or failure of one of the remote-information obtaining device and the wire-transmission-dependent-information obtaining device.

The first and second detecting devices are provided to obtain the information on which the remote information and the wire-transmission-dependent information which represent the state of the vehicle are to be obtained. These first and second detecting devices may be arranged to detect values or quantities indicative or representative of the state of the vehicle, or to obtain data on which the state of the vehicle can be estimated. In other words, the first-detecting-device information received by the receiving device of the remote-information obtaining device may be direct information which directly represents the state of the vehicle, or original information which can be used to estimate the state of the vehicle. Where the receiving device receives the original information, the remote-information obtaining device estimates the state of the vehicle on the basis of the original information, to obtain estimated information. Similarly, the second-detecting-device information supplied to the wire-transmission-dependent-information obtaining device through the signal line may be direct information or original information. Accordingly, the information determining device may be arranged to select: one of the direct information, and the estimated information obtained on the basis of the original information (more precisely, one of the direct remote information and the estimated wire-transmission-dependent information, or one of the estimated remote information and the direct wire-transmission-dependent information); one of the estimated remote information and the estimated wire-transmission-dependent information; and one of the direct remote information and the direct wire-transmission-dependent information.

The remote detecting device may be disposed on a rotary member of the vehicle, such as the wheels. However, this arrangement is not essential. Where the first detecting device is disposed at a position at which it is difficult to connect the first detecting device to the information processing device through a signal line, the first-detecting-device information is desirably transmitted to the information processing device, in a wireless fashion or by radio waves. For example, the first-detecting-device information is transmitted to the information processing device, in a wireless fashion, where the first detecting device is disposed on a stationary member located close to the corresponding wheel, or where the information processing device is provided on a tractor vehicle while the remote detecting device including the first detecting device is provided on a towed vehicle connected to the tractor vehicle.

The vehicle-state obtaining apparatus according to the above mode (41) may incorporate any of the technical features according to the above modes (1)–(39).

(42) A vehicle-state obtaining apparatus according to the above mode (41), wherein the first detecting device is operable to detect one state of the vehicle as the above-indicated state of the vehicle, while the second detecting device is operable to detect another state of the vehicle which is different from the above-indicated one state, and the wire-transmission-dependent-information obtaining device includes an estimating portion operable to estimate the above-indicated one state of the vehicle on the basis of the above-indicated another state of the vehicle detected by the second detecting device.

The first detecting device is arranged to detect one state of the vehicle. The remote information obtained on the basis of the first-detecting-device information indicative of the output of the first detecting device may be referred to as "direct information" or "detected information". On the other hand, the second detecting device is arranged to detect another state of the vehicle, which is different from the above-indicated one state of the vehicle. The first state of the vehicle is estimated on the basis of the second-detecting-device information indicative of the output of the second detecting device, and information indicative of the estimated one state of the vehicle is obtained. The second-detecting-device information obtained from the second detecting device may be referred to as "original information", and the information indicative of the estimated one state of the vehicle may be referred to as "estimated information" or "indirect information".

Even where the first detecting device is located at a position at which one state of the vehicle can be directly detected by the first detecting device, it may be difficult to connect the first detecting device to the information processing device through a signal line. On the other hand, the second detecting device may be located at a position at which the above-indicated one state of the vehicle cannot be directly detected by the second detecting device, and at which another state of the vehicle that can be used to estimate the above-indicated one state can be detected by the second detecting device. The second detecting device located at this position can be relatively easily connected to the information processing device through a signal line, so that the second-detecting-device information can be obtained by the information processing device through the signal line.

In the vehicle-state obtaining apparatus according to the above mode (42), the first-detecting-device information obtained by directly detecting the above-indicated one state of the vehicle is supplied to the information processing device in a wireless fashion, while the original information used for estimating the one state of the vehicle is supplied through a signal line. While the first-detecting-device information transmitted in a wireless fashion or by radio communication accurately represents the one state of the vehicle, the estimated information obtained by estimating the one state on the basis of the original information (second-detecting-device information) supplied through the signal line does not represent the one state of the vehicle as accurately as the first-detecting-device information transmitted by radio communication. On the other hand, the original information supplied through the signal line can be received by the wire-transmission-dependent-information obtaining device with a high degree of stability, than the first-detecting-device information. Thus, the information processing device obtains the two kinds of information, namely, the first-detecting-device information (detected information) and the second-detecting-device information (original information) which have different degrees of accuracy and stability, and one of these two kinds of information is selected by the information determining device of the information processing device, depending upon the specific situation of the vehicle.

(43) A vehicle-state obtaining apparatus according to the above mode (41) or (42), wherein the remote detecting device is provided on a sprung member of the vehicle, while the information processing device is provided on an unsprung member of the vehicle.

The sprung member is a member fixed to the axles of the front and rear wheels of the vehicle, and may be selected from among the wheels, members of a suspension system, members of a braking system, and members of a wheel-steering system.

The unsprung member is a member supported by suspension springs, and may be selected from among members of the vehicle body and frame, members of a vehicle drive system, and members of a power-transmission system.

The information transmitted from the remote detecting device may be referred to as "sprung-member information", while the information supplied through the signal line from the second detecting device may be referred to as "unsprung-member information".

(44) A vehicle-state obtaining apparatus according to any one of the above modes (41)–(43), wherein the remote detecting device is provided on a wheel of the vehicle.

(45) A vehicle-state obtaining apparatus according to any one of the above modes (41–(44), wherein the information determining device is operable to determine the wire-transmission-dependent information as the vehicle-state information, when the remote information has not been received by the remote-information obtaining device.

(46) A wheel-state indicating apparatus comprising:
a wheel-state obtaining apparatus as defined in any one of the above modes (1)–(40);
a judging device operable to determine whether the first state of the above-indicated corresponding wheel is normal or not; and
an indicator device operable, when the judging device determines that the first state of the above-indicted corresponding wheel is not normal, to provide an indication that the first state is not normal.

The indicator device includes an alarming portion which is operated upon determination that the first state of the wheel in question, for example, tire air pressure of the wheel, is not normal. The alarming portion is arranged to inform the operator of the vehicle that the first state of the vehicle is not normal. The indicator device may include an indicating portion in addition to the alarming portion. The indicating portion is arranged to indicate the detected first state of the wheel in question. The indicating portion may be arranged to provide an indication only when the firs state is normal, or irrespective of whether the first state is normal or abnormal.

The indicator device need not be a device exclusively provided to indicate the first state of the wheel, but may be an indicator device provided in any other device such as a navigation system.

The present wheel-state indicating apparatus may be adapted to indicate the state of the vehicle obtained by a vehicle-state obtaining apparatus according to any one of the above modes (40)–(44).

(47) A vehicle-state controlling apparatus comprising:
a wheel-state obtaining apparatus as defined in any one of the above modes (1)–(40);
an actuator portion operable to control a state of the vehicle; and
an actuator control portion operable to control the actuator portion on the basis of the first state of the corresponding wheel obtained by the wheel-state obtaining apparatus.

The actuator portion may be a braking control actuator operable to control a braking state of the vehicle, a driving control actuator operable to control a drive system of the vehicle, a steering control actuator operable to control a wheel-steering system of the vehicle, or a suspension control actuator operable to control a suspension system of the vehicle.

The first state of the wheel in question is used as main control information or auxiliary control information, when the actuator portion is controlled on the basis of the first state of the wheel. On the basis of the first state of the wheel, either a control target used for controlling the actuator portion may be determined, or alternatively a control rule or a control threshold value used for controlling the actuator portion may be changed. On the firs state of the wheel, it is possible to estimate the friction coefficient of the roadway surface, or effect estimation as to whether the vehicle is in a critical state, for example. It is advantageous to control the appropriate actuator portion on the basis of the first state of the wheel.

The present vehicle-state control apparatus may include an indicator device.

The present vehicle-state control apparatus may be adapted to control the state of the vehicle on the basis of the vehicle-state obtaining apparatus according to any one of the above modes (40)–(44).

(48) A wheel-state controlling apparatus comprising:
a wheel-state obtaining apparatus as defined in any one of the above modes (1)–(40);
an actuator portion operable to control the first state of the above-indicated corresponding wheel; and
an actuator control portion operable to control the actuator portion such that the first state of the above-indicated corresponding wheel obtained by the wheel-state obtaining apparatus is held within a predetermined range.

For example, the actuator portion includes an air source capable of applying a compressed air into the tire of the wheel in question, and a control valve operable to regulate an amount of flow of the compressed air from the air source into the tire. The actuator control portion may be arranged to control the actuator portion such that the air pressure of the tire is held within a predetermined optimum range, or such that the air pressure is raised when the air pressure has been lowered below a predetermined lower limit.

The present wheel-state control device may include an indicator device. The wheel-state control device may be adapted to control the state of the wheel in question on the basis of the state of the vehicle obtained by a vehicle-state obtaining apparatus according to any one of the above modes (40)–(44).

BEST MODE FOR CARRYING OUT THE INVENTION

Some embodiments of a wheel-state obtaining apparatus of this invention will be described in detail by reference to the drawings. The wheel-state obtaining apparatus is one form of a vehicle-state obtaining apparatus. In the illustrated embodiments, an air pressure in each wheel tire of a vehicle is detected as a state of the vehicle, and a state of the wheel.

Figure 1:
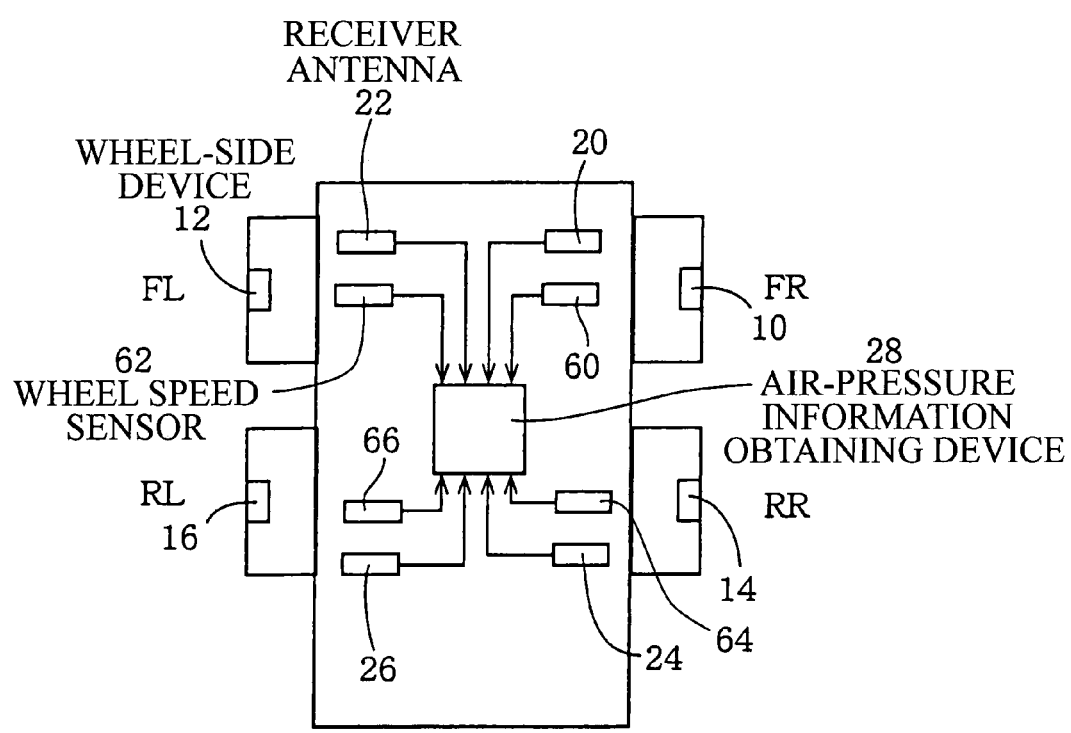
FIG. 1 is a view schematically showing a wheel-state obtaining apparatus according to one embodiment of the present invention.
Figure 2:
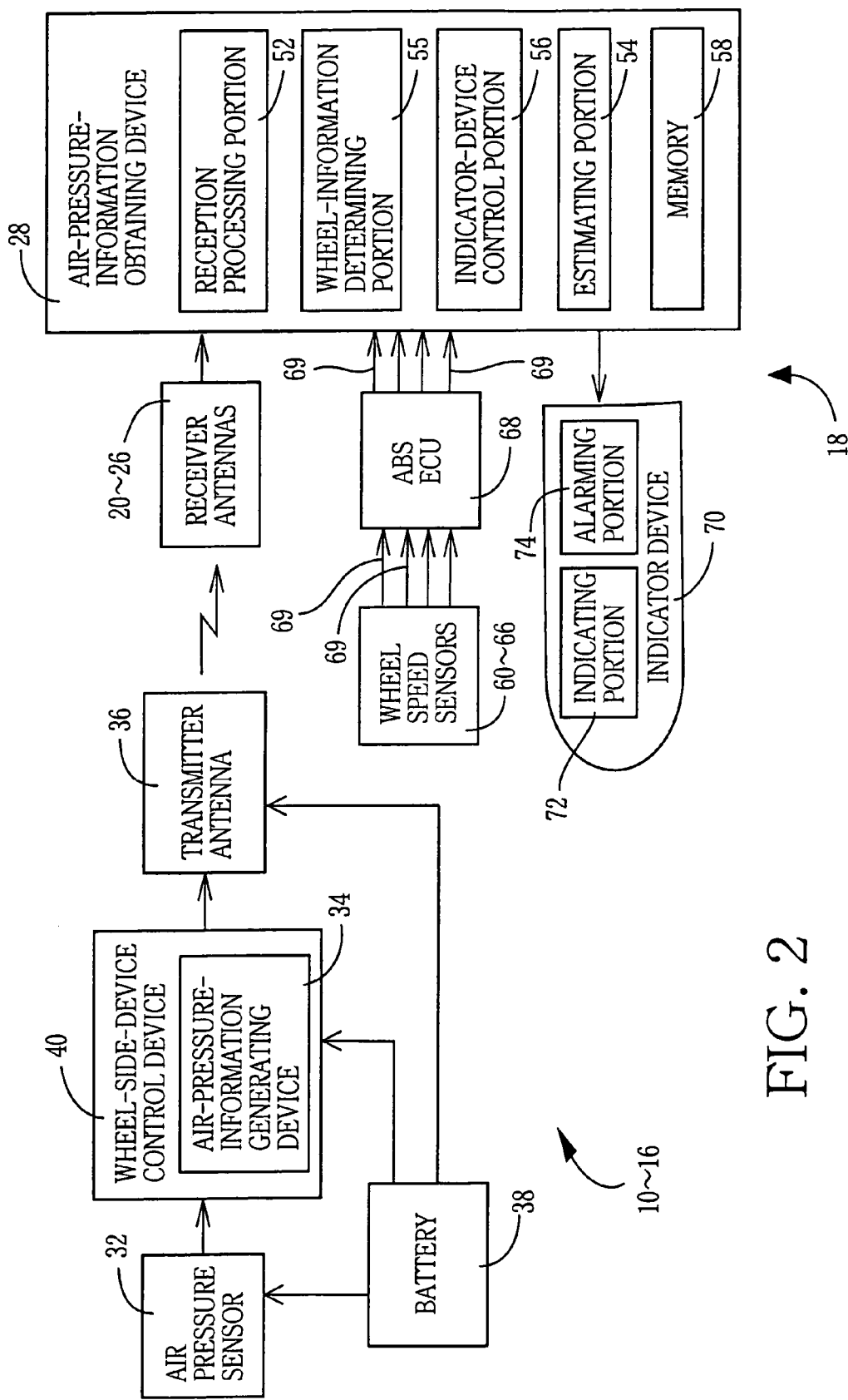
FIG. 2 is a block diagram illustrating wheel-side devices and a body-side device of the above-indicated wheel-state obtaining apparatus.

An air-pressure detecting apparatus provided as a wheel-state obtaining apparatus is provided with wheel-side devices 10, 12, 14 and 16 for a front right wheel FR, a front left wheel FL, a rear right wheel RR and a rear left wheel RL of a vehicle, respectively, as shown in FIGS. 1 and 2. The vehicle has a body which is provided with a body-side device 18. The body-side device 18 includes four receiver antennas 20, 22, 24 and 26 corresponding to the respective four wheel-side devices 10–16, and an air-pressure-information obtaining device 28 which is arranged to receive information from the wheel-side devices 10–16 through the receiver antennas 20–26. The wheel-side devices 10–16 have the same construction, and only the wheel-side device 10 corresponding to the front right wheel FR will be described. The description of this wheel-side device 10 applies to the other wheel-side devices 12–16.

Figure 3:
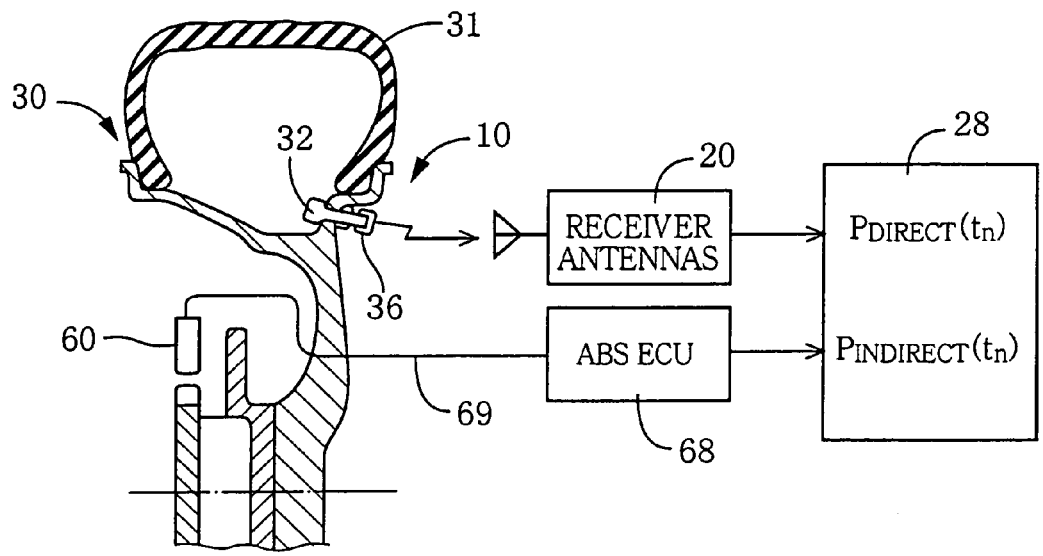
FIG. 3 is a view schematically indicating a vicinity of one of the wheel-side devices of the wheel-state obtaining apparatus.

As shown in FIG. 3, the wheel-side device 10 for the front right wheel FR is provided on a wheel 30 of the vehicle, and includes an air pressure sensor 32 operable to detect the air pressure within a tire 31 of the wheel 30, a tire-information generating device in the form of an air-pressure-information generating device 34, a transmitter antenna 36, and an electric power source in the form of a battery 38. In the present embodiment, the state of the air pressure of the tire 31 is handled as a first state of the wheel 30, and the air pressure sensor 32 functions as a first-wheel-state detecting device operable to detect a first-wheel-state quantity in the form of the air pressure of the tire 31. The air-pressure-information generating device 34 is arranged to generate information indicative or representative of the air pressure detected by the air pressure sensor 32, and the transmitter antenna 36 is arranged to transmit this information, in a wireless fashion, namely, by radio communication with the body-side device 18 through the receiver antenna 20. The air-pressure-information generating device 34 is one element of a wheel-side-device control device 40. The wheel-side device 10 is operated to transmit the information representative of the detected air pressure (which is information relating to the wheel FR, and may be referred to as "wheel-side information") at a predetermined time interval.

The air pressure sensor 32, air-pressure-information generating device 34 and transmitter antenna 36 are supplied with an electric energy received from the battery 38.

Like the wheel-side device 10, the wheel-side devices 12, 14, 16 transmit information representative of the air pressure values of the tires of the corresponding wheels FL, RR, RL, in the same manner as described above. In principle, the four wheel-side devices 10–16 are operated to transmit the information at respective different points of time, but at a predetermined time interval. Namely, the moments of transmission of the information from the wheel-side devices 10–16 are different or shifted from each other by a suitable length of time, but the transmission of the information from each wheel-side device 10–16 is repeated at the predetermined time interval.

The receiver antennas 20–26 are disposed on respective portions of the vehicle body which are located near the corresponding wheels FR, FL, RR, RL. These receiver antennas 20–26 are connected to the air-pressure-information obtaining device 28 of the body-side device 18. The air-pressure-information obtaining device 28 is principally constituted by a computer, and includes a reception processing portion 52 serving as a detected-information obtaining device, an estimating portion 54 serving as an estimated-information obtaining device, a wheel-information determining portion 55 serving as a wheel-state determining device, an indicator-device control portion 56, and a memory 58 serving as a memory portion. To the air-pressure-information obtaining device 28, there are connected wheel speed sensors 60, 62, 64, 66 operable to detect rotating speeds of the respective wheels FR, FL, RR, RL. These wheel speed sensors 60–66 are attached to suitable members of the vehicle body, so as to detect the rotating speeds of rotors which rotate with the respective wheels. The information representative of the speeds detected by the wheel speed sensors 60–66 is not transmitted by radio communication, but is supplied to the air-pressure-information obtaining device 28 through signal wires 69 and through an electronic control unit ECU 68 (for instance, an electronic anti-lock control unit ABS ECU 68 of a braking system of the vehicle). That is, the wheel speed sensors 60–66 are electrically connected to the air-pressure-information obtaining device 28 through the signal lines 69, as indicated in FIG. 2.

In the present embodiment, the rotating state of each wheel is a state of the vehicle, which is a second wheel state different from the above-described first wheel state (tire air pressure). A second wheel-state quantity indicative of the second wheel state is detected by the wheel speed sensors 60–66 which serves as a second-wheel-state detecting device and a vehicle-state detecting device.

The reception processing portion 52 is arranged to extract the air-pressure information representative of the detected air pressure, from the wheel-side information received through the receiver antennas 20–26, and obtain detected-air-pressure information representative of the tire air pressure of each wheel directly detected by the corresponding air pressure sensor 32. In this respect, the detected-air-pressure information may be referred to as "directly obtained information". The detected-air-pressure information may be referred to as "received information" since it is received through the receiver antennas 20–26, and may also be referred to as "radio-transmitted information" or "wireless-transmitted information" since it is transmitted by radio waves. Further, the detected-air-pressure information is information relating to the wheels which are unsprung members, the detected-air-pressure information may be referred to as "unsprung-portion information". The detected-air-pressure information indicates the detected values of the air pressure of the wheel tires 31, and may be abbreviated as "detected information" where appropriate.

The estimating portion 54 is arranged to estimate the air pressure values of the wheel tires, on the basis of the wheel speeds detected by the wheel speed sensors 60–66.

There is a known relationship between the amount of change of the spring constant of the tire 31 and the amount of change of the tire air pressure. The estimating portion 54 estimates the amount of change of the spring constant on the basis of a plurality of sets of speed data of the wheel in question, more precisely, on the basis of resonance frequency obtained by frequency analysis of the speed data sets of the wheel, or by utilizing an external-disturbance observer.

In the present embodiment, the estimating portion 54 estimates the tire air pressure on the basis of a plurality of sets of speed data of the wheel in question, and according to the known relationship described above. The estimating portion 54 compensates the thus estimated air pressure on the basis of the detected air pressure value of the wheel tire in question, and obtains estimated-air-pressure information representative of the estimated air pressure thus compensated. The air pressure value estimated on the basis of the speed data sets of the wheel and according to a predetermined rule such as the known relationship described above will be hereinafter referred to as "a provisional estimated value" of the air pressure, while the provisional estimated value compensated on the basis of the detected value obtained on the basis of the output of the pressure sensor 32 will be referred to as "a final estimated value". In a broad sense, the provisional estimated value and the final estimated value are both estimated values, and the information representative of the provisional estimated value and the information representative of the final estimated value are both estimated-air-pressure information. In a narrow sense, however, only the final estimated value is considered to be the estimated value, and only the information representative of this final estimated value is considered to be the estimated-air-pressure information. The estimated-air-pressure information (which may be abbreviated as "estimated information", where appropriate), which is not directly detected, may be referred to as "indirectly obtained information". Since the wheel speed values are represented by output signals of the wheel speed sensors 60–66 which are fed to the air-pressure information obtaining device 28 through the signal lines 69, the estimated information may be referred to as "wire-transmission-dependent information (cable-transmission-dependent information)".

The term "air-pressure information" used hereinafter means information representative of an air pressure of the tire 31, the magnitude of which is referred to as "an air pressure value".

The wheel-information determining portion 55 is arranged to determine either one of the detected information and the estimated information as the air-pressure information. Described more specifically, the wheel-information determining portion 55 determines the detected information as the air-pressure information where the wheel-side information has been normally received through the receiver antenna 20–26. If the wheel-side information has not be normally received through the receiver antenna 20–26 at a predetermined timing of reception, the wheel-information determining portion 55 determines the estimated information as the air-pressure information at a predetermined timing of calculation during a period of reception of the wheel-side information, as described below in greater detail.

The indicator-device control portion 56 is arranged to determine whether the air pressure value represented by the air-pressure information obtained by one of the reception processing portion 52 and the estimating portion 54 is lower than a predetermined threshold value, and controls the indicator device 70 on the basis of a result of the determination. The indicator-device control portion 56 effects the determination on the basis of the detected air pressure value represented by the detected information or the estimated air pressure value represented by the estimated information. The indicator-device control portion 56 may be considered to function as a judging portion operable to determine whether the detected or estimated air pressure value is normal or not.

The indicator device 70 includes an indicating portion 72 arranged to indicate the air pressure value, and an alarming portion 74 arranged to generate a warning or alarming signal. The indicating portion 72 indicates the information received from the indicator-device control portion 56, and the alarming portion 74 is operated when the air pressure value represented by the received information is lower than the threshold value.

As described above, the receiver antennas 20–26 receive the wheel-side information at the predetermined time interval (reception time interval) to obtain the detected air-pressure information, while the wheel-side devices 10–16 transmit the wheel-side information at the predetermined time interval (transmission time interval).

Where the reception processing portion 52 cannot obtain the detected-air-pressure information for a certain one of the wheels, the indicator-control portion 56 determines the estimated-air-pressure information as the air-pressure information. For instance, the indicator-control portion 56 determines the estimated-air-pressure information as the air-pressure information, if the corresponding receiver antenna 20, 22, 24, 26 has not received the wheel-side information during the present period of reception following the last moment of reception of the wheel-side information according to the predetermined transmission or reception interval, due to an abnormality of the receiver antenna 20–26 or a noise received by the receiver antenna, or if the corresponding wheel-side device 10, 12, 14, 16 has not transmitted the wheel-side information during the present period of transmission following the last moment of transmission of the wheel-side information. In this respect, the reception interval (period of reception) and the transmission interval (period of transmission) are considered to be the same as long as the receiver antennas 20–22 are normal and are free from a noise.

Figure 4:
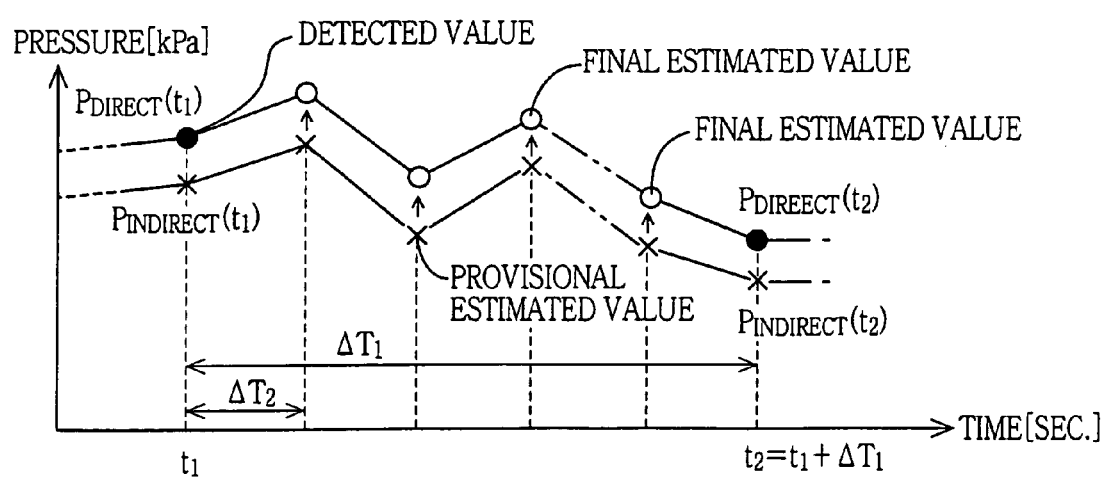
FIG. 4 is a view air pressure values obtained by the wheel-state obtaining apparatus.

While the provisional estimated value and the detected value of the air pressure which have been described are usually coincident with each other, there may be a difference between these two values, as indicated in FIG. 4. This difference may be corrected (zeroed or reduced) according to a ratio of the provisional estimated value and the detected value to each other or the difference per se. Namely, the provisional estimated value is compensated into the final estimated value, on the basis of the above-indicated ratio or difference used as a compensation coefficient or amount.

In view of the above, the present embodiment is arranged such that the ratio of the provisional estimated value and the detected value represented by the detected-air-pressure information is obtained as the compensation coefficient when the information is received. The present embodiment is further arranged to update this ratio each time the detected information is received, that is, to update the ratio on the basis of the last detected information, so that the provisional estimated value is compensated into the final estimated value, on the basis of the ratio determined on the basis of the last detected information. Thus, the present embodiment is arranged such that the air pressure value estimated on the basis of the detected wheel speed and according to the predetermined rule is compensated into the final estimated value, on the basis of the last detected air pressure value. In other words, the compensating coefficient is updated on the basis of the last detected air pressure value, and the provisional estimated value of the air pressure is compensated into the final estimated value on the basis of the thus updated compensation coefficient. Accordingly, the final estimated value thus obtained is made close to the actual air pressure value. It can also be said that the rule of estimation of the air pressure value on the basis of the detected wheel speed is changed or determined on the basis of the compensation coefficient or last detected value.

Although the present embodiment is arranged to update the compensation coefficient each time the detected air-pressure information is obtained, this arrangement is not essential. For example, the compensation coefficient may be updated each time the detected-air-pressure information has been received a predetermined number of times. Alternatively, the compensation coefficient may be made equal to an average of a plurality of ratio values of the detected value and the provisional estimated value.

Figure 5:
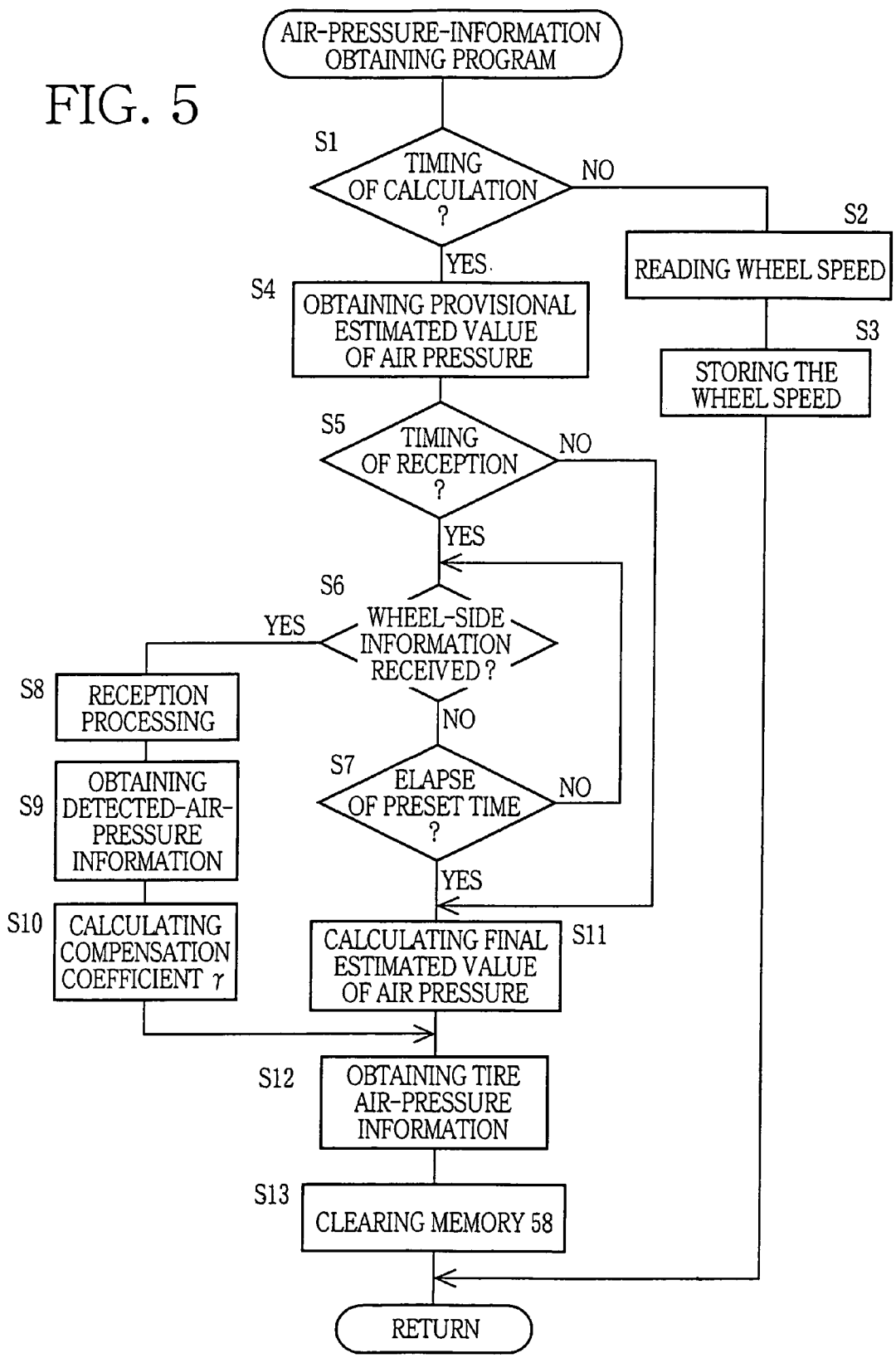
FIG. 5 is a flow chart illustrating an air-pressure-information obtaining program stored in the body-side device.

The air-pressure-information obtaining device 28 is arranged to execute an air-pressure-information obtaining program illustrated in the flow chart of FIG. 5, with a predetermined cycle time, for each of the wheels FR, FL, RR, RL independently of each other, since the reception timings of the wheel-side information of the four wheels are different from each other.

The air-pressure-information obtaining program is initiated with step S1 to determine whether the present point of time is the predetermined timing of calculation of the provisional estimated value of the air pressure, that is, one of predetermined moments of calculation of the provisional estimated value.

In the present invention, the calculation of the provisional estimated value is effected at the predetermined moments of calculation represented by $t_1, {}_t1+\Delta T_2, t_1+2\Delta T_2, \ldots t_1+k\Delta T_2$, as indicated in FIG. 4. The calculation period or interval is $\Delta T_2$, so that an affirmative decision (YES) is obtained in step S1 each time the calculation period $\Delta T_2$ has passed. In FIG. 4, "$t_1$" and "$t_2$" indicate the timing of reception of the wheel-side information, while "$\Delta T_1$" indicates the reception period or interval, so that an affirmative decision (YES) is obtained in step S5 (which will be described) each time the reception period $\Delta T_1$ has passed.

The calculation period $\Delta T_2$ is a fraction of the reception interval or period $\Delta T_1$, more precisely, equal to $\Delta T_1/n$, where "n" is an integer. Therefore, each moment of reception of the wheel-side information is the moment of calculation of the provisional estimated value, so that there exist a plurality of moments (n−1) of calculation during the reception interval $\Delta T_1$. The calculation interval $\Delta T_2$ is determined to be long enough to permit a sufficiently large number of sets of data of the wheel speed to be received to estimate the air pressure. The wheel speed data set is received through the electronic anti-lock control unit ABS ECU 68 at a predetermined time interval.

If a negative decision (NO) is obtained in step S1, the control flow goes to steps S2 and S3 to read the wheel speed and store the wheel speed in a memory portion in the form of the memory 58.

If an affirmative decision (YES) is obtained in step S1, the control flow goes to step S4 to obtain the provisional estimated value of the air pressure on the basis of a plurality of wheel speed values which are stored in the memory 58 and which include the wheel speed value stored last in step S1.

Then, the control flow goes to step S5 to determine whether the present point of time is one of the moments of reception of the wheel-speed information. If an affirmative decision (YES) is obtained in step S5, the control flow goes to steps S6 and S7 to determine whether the wheel-side information has been received through the corresponding receiver antenna 20, 22, 24, 26 within the preset time. If an affirmative decision (YES) is obtained in step S6, the control flow goes to steps S8 and S9 to process the received wheel-side information, for thereby obtaining the detected-air-pressure information indicative or representative of the detected air pressure value.

Step S9 is followed by step S10 to calculate the compensation coefficient γ, namely, a ratio γ of the provisional estimated value $P_{INDIRECT}(t_1)$ and the detected value $P_{DIRECT}(t_1)$ which have been obtained at substantially the same moment as the moment at which the detected-air-pressure information was obtained. That is, the ratio γ is $P_{DIRECT}(t_1)/P_{INDIRECT}(t_1)$. As described below, a difference "s" between the provisional estimated value $P_{INDIRECT}(t_1)$ and the detected value $P_{DIRECT}(t_1)$ may be used as the compensation coefficient γ. Namely, the difference "s" is equal to $P_{DIRECT}(t_1)$ minus $P_{INDIRECT}(t_1)$.

The control flow then goes to step S12 to determine the detected air pressure as the tire air pressure value, and to step S13 to clear the memory 58 for erasing the wheel speed data stored therein.

If the wheel-side information has not been received by the receiver antenna until the preset time has elapsed after the predetermined timing of reception, an affirmative decision (YES) is obtained in step S7, and the control flow goes to step S11 to obtain the final estimated value $P(t_1+k\Delta T_2)$ according to the following equation (1) or (2), on the basis of the compensation coefficient γ and the provisional estimated value $P_{INDIRECT}(t_1)$:

$$P(t_1+k\Delta T_2)=\gamma \times P_{INDIRECT}(t_1+k\Delta T_2) \quad (1)$$

$$P(t_1+k\Delta T_2)=s+P_{INDIRECT}(t_1+k\Delta T_2) \quad (2)$$

While the affirmative decision (YES) is obtained in step S1 and a negative decision (NO) is obtained in step S5, the step S11 is also implemented.

Step S11 is followed by step S12 in which the final estimated value is determined as the tire air pressure. In the present embodiment, the final estimated value is obtained if the present point of time is not one of the moments of reception of the wheel-side information, or if the wheel-side information has not been received within the present time (or if the information representative of the first-wheel-state quantity or tire air pressure has not been received due to absence or defect of the wheel-side information or due to abnormality of the receiver antenna 20–26, for example).

Where the wheel-side devices 10–16 are arranged to transmit the air-pressure information at different transmission intervals, the shortest transmission interval is used as the reception interval or period $\Delta T_1$, and the calculation period or interval $\Delta T_2$ is determined to a fraction of the shortest transmission interval.

Figure 6:
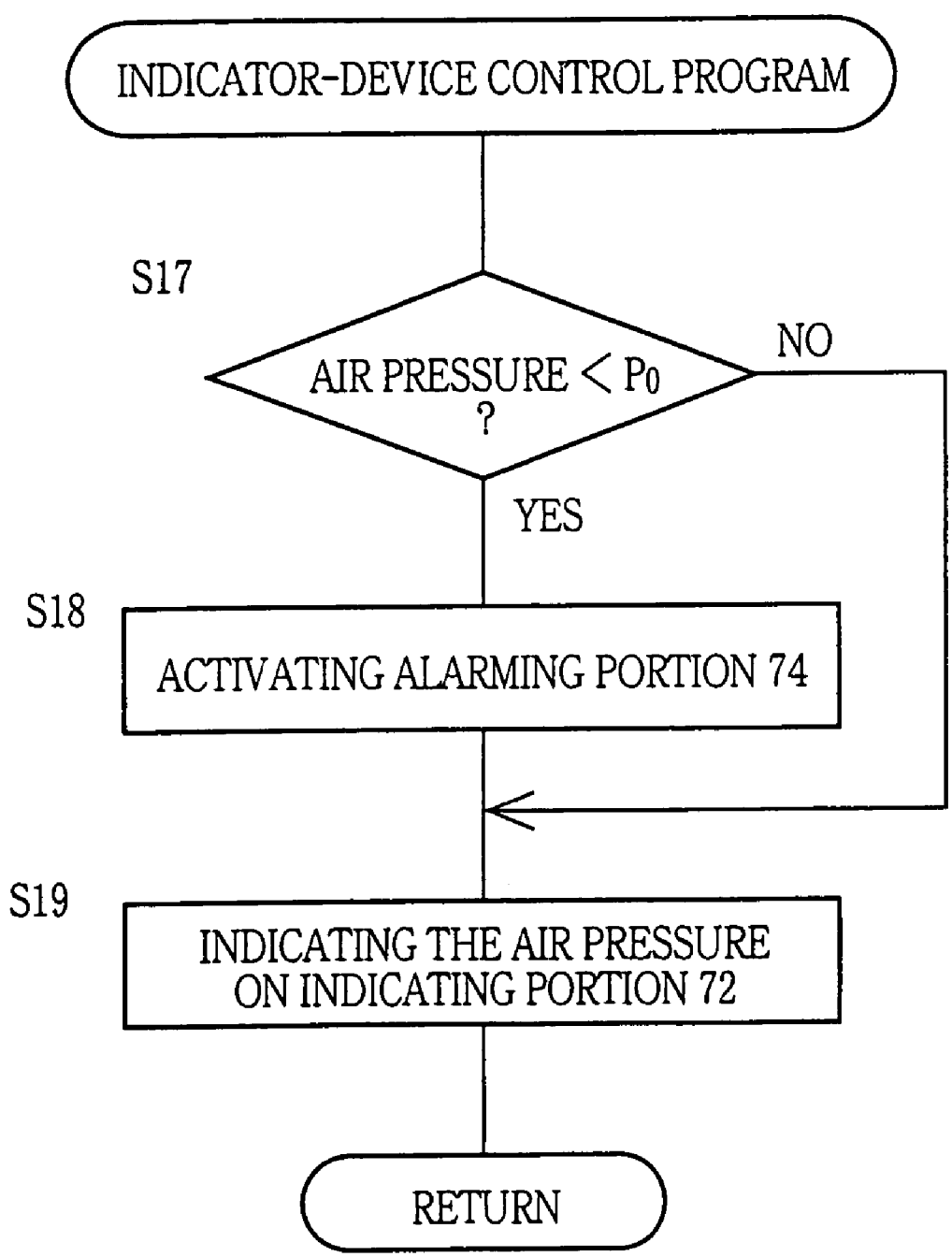
FIG. 6 is a flow chart illustrating an indicator-device control program stored in the body-side device.

On the basis of the air pressure value thus obtained, the indicator device 70 is controlled according to an indicator-device control program illustrated in the flow chart of FIG. 6. That is, when the air pressure value is lower than a predetermined threshold value P0, an affirmative decision (YES) is obtained in step S17 of the flow chart of FIG. 6, and the control flow goes to steps S18 and S19 to activate the alarming portion 74 of the indicator device 70 and active the indicating portion 72 to indicate the obtained air pressure value. When the air pressure value is not lower than the threshold value P0, a negative decision (NO) is obtained in step S17, and the control flow goes to step S19 while skipping step S18, so that the detected air pressure is indicated on the indicating portion 72, without activation of the alarming portion 74.

As described above, the present embodiment is arranged to estimate the tire air pressure of a wheel on the basis of the wheel speed, if the air pressure cannot be detected on the basis of the output of the pressure sensor 32. Further, the air pressure is also estimated while the negative decision (NO) is obtained in step S5. Thus, the detected-air-pressure information or the estimated-air-pressure information is determined as the air-pressure information, for each of the wheels, so that the transmission period or interval $\Delta T_1$ of the wheel-side devices 10–16 can be made relatively long, whereby the rate of reduction of the electric energy amount stored in the battery 38 can be lowered, resulting in a prolonged service life of the battery 38. Further, the present embodiment makes it possible to obtain the air pressure value of each wheel even in the event of a failure or abnormality of the wheel-side devices 10–16, receiver antennas 20–26, or even in the event of failure to obtain the detected-air-pressure information due to a noise received by the receiver antenna 20–26. The air pressure value can be obtained at least at the predetermined reception interval $\Delta T_2$, which is determined by the predetermined transmission interval $\Delta T_1$.

Further, the provisional estimated value of the air pressure is compensated on the basis of the last detected air pressure value, to obtain the final estimated value which is sufficiently close to the actual air pressure value. The present embodiment is arranged such that if the detected air pressure value is not obtained in the present cycle, the provisional estimated value obtained in the present cycle is compensated into the final estimated value, on the basis of the last detected air pressure value obtained at the last moment of reception of the wheel-side information by the receiver antenna 20–26, so that the final estimated value is obtained on the basis of the last detected air pressure value.

It will be understood from the foregoing description of the present embodiment that a portion of the air-pressure-information obtaining device 28 assigned to implement steps S8 and S9 of the flow chart of FIG. 5 constitutes a detected-air-pressure-information obtaining device in the form of the reception processing portion 52, while a portion of the obtaining device 28 assigned to implement steps S2–S4 and S11 constitutes an estimated-air-pressure-information obtaining device in the form of the estimating portion 54. It will also be understood that the estimated-air-pressure-information obtaining device also functions as a reception-failure estimated-air-pressure-information obtaining portion operable to obtain the estimated air pressure information when the detected-air-pressure information cannot be received, and also functions as a detected-state estimating portion operable to compensate the provisional estimate value on the basis of the last detected air pressure value, to obtain the final estimated value. It will further be understood that a portion of the air-pressure-information obtaining device 28 assigned to implement steps S5–S7 constitutes the wheel-information determining portion 55. Since this determining portion 55 determines one of the detected-air-pressure-information obtaining device and the estimated-air-pressure-information obtaining device, depending upon the determinations in steps S5–S7, the determining portion 55 may be referred to as "an information-obtaining-device determining device". The receiver antennas 20–26 may be considered to constitute a part of the reception processing portion 52.

Figure 31:
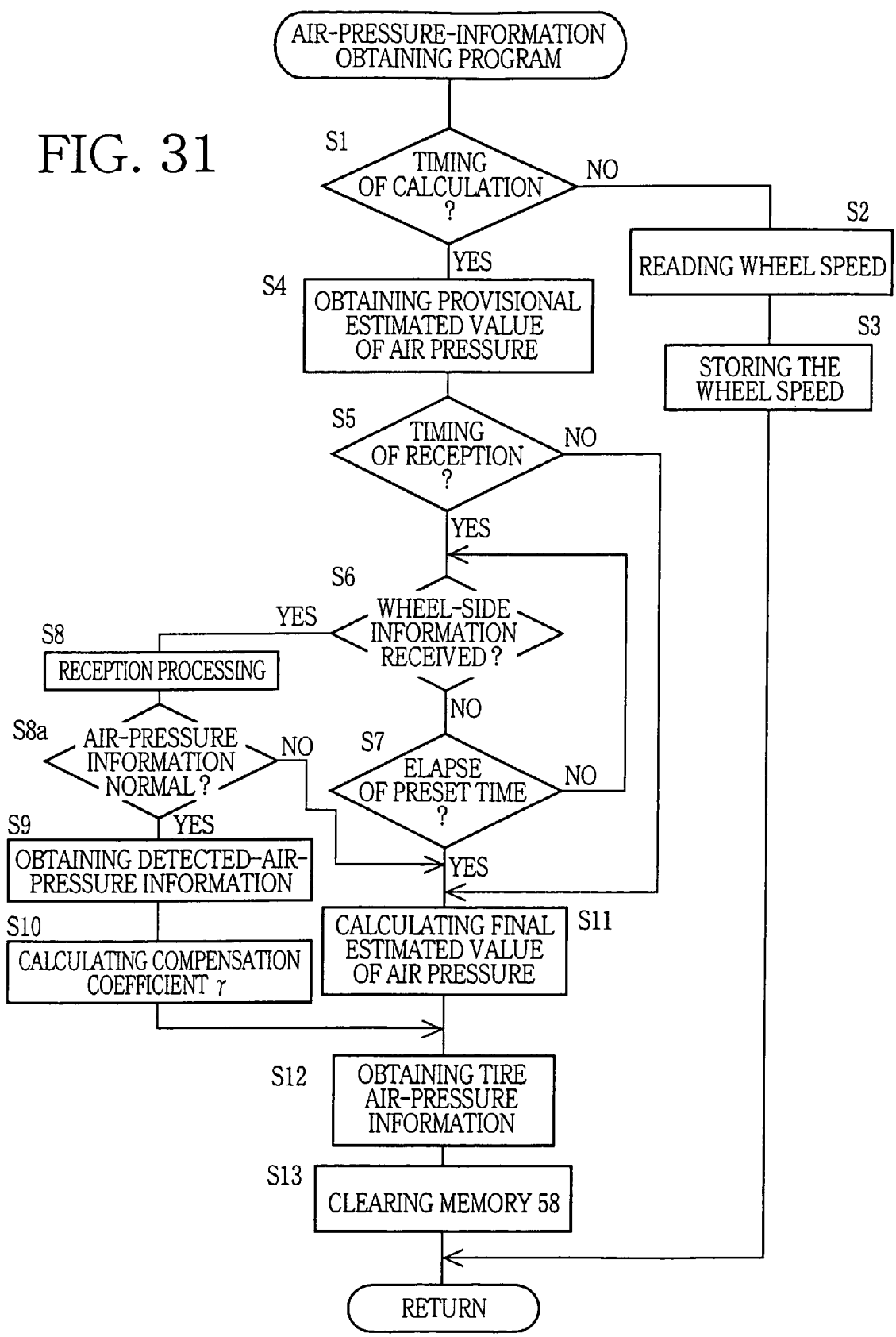
FIG. 31 is a flow chart illustrating an air-pressure-information obtaining program which is a modification of the program illustrated in the flow chart of FIG. 5.

In the embodiment of FIG. 5, the received wheel-side information is processed in step S8, and the detected-air-pressure information is obtained in step S9, on the basis of the processed wheel-side information. However, the air-pressure-information obtaining program of FIG. 5 may be replaced by an air-pressure-information obtaining program illustrated in the flow chart of FIG. 31. In the modified arrangement of FIG. 31, the step S8 in which the received wheel-side information is processed is followed by step S8a to determine whether the air pressure value represented by the processed air-pressure information is normal. If the air pressure value is determined to be abnormal, a negative decision (NO) is obtained in step S8a, and the control flow goes to step S11 to obtain the final estimated value. For instance, the negative decision is obtained in step S8a, if the air pressure value per se is abnormal due to an abnormality of the air pressure sensor 32. In this case, the detected-air-pressure information is not obtained in step S9, but the final estimated value is obtained in step S11, in the same manner as described above.

The detected-air-pressure-information obtaining device (reception processing portion 52) and the estimated-air-pressure-information obtaining device (estimating portion 54) may be constituted by a single computer or respective separate computers.

Similarly, the indicator-device control portion 56 may be constituted by a computer which constitutes the reception processing portion 52 and/or the estimating portion 54, or by a computer different from the computer or computers which constitute(s) the portion 52 and/or the portion 54. Where those portions 52, 54, 56 are constituted by respective separate computers, mutual data communication is effected among the separate computers, such that when a data-request signal is transmitted from one of the computers to the other computer or computers, this one computer receives necessary data from the other computer or computers, or such that predetermined kinds of updated or latest data are stored in an input-output interface of each computer, so that one of the computers can read in necessary data from the input-output interface of the other computer or computers. Thus, the mutual data communication is effected between one of the computers and the other computer or computers.

Figure 7:
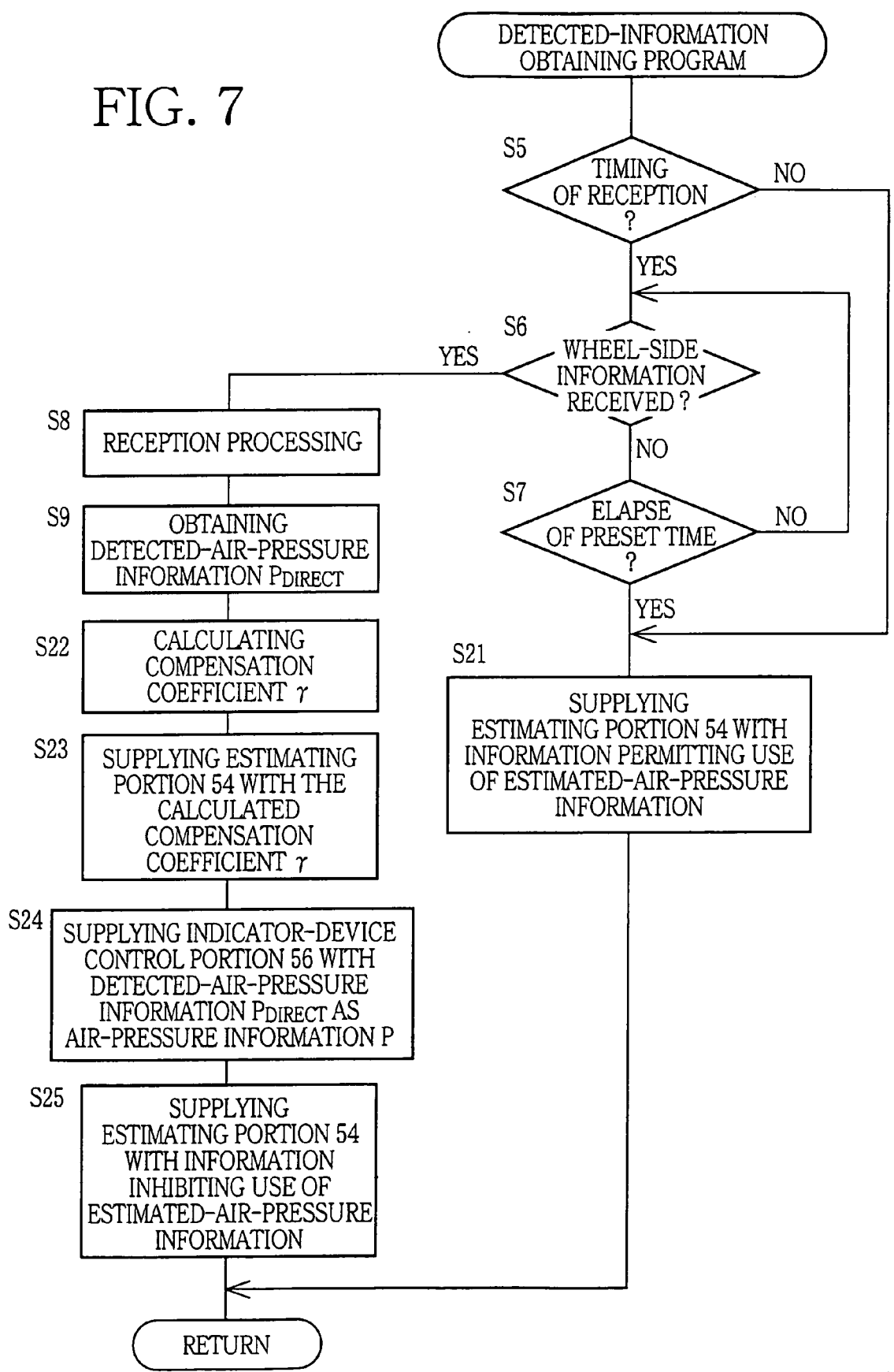
FIG. 7 is a flow chart illustrating a detected-information obtaining program stored in the body-side device of a wheel-state obtaining apparatus according to another embodiment of this invention.
Figure 8:
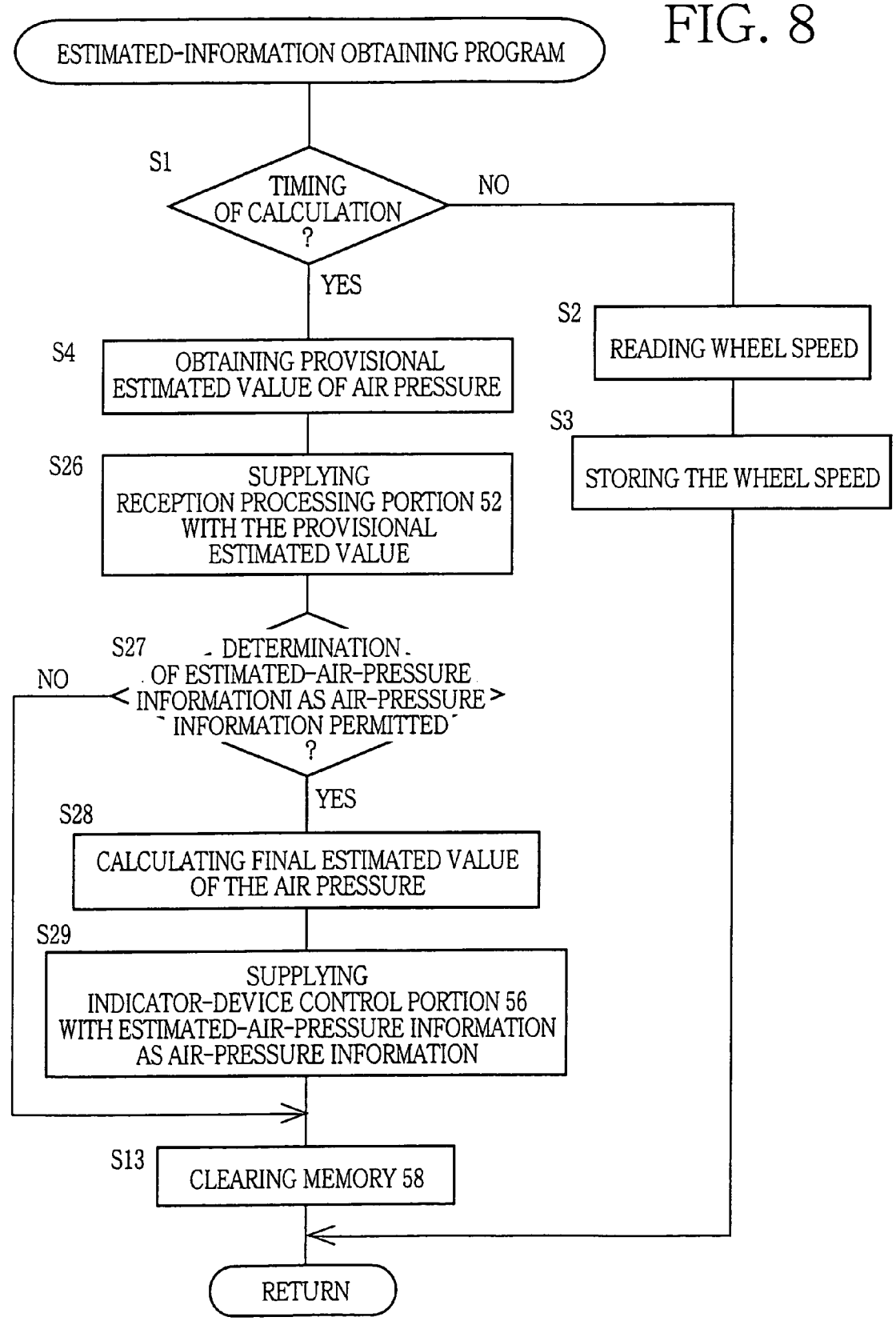
FIG. 8 is a flow chart illustrating an estimated-information obtaining program stored in the body-side device of the apparatus of FIG. 7.

Referring next to FIGS. 7 and 8, there will be described detected-information obtaining programs to obtain the detected-air-pressure information and an estimated-air-pressure-information obtaining program to obtain the estimated-air-pressure information, according to another embodiment of the present invention. The detected-information obtaining program of FIG. 7 is executed by the reception processing portion 52, while the estimated-information obtaining program of FIG. 8 is executed by the estimating portion 54. In the program of FIG. 7, step S21 is implemented to supply the estimating portion 54 with information permitting the use or determination of the estimated-air-pressure information as the air-pressure information, if the reception portion 52 has not received the wheel-side information, that is, if the negative decision is obtained in step S5, or if the wheel-side information has not been received within the present time. If the affirmative decision is obtained in step S6 within the preset time, the control flow goes to steps S8 and S9 to obtain the detected-air-pressure information, as described above, and then goes to steps S22 in which the compensation coefficient γ is obtained on the basis of the latest one of the provisional estimated values. Step S22 is followed by step S23 to supply the estimating portion 54 with the obtained compensation coefficient γ. Then, the control flow goes to step S24 to supply the indicator-device control portion 56 with the detected-air-pressure information $P_{DIRECT}$ as the air-pressure information P, and to step S25 to supply the estimating portion 54 with information inhibiting the use or determination of the estimated-air-pressure information $P_{INDIRECT}$ as the air-pressure information.

If the estimating portion 54 has been supplied with the information permitting the determination of the estimated-air-pressure information as the air-pressure information, an affirmative decision (YES) is obtained in step S27 of the program of FIG. 8, and the control flow goes to step S28 to calculate the final estimated value on the basis of the compensation coefficient γ received from the reception processing portion 52. Step S28 is followed by step S29 in which the indicator-device control portion 56 is supplied with the estimated-air-pressure information as the air-pressure information. If the estimating portion 54 has not been supplied with the information permitting the determination of the estimated-air-pressure information as the air-pressure information, a negative decision (NO) is obtained in step S27, and the final estimated value is not calculated.

It is noted that if the provisional estimated value is calculated in step S4 as described above, the control flow goes to step S26 in which the reception processing portion 52 is supplied with the calculated estimated value.

In the embodiment of FIGS. 7 and 8 described above, the information permitting or inhibiting the determination of the estimated-air-pressure information as the air-pressure information is supplied from the reception processing portion 52 to the estimating portion 54, so that one of the detected-air-pressure information and the estimated-air-pressure information is determined as the air-pressure information. In the present embodiment, a portion of the reception processing portion 52 assigned to implement steps S6 and S7 may be considered to constitute the wheel-information determining portion 55. In this case, the wheel-information determining portion 55 may be considered to be included in the reception processing portion 52. In the following embodiments, too, the estimated-air-pressure information and the detected-air-pressure information may be obtained by a single common computer or by respective separate computers.

The detected-air-pressure-information obtaining device may be constituted by a hardware circuit.

It is not essential to obtain the final estimated value of the air pressure by compensating the provisional estimated value. Namely, the provisional estimated value is obtained at a predetermined timing of calculation, and is determined as the air-pressure value. In this instance, steps S10 and S11 of the program of FIG. 5 are not necessary, and one of the provisional estimated value and the directly detected value is determined as the air pressure value. Similarly, steps S22 and S23 of the program of FIG. 7, and steps S26 and S28 of the program of FIG. 8 are not necessary.

It is not essential that the wheel-state obtaining apparatus according to the present invention is arranged to estimate the tire air pressure of each wheel of the vehicle. For instance, the wheel-state obtaining apparatus may be arranged to determine by estimation whether the air pressure of each wheel is normal or not. To the vehicle operator, information as to whether the air pressure of each wheel is normal or not is helpful. For example, the wheel-state obtaining apparatus is arranged to determine that the air pressure of each wheel is lower than a predetermined value (and is abnormal), if a ratio α of the speed of that wheel to an average speed of the four wheels is higher than a predetermined threshold value α0. The ratio α is calculated according to the following equation (3), and the air pressure of each wheel is determined to be abnormal, if the following inequality (4) is satisfied.

$$\alpha = Vwi/(\Sigma Vwi/4) \qquad (3)$$

$$\alpha > \alpha 0 \qquad (4)$$

When the tire air pressure of each wheel is relatively low, the effective radius of the wheel (tired wheel) is smaller than when the tire air pressure is relatively high, the rotating speed (angular velocity) of the wheel is higher when the air pressure is relatively low than when it is relatively high. The determination as to whether the tire air pressure of each wheel is normal or not is preferably effected while the vehicle is running straight at an almost constant speed.

Figure 9:
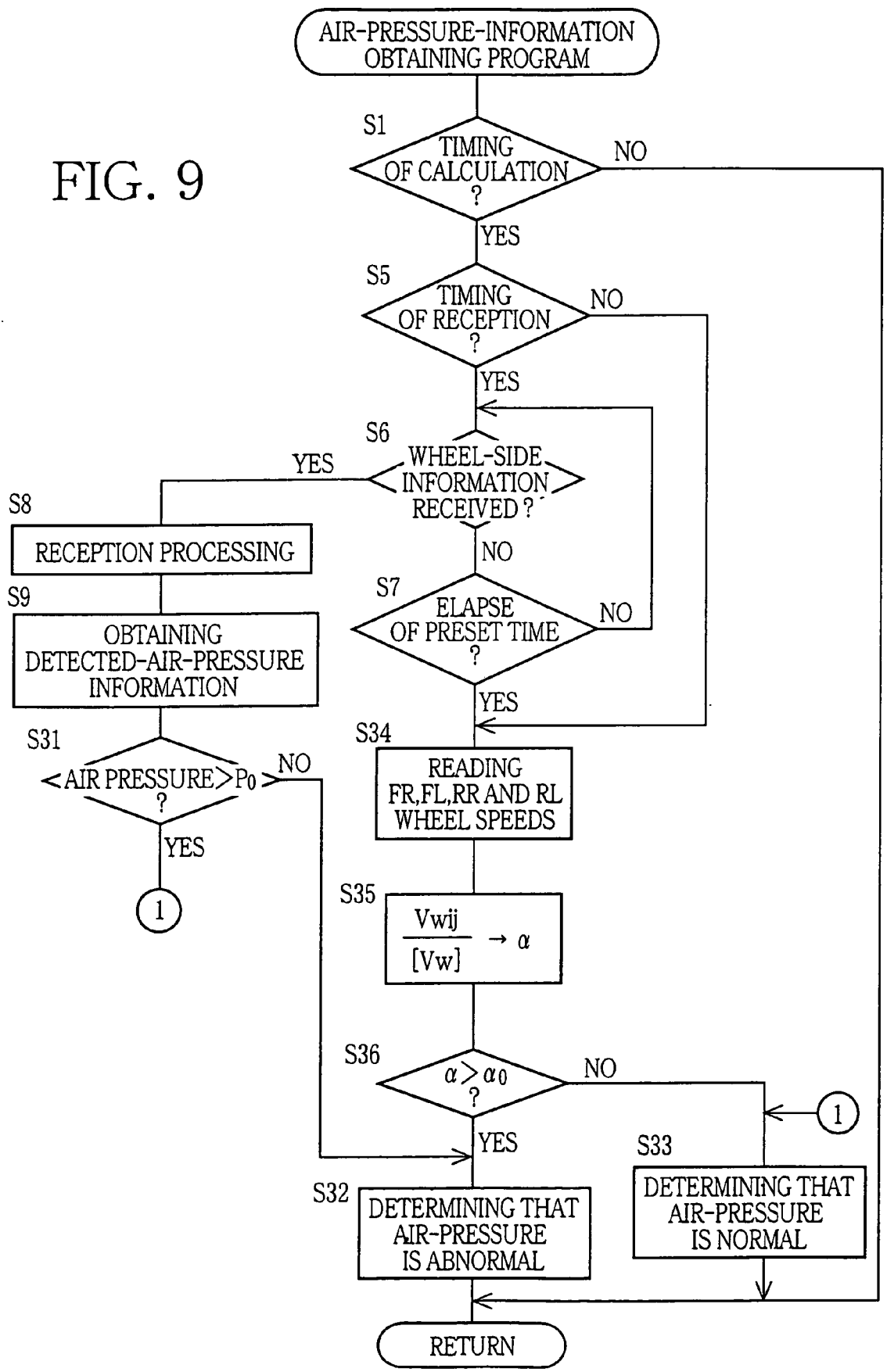
FIG. 9 is a flow chart illustrating an air-pressure-information obtaining program stored in the body-side device of a wheel-state obtaining apparatus according to a further embodiment of the invention.

The flow chart of FIG. 9 illustrates an air-pressure-information obtaining program according to a further embodiment of this invention, which is formulated to determine whether the tire air pressure of each wheel is normal or not. In this program, an affirmative decision(YES) is obtained in step S6 when the wheel-side information has been received through the corresponding receiver antenna 20, 22, 24, 26. In this case, the control flow goes to steps S8 and S9 to process the received wheel-side information and obtain the detected-air-pressure information. Step S9 is followed by step S31 to determine whether the air pressure represented by the detected-air-pressure information is higher than a threshold value P0. If the air pressure is equal to or lower than the threshold value P0, the control flow goes to step S32 to determine that the air pressure is abnormal. If the air pressure is higher than the threshold value P0, the control flow goes to step S33 to determine that the air pressure is normal.

If the negative decision (NO) is obtained in step S5, or if the wheel-side information has not been received by the antenna 20, 22, 24, 26 within the preset time (if the affirmative decision (YES) is obtained in step S7), the control flow goes to step S34 to read the speeds of the four wheels FR, FL, RR, RL, and then to step S35 to calculate the ratio α of the speed of the wheel in question to the average speed of all of the four wheels. Step S35 is followed by step S36 to determine whether the calculated ratio α is higher than the predetermined threshold value α0. If the ratio α is higher than the threshold value α0, the control flow goes to step S32 to determine that the air pressure of the wheel in question is abnormal. If the ratio α is not higher than the threshold value α0, the control flow goes to step S33 to determine that the air pressure of the wheel in question is normal.

Figure 10:
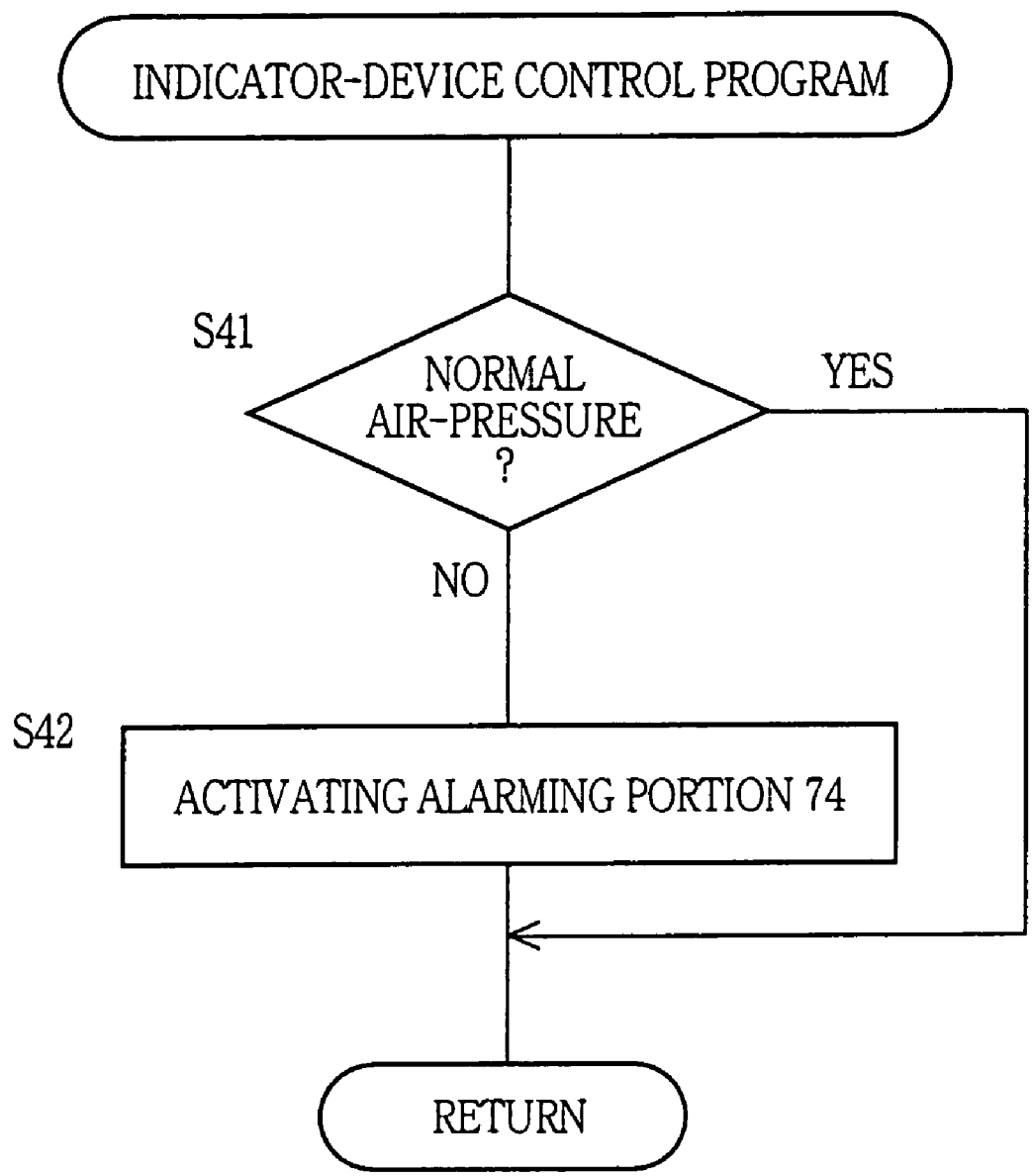
FIG. 10 is a flow chart illustrating an indicator-device control program stored in the body-side device of the apparatus of FIG. 9.

In the present embodiment, the indicator device 70 is controlled according to an indicator-device control program illustrated in the flow chart of FIG. 10. If the air pressure has been determined to be abnormal, a negative decision (NO) is obtained in step S41, and the control flow goes to step S42 to active the alarming portion 74. If the air pressure has been determined to be normal, an affirmative decision (YES) is obtained in step S41, and the alarming portion 74 is not activated.

Where the detected-air-pressure information is obtained, the detected air pressure value may be indicated on the indicating portion 72. For example, the indicating portion 72 keeps indicating the last detected air pressure value until the detected-air-pressure information is obtained at the next timing of reception of the wheel-side information. Where the detected air pressure value is determined to be abnormal, the alarming portion 74 is activated to generate a warning or alarming signal.

It is not essential to estimate the air pressure at the predetermined interval of reception of the wheel-side information. For instance, the air pressure is estimated only when the wheel-side information has not been received due to an abnormality of the corresponding receiver antenna 20, 22, 24, 26 or a noise received by the receiver antenna. In this instance, the estimated-air-pressure information rather than the detected-air-pressure information is determined as the air-pressure information. In the first and second embodiments of FIGS. 5–8, for example, the provisional estimated value is used as the air pressure value.

Figure 11:
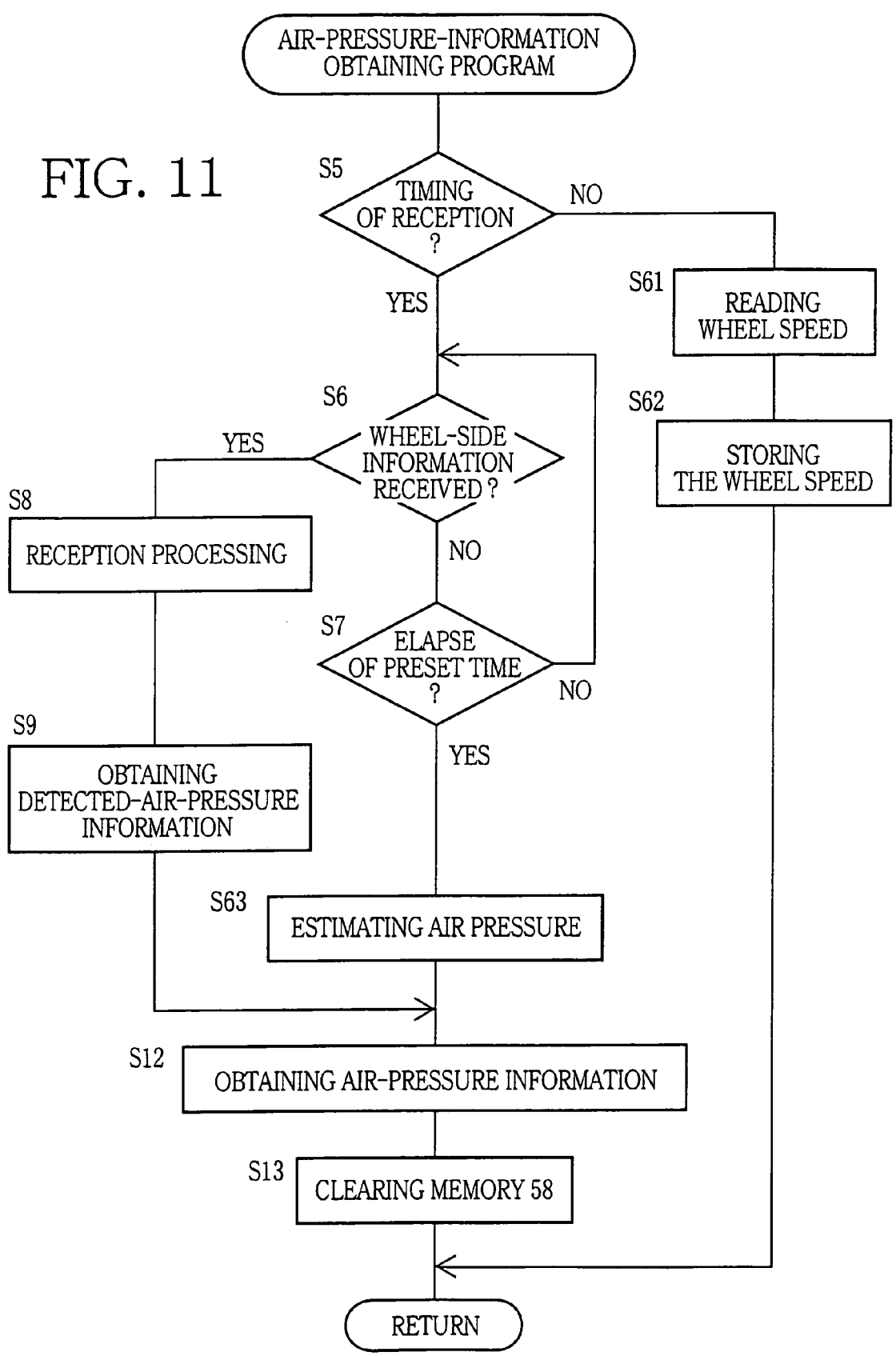
FIG. 11 is a flow chart illustrating an air-pressure-information obtaining program stored in a memory portion of the body-side device of a wheel-state obtaining apparatus according to a still further embodiment of this invention.

The flow chart of FIG. 11 illustrates an air-pressure-information obtaining program which is executed with a predetermined cycle time and which is formulated to estimate the air pressure only when the wheel-side information has not been received within the preset time. When the present point of time is not the predetermined timing of reception of the wheel-side information, the negative decision (NO) is obtained in step S5, and the control flow goes to steps S61 and S62 to read the wheel speed and store it in the memory 58. At the predetermined timing of reception of the wheel-side information, the control flow goes to steps S6 and S7 to determine whether the wheel-side information has been received within the preset time. If the wheel-side information has been received, the control flow goes to steps S8 and S9 to process the received wheel-side information and obtain the detected-air-pressure information. Step S9 is followed by step S12 to determine the detected-air-pressure information as the air-pressure information.

If the wheel-side information has not been received within the present time after the predetermined timing of reception of the wheel-side information, the control flow goes to step S63 to estimate the air pressure of the wheel in question on the basis of a plurality of wheel speed values stored in the memory 58, for thereby obtaining the estimated-air-pressure information. Step S63 is followed by step S12 in which the estimated-air-pressure information is determined as the air-pressure information. Thus, the air-pressure information is necessarily obtained at the predetermined timing of reception of the wheel-side information, even if the wheel-side information has not been obtained, that is, even if the affirmative decision (YES) is obtained in step S7.

Where the wheel-side information has not been received by the receiver antenna 20–26 within the preset time, due to an abnormality of the wheel-side device 10–16, step S12 to determine the estimated-air-pressure information as the air-pressure information is repeatedly implemented, with the affirmative decision (YES) being obtained in step S7 as long as the abnormality is eliminated.

In the present embodiment, a portion of the air-pressure-information obtaining device 28 assigned to implement step S63 of the program of FIG. 11 constitutes the reception-failure estimated-air-pressure-information obtaining portion described above. A portion of the program assigned to implement steps S5–S7 and S63 may be considered to constitute the reception-failure estimated-air-pressure-information obtaining portion.

The air pressure of each wheel may be estimated on the basis of the detected air pressure value of another wheel.

Between two wheels, there is a relationship in which a ratio $\beta$ of the rotating speeds (angular velocities) $\omega$ of the two wheels is equal to a reciprocal of a ratio of the air pressure values P of the two wheels. This relationship is represented by the following equation (5):

$$\beta = \omega j/\omega i = P'i/P*j \quad (5)$$

In the above equation (5), "i" and "j" represent the wheels FR, FL, RR and RL, and "P'" represents the estimated value while "P*" represents the detected value. The effective radius of a wheel (tired wheel) when the tire air pressure of the wheel is relative low is smaller than when the tire air pressure is relatively high, so that the rotating speed of the wheel is higher when the air pressure is relatively low than when it is relatively high. Accordingly, the air pressure P'i of one of the two wheels i and j can be estimated on the basis of the ratio $\beta$ of the speeds $\omega$ of the two wheels and the detected air pressure P*j of the other wheel, according to the following equation (6)

$$P'i = \beta \cdot P*j \quad (6)$$

Figure 12:
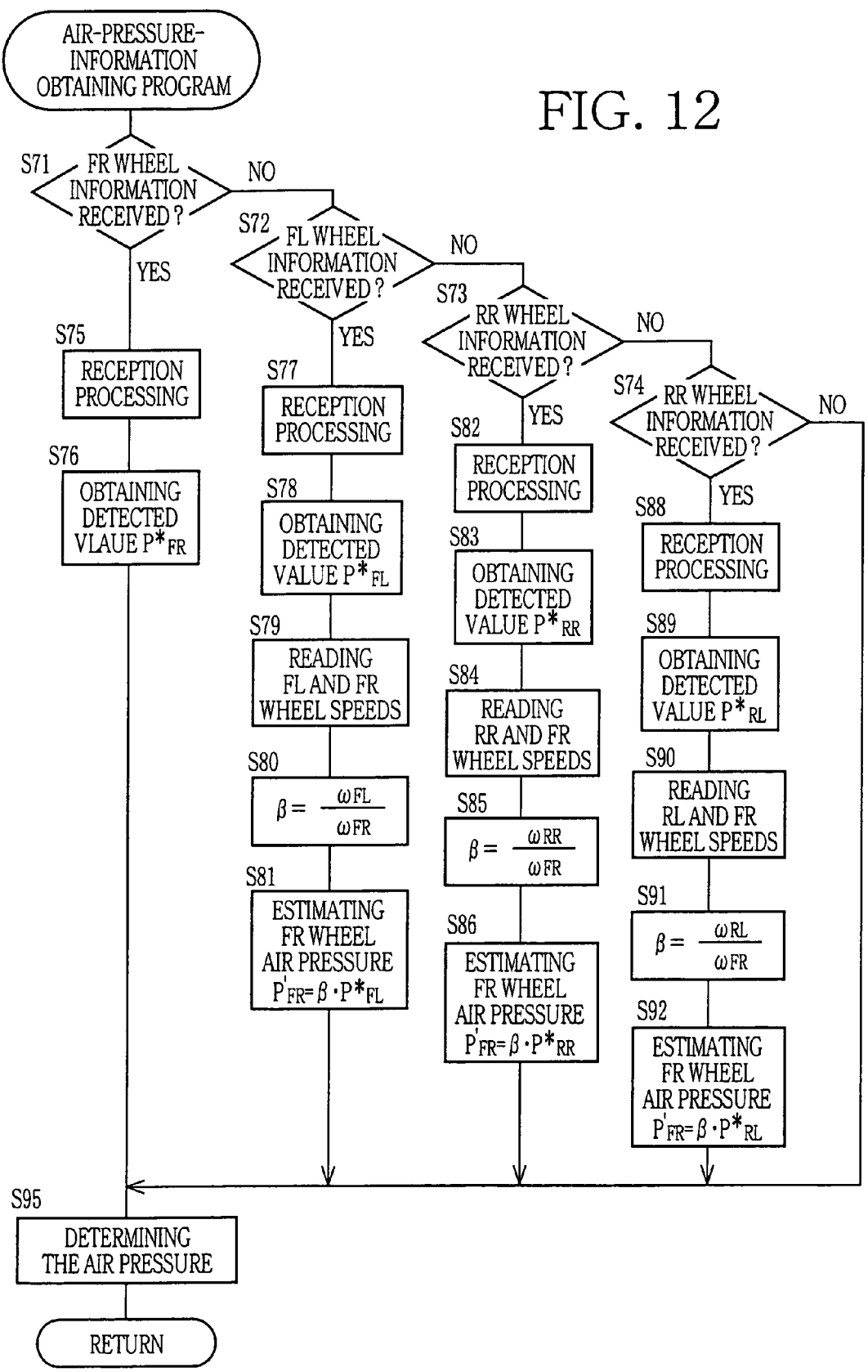
FIG. 12 is a flow chart illustrating an air-pressure-information obtaining program stored in a memory portion of the body-side device of a wheel-state obtaining apparatus according to a yet further embodiment of the invention.

In this case, an air-pressure-information obtaining program illustrated in the flow chart of FIG. 12 is executed with a predetermined cycle time. According to this air-pressure-information obtaining program, the air pressure P'i of one wheel i is estimated on the basis of the detected air pressure value P*j of another wheel j and the ratio $\beta$ of the detected speeds $\omega$ of the two wheels i and j. In the specific example of FIG. 12, the air pressure value $P'_{FR}$ of the front right wheel FR is estimated on the basis of the detected air pressure value $P*_{FL}$, $P*_{RR}$ or $P*_{RL}$ of the other wheels FL, RR, RL, as described below I detail.

The program is executed to determine in steps S71–S74 whether the wheel-side information has been received by the antennas 20–26 corresponding to the four wheels FR, FL, RR and RL. If the wheel-side information has been received by the receiver antenna 20 corresponding to the front right wheel FR, steps S75 and S76 are implemented to obtain the detected-air-pressure information, and step S95 is implemented to determine the obtained detected-air-pressure information as the air-pressure information.

If the wheel-side information has not been received by the receiver antenna 20 for the front right wheel FR, and if the wheel-side information has been received by the receiver antenna 22 for the front left wheel FL, an affirmative decision (YES) is obtained in step S72, and the control flow goes to steps S77 and S78 to process the received wheel-side information and obtain the detected-air-pressure information, and to steps S79 and S80 to obtain the ratio $\beta = \omega FL/\omega FR$ of the speeds of the two front wheels FR, FL. Step S80 is followed by step S81 to calculate the estimated air pressure value $P'_{FR}$ of the front right wheel FR on the basis of the ratio $\beta$ and the detected air pressure $P*_{FL}$ of the front left wheel FL, and according to the above-indicated equation (6). Then, the control flow goes to step S95 to determine the estimated air pressure value $P'_{FR}$ as the air pressure of the front right wheel FR.

If the wheel-side information has not been received by the antennas 20, 22 for the front right and left wheels FR, FL, and if the wheel-side information has been received by the receiver antenna 24 for the rear right wheel RR, steps S82–S86 similar to steps S77–S81 are implemented to calculate the estimated air pressure value $P'_{FR}$ of the front right wheel FR on the basis of the detected air pressure value $P*_{RR}$ of the rear right wheel RR and the ratio $\beta$ of the speeds of the wheels FR and RR.

If the wheel-side information has not been received by the receiver antennas 20, 22, 24 for the wheels FR, FL and RR, and if the wheel-side information has been received by the receiver antenna 26, steps S88–S92 similar to steps S77–S81 are implemented to calculate the estimated air pressure value $P'_{FR}$ of the front right wheel FR on the basis of the detected air pressure value $P*_{RL}$ of the rear left wheel RL and the ratio $\beta$ of the speeds of the wheels FR and RL.

Figure 13:
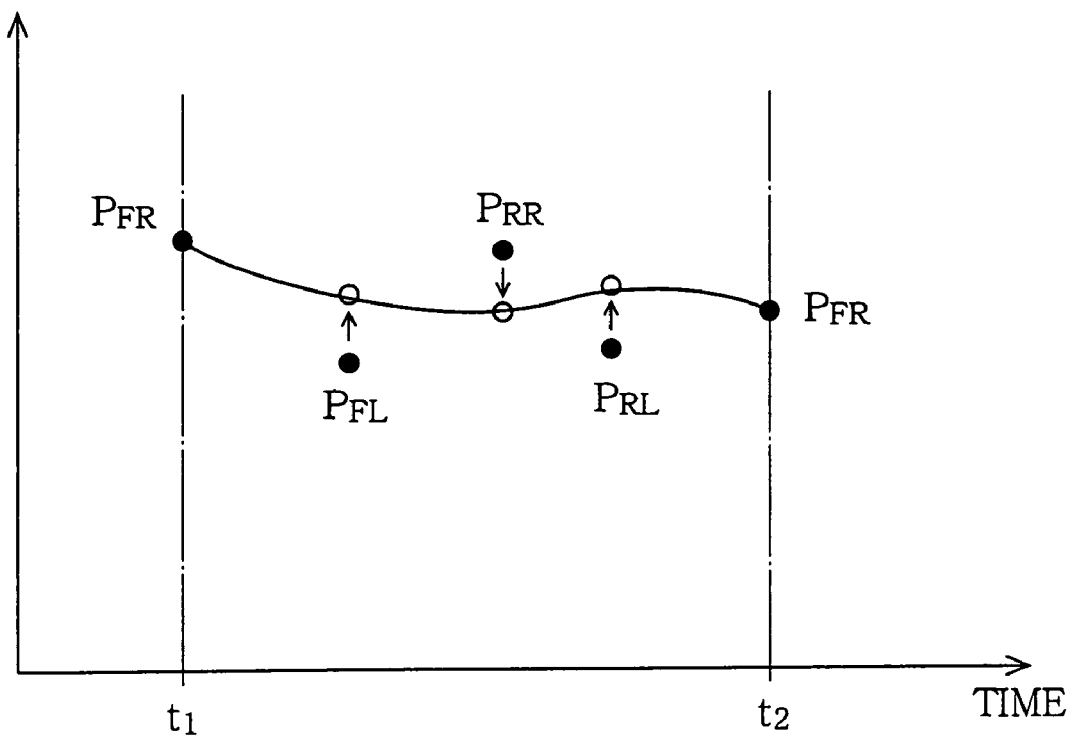
FIG. 13 is a view indicating air pressure values obtained by the wheel-stating obtaining apparatus of FIG. 12.

The air pressure values obtained in the embodiment of FIG. 12 are indicated in FIG. 13.

In the present embodiment, the wheel-side information is transmitted from the four wheel-side devices 10–16 at substantially the same transmission interval such that the moments of transmission of the wheel-side information from the wheel-side devices 10–16 are different or shifted from each other by a suitable length time, as previously described. Accordingly, during the interval of transmission from one wheel-side device, the wheel-side information (air-pressure information) is received by the receiver antennas corresponding to the other wheel-side devices, at respective different moments, so that the air pressure $P'_{FR}$ of the front right wheel FR, for example, can be estimated on the basis of the air pressure value $P*_{FL}$, $P*_{RR}$ or $P*_{RL}$ of the other wheel which is detected during the transmission interval t1–t2 of the wheel-side device 10 corresponding to the front right wheel FR, as indicated in FIG. 13, by way of example.

In the same manner as described above with respect to the front right wheel FR, the air pressure values $P'_{FL}$, $P'_{RR}$ and $P'_{RL}$ of the wheels FL, RR, RL can be estimated on the basis of the detected air pressure value P* of the other wheel and the ratio of the two wheels in question. In the present embodiment, a portion of the air-pressure-information obtaining apparatus 28 assigned to implement steps S77–S81, S82–S86 and S88–S92 constitutes an other-wheel-dependent estimated-air-pressure-information obtaining device operable to obtain the estimated air pressure value of one of the wheels on the basis of the detected air pressure value of another of the wheels.

Figure 14:
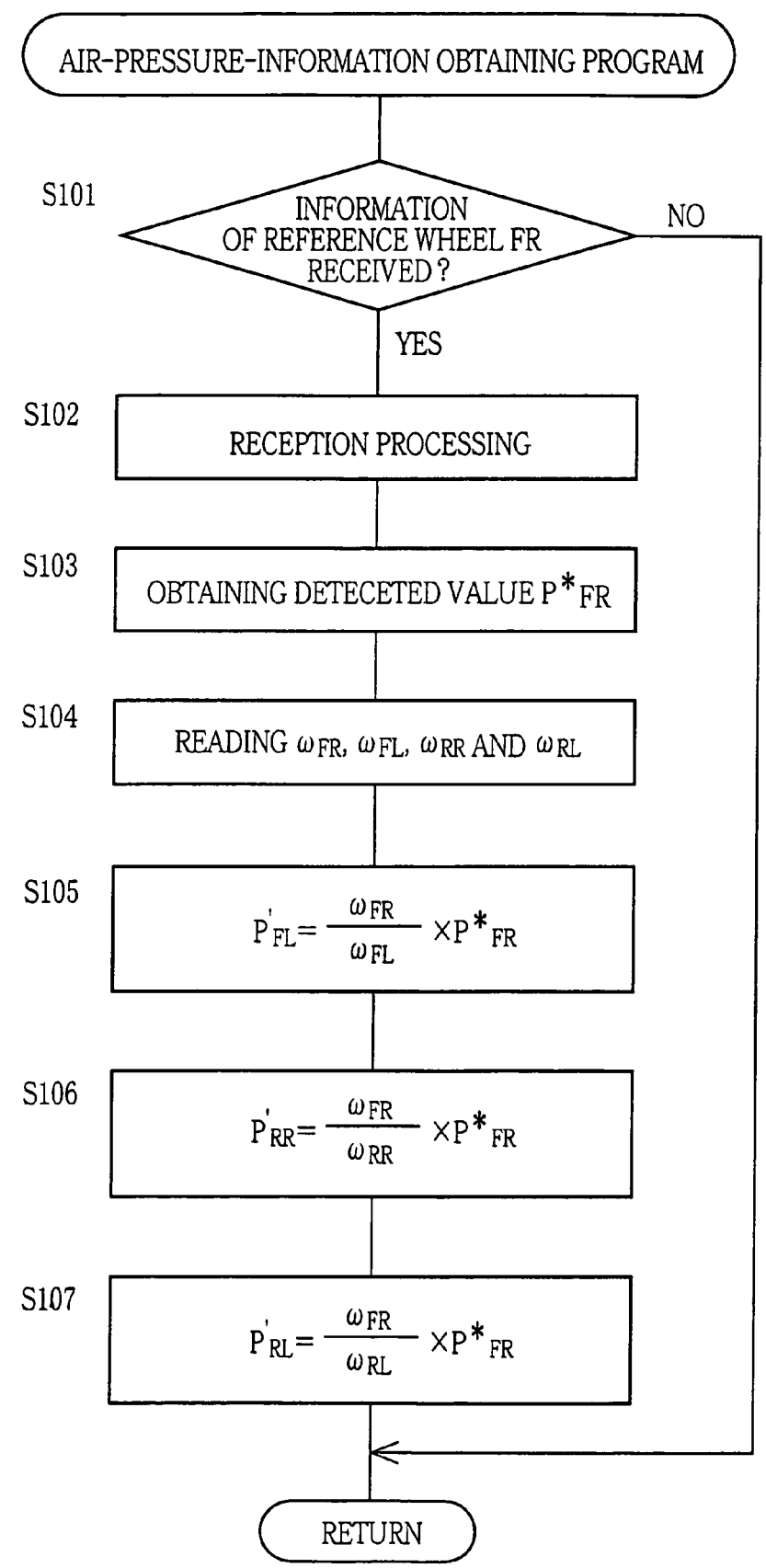
FIG. 14 is a flow chart illustrating an air-pressure-information obtaining program stored in a memory portion of the body-side device of a wheel-state obtaining apparatus according to still anther embodiment of the present invention.

In the embodiment of FIG. 5, the air pressure of one of the wheels whose information has not been received is estimated on the basis of the detected air pressure value of another wheel. However, the air pressures of two or more of the four wheels may be estimated on the basis of the detected air pressure value of a predetermined reference wheel which is selected from the four wheels. An example of an air-pressure-information obtaining program according to this modification is illustrated in the flow chart of FIG. 14. This program is initiated with step S101 to determine whether the wheel-side information of the predetermined reference wheel, for example, of the front right wheel FR, has been received by the corresponding receiver antenna (e.g., receiver antenna 20). If an affirmative decision (YES) is obtained in step S101, the control flow goes to steps S102 and S103 to process the received wheel-side information and obtain the detected air pressure value $P*_{FR}$. Then, the control flow goes to step S104 to read the rotating speeds of the four wheels, and to steps S105–S107 to calculate the ratios of the speed of the reference wheel FR to the speeds of the other wheels FL, RR and RL, and obtain the estimated air pressure values $P'_{FL}$, $P'_{RR}$ and $P'_{RL}$ of the wheels FL, RR and RL, on the basis of the calculated ratio and the detected air pressure value $P*_{FR}$ of the reference wheel FR.

For the reference wheel FR, the detected air pressure value P*FR is used as the tire air pressure. For the other wheels FL, RR, RL, the estimated air pressure values $P'_{FL}$, $P'_{RR}$ and $P'_{RL}$ are used as their tire pressure values. In this case, the provision of the wheel-side devices 12, 14, 16 for the wheels FL, RR, RL is not essential, and the cost of manufacture of the wheel-state obtaining apparatus can be reduced.

Where the air pressure of one wheel is estimated on the basis of the detected air pressure of another wheel, this estimation may be inhibited during a run of the vehicle on a bad roadway. While the vehicle is running on a bad roadway, the two wheels do not usually have the relationship represented by the above-indicated equation (5) between the ratio of the speeds and the ratio of the air pressures. For example, a run of the vehicle on a bad roadway is detected when the wheel speeds are changing at a relatively high rate and when the frequency of change of the wheel speeds is relatively high. This running condition of the vehicle may be detected by using a vertical acceleration sensor disposed on a sprung member of the vehicle. When the high-frequency component of the output of the vertical acceleration sensor is larger than a threshold value, it is considered that the vehicle is running on a bad roadway.

Further, the air pressure of one of the front right and left wheels may be estimated on the air pressure of the other of the front wheels, and the air pressure of one of the rear right and left wheels may be estimated on the air pressure of the other of the rear wheels, since the loads acting on the front right and left wheels are almost equal to each other, and since the loads acting on the rear right and left wheels are almost equal to each other, so that the above-indicated relationship is usually satisfied for the two front wheels, and for the two rear wheels. The accuracy of estimation of the air pressure of one of the wheels can be improved, where the estimation is based on the air pressure of another wheel which has the same positional relationship with the above-indicated one wheel.

The estimation of the air pressure of one wheel based on the detected air pressure value of another wheel is preferably effected while the running speed of the vehicle is held within a predetermined range. When the vehicle running speed is higher than the upper limit of the predetermined range, the accuracy of the estimation may be deteriorated. When the vehicle running speed is lower than the lower limit of the range, the accuracy of detection of the wheel speed sensors 60–66 is relatively low, so that it is desirable not to use the outputs of the wheel speed sensors 60–66.

The embodiments described above are arranged such that the interval or frequency of transmission of the wheel-side information from the wheel-side devices 10–16 is held constant. However, the interval of transmission of the wheel-side information from each wheel-side device may be reduced when the rate of change of the air pressure detected by the air pressure sensor 32 is higher than a predetermined threshold value. In this case, the interval of reception of the wheel-side information by the body-side device 18 is made equal to the reduced interval of transmission of the wheel-side devices 10–16.

Further, the wheel-side information may be transmitted from the wheel-side devices 10–16 only while the rate of change of the air pressure detected by the air pressure sensor 32 is higher than a predetermined threshold value. Namely, the wheel-side information may not be transmitted while the rate of change of the detected air pressure is lower than the threshold value. While the rate of change is lower than the threshold value, the estimated-air-pressure information is determined as the air-pressure information.

Alternatively, the information indicative of the detected air pressure is transmitted while the rate of change of the detected air pressure is higher than a threshold value, but the information as to whether the detected air pressure is normal or abnormal is transmitted while the rate of change is lower than the threshold value.

In the modified arrangements described above, the rate of reduction of the electric energy stored in the battery 58 of each wheel-side device 10–16 can be reduced, so that the service life of the battery 58 can be prolonged.

Figure 15:
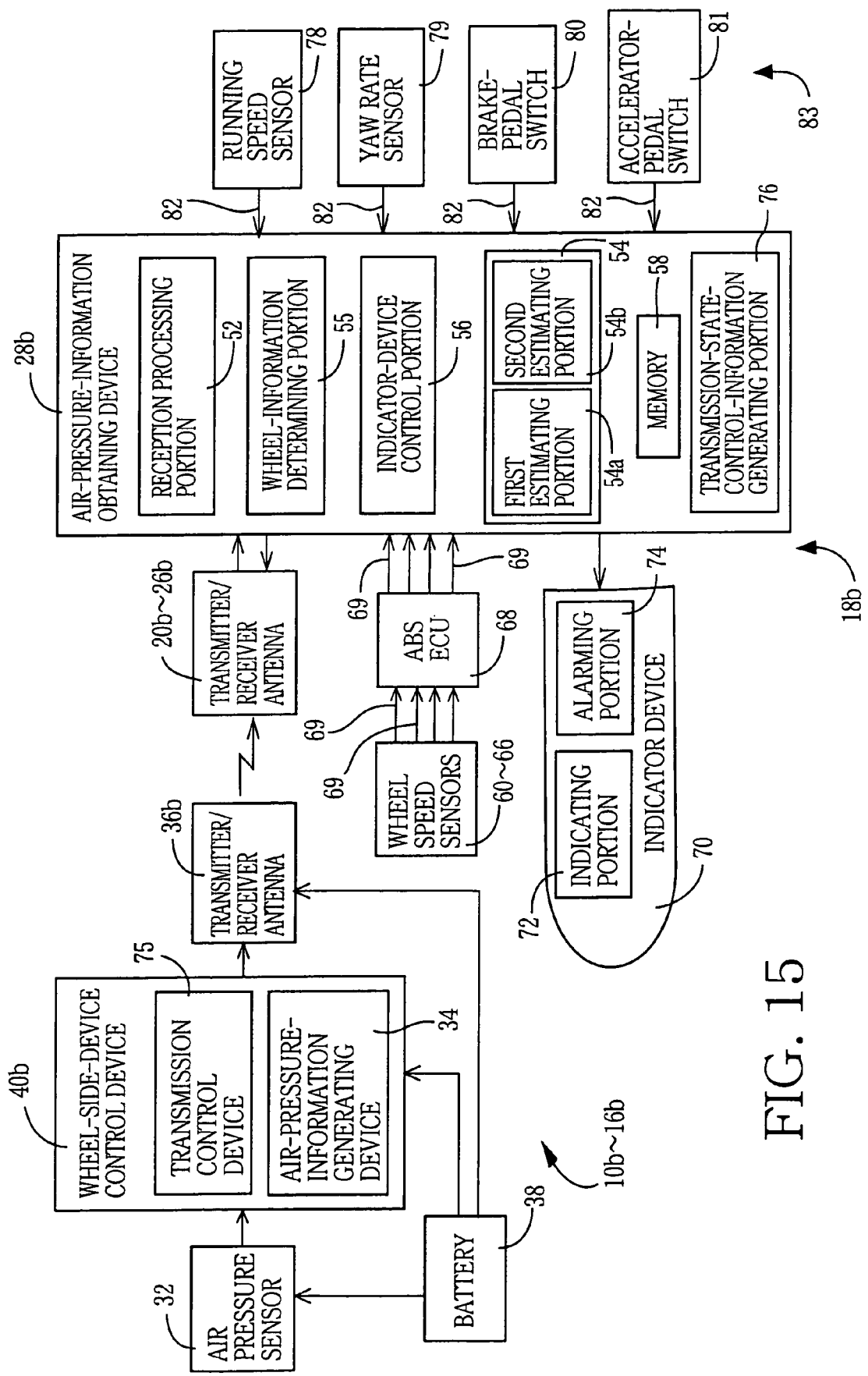
FIG. 15 is a block diagram schematically illustrating a wheel-state obtaining apparatus according yet another embodiment of the invention.

Further, the wheel-side devices and the body-side device may be arranged so as to permit bi-directional radio or wireless communication therebetween. A wheel-state obtaining apparatus illustrated in FIG. 15 is an example of this modification. In this apparatus, each of the wheel-side devices 10b–16b includes a transmitter/receiver antenna 36b, while the body-side device 18b includes four transmitter/receiver antennas 20b–26b. Each wheel-side device 10b–16b further includes the above-indicated air-pressure-information generating device 34, and a transmission control device 75, while the air-pressure-information obtaining device 28b of the body-side device 18b includes a transmission-state-control-information generating portion 76 in addition to the above-indicated reception processing portion 52, estimating portion 54, wheel-information determining portion 55, indicator-device control portion 56 and memory 58. To the air-pressure-information obtaining device 28b, there are connected a running-speed sensor 78, a yaw rate sensor 79, a brake-pedal switch 80 and an accelerator-pedal switch 81 as well as the above-indicated wheel speed sensors 60–66. The sensors 78, 79 and switches 80, 81 are connected to the obtaining device 28b through signal lines 82. At least one of the sensors and switches 78–81 constitutes a vehicle-running-state detecting device 83 operable to detect the running state of the vehicle.

While the brake-pedal switch 80 is in the ON state, it is determined that the vehicle is being braked. While the accelerator-pedal switch 81 is in the ON state, it is determined that the vehicle is being accelerated. While the absolute value of the output of the yaw rate sensor 79 is higher than a predetermined threshold, it is determined that the vehicle is turning or cornering. The running speed of the vehicle is detected by the running-speed sensor 78, and the slipping state of each wheel is obtained on the basis of the detected vehicle running speed and the speed of each wheel detected by the wheel speed sensor 60–66.

In the present embodiment of FIG. 15, one of the estimated-air-pressure information and the detected-air-pressure information is determined as the air-pressure information, depending upon the detected running state of the vehicle. Further, transmission-state control information is generated by the transmission-state-control-information generating device 76, on the basis of the detected vehicle running state, and is transmitted to the wheel-side devices 10b–16b through the respective transmitter/receiver antennas 20b–26b, so that the transmission control device 75 of each wheel-side device 10b–16b controls at least one of the state and amount of transmission of the wheel-side information, according to the received transmission-state control information.

When it is determined on the basis of the detected vehicle running state that the accuracy of estimation of the air pressure by the estimating portion 54 is higher than a predetermined limit, the estimated-air-pressure information obtained by the estimating portion 54 is determined as the air-pressure information. When it is determined that the accuracy of estimation is lower than the lower limit, the detected-air-pressure information obtained by the reception processing portion 52 is determined as the air-pressure information. Further, the estimated-air-pressure information is obtained according to a selected one of two estimating rules.

One of the estimating rules utilizes a relationship between the tire air pressures of two wheels and the rotating speeds (angular velocities) of the two wheels. According to this estimating rule, the air pressure of one of two wheels is estimated on the basis of the ratio of the detected speeds of the two wheels and the detected air pressure of the other wheel. This rule will be referred to as "a first estimating rule", and the estimated-air-pressure information obtained according to this first estimating rule (rule based on the wheel radius under a dynamic load) will be referred to as "first estimated-air-pressure information".

The other estimating rule utilizes a relationship between the rate of change of the spring constant of the tire of each wheel and the rate of change of the tire air pressure. According to this rule, the air pressure of the wheel in question is estimated on the basis of a plurality of sets of speed data of that wheel. This rule will be referred to as "a second estimating rule", and the estimated-air-pressure information obtained according to this second estimating rule (rule based on the resonance frequency, or rule utilizing an external-disturbance observer) will be referred to as "second estimated-air-pressure information".

In the present embodiment, it is determined that the accuracy of estimation of the air pressure is higher than the lower limit, while the vehicle running speed is held within the predetermined range and while the wheel speeds are not likely to be influenced by any factors other than the tire air pressure. While the vehicle running speed is higher than a given upper limit, it is known that the accuracy of estimation according to the first or second estimating rule is not sufficiently high. Where the wheel speed sensors 60–66 are of an electromagnetic pickup type, the accuracy of detection of the wheel speeds by those sensors is considerably low when the vehicle running speed is lower than a given lower limit, so that it is not desirable to use the wheel speeds represented by the outputs of the wheel speed sensors in this condition. It is not adequate to estimate the air pressure of each wheel on the basis of the wheel speed during running of the vehicle on a bad roadway or during excessive slipping of the wheel on the roadway surface (in an excessively locking state of the wheel), because the wheel speed has a large amount of fluctuation or variation due to the bad roadway surface or slipping or locking of the wheel.

Where the air pressure is estimated according to the first estimating rule, the loads acting on the two wheels (including the wheel whose air pressure is estimated) are required to be substantially equal to each other, since the angular velocities of the two wheels may vary depending upon the loads acting on the wheels.

With the above-indicated factors taken into account, the present embodiment is arranged to use the estimated-air-pressure information when all of the following three conditions are satisfied: (1) The vehicle is not running on a bad roadway; (2) The vehicle running speed is within a predetermined range; and (3) The amount of slipping of the wheel is not larger than a predetermined upper limit. If at least one of those three conditions is not satisfied, the detected-air-pressure information is used. Further, the first estimated-air-pressure information is obtained when all of the following three conditions are satisfied: (a) The vehicle is not turning; (b) The vehicle is not being braked (with an operation of the brake pedal); and (c) The vehicle is not being accelerated (with an operation of the accelerator pedal). If at least one of those three conditions (a)–(c) is not satisfied, the second estimated-air-pressure information is obtained.

The excessively slipping tendency or locking tendency of the wheels can be detected on the basis of the outputs of the wheel speed sensors 60–66.

As described above, the ON state of the brake-pedal switch 82 indicates that the vehicle is being braked, and the ON state of the accelerator-pedal switch 81 indicates that the vehicle is being accelerated. The absolute value of the output of the yaw rate sensor 70 higher than the predetermined upper limit indicates that the vehicle is turning.

Figure 16:
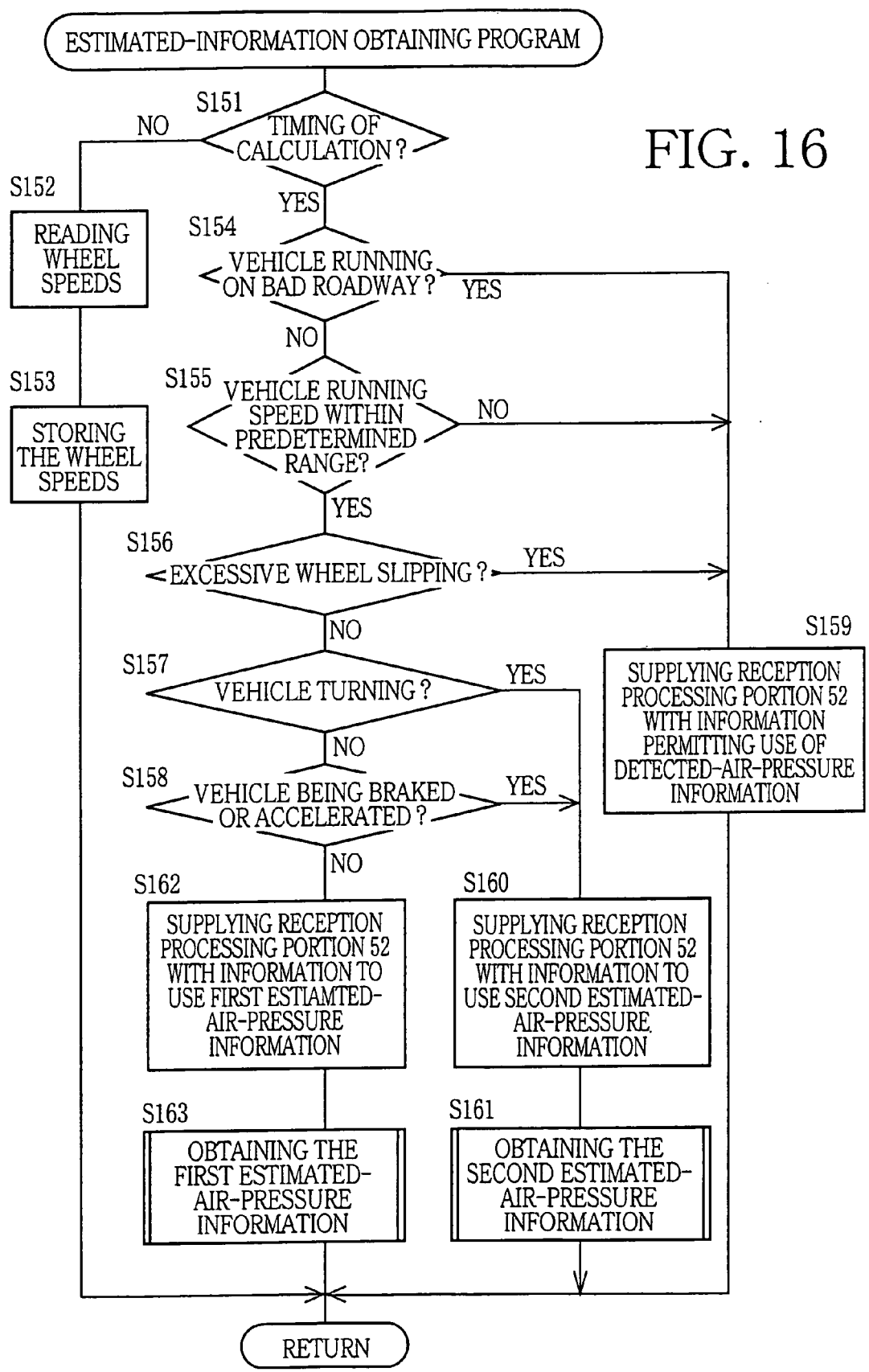
FIG. 16 is a flow chart illustrating an estimated-information obtaining program stored in the body-side device of the apparatus of FIG. 15.

The estimating portion 54 is arranged to execute an estimated-information obtaining program illustrated in the flow chart of FIG. 16.

This program is initiated with step S151 to determine whether the present point of time is the predetermined timing of calculation of the estimated air pressure. If a negative decision (NO) is obtained in step S151, the control flow goes to steps S152 and S153 to read the rotating speeds of the wheels and store then in the memory 58. If an affirmative decision (YES) is obtained in step S151, the control flow goes to steps S154–S158 to make the determination as to whether the vehicle is running on a bad roadway, the determination as to whether the vehicle running speed is held within the predetermined range, the determination as to whether the amount of slipping of any wheel is larger than the upper limit, the determination as to whether the vehicle is turning, and the determination as to whether the vehicle is braking braked or accelerated.

If an affirmative decision (YES) is obtained in step S154 or S156, or if a negative decision (NO) is obtained in step S155, the control flow goes to step S159 in which the reception processing portion 52 is supplied with information which permits the use or determination of the detected-air-pressure information as the air-pressure information. If a negative decision (NO) is obtained in both of steps S154 and S156 and if an affirmative decision (YES) is obtained in step S155, the control flow goes to step S157–S163 to obtain the first or second estimated-air-pressure information, depending upon whether the vehicle is turning and whether the vehicle is being braked or driven.

The turning, braking or acceleration of the vehicle has a relatively small influence on the accuracy of estimation of the air pressure according to the second estimating rule, but has a relatively large influence on the accuracy of estimation according to the first estimating rule. In view of this fact, the air pressure of the wheel in question is estimated according to the second estimating rule during running, braking or acceleration of the vehicle, and according to the first estimating rule in the other running state of the vehicle.

Figure 17:
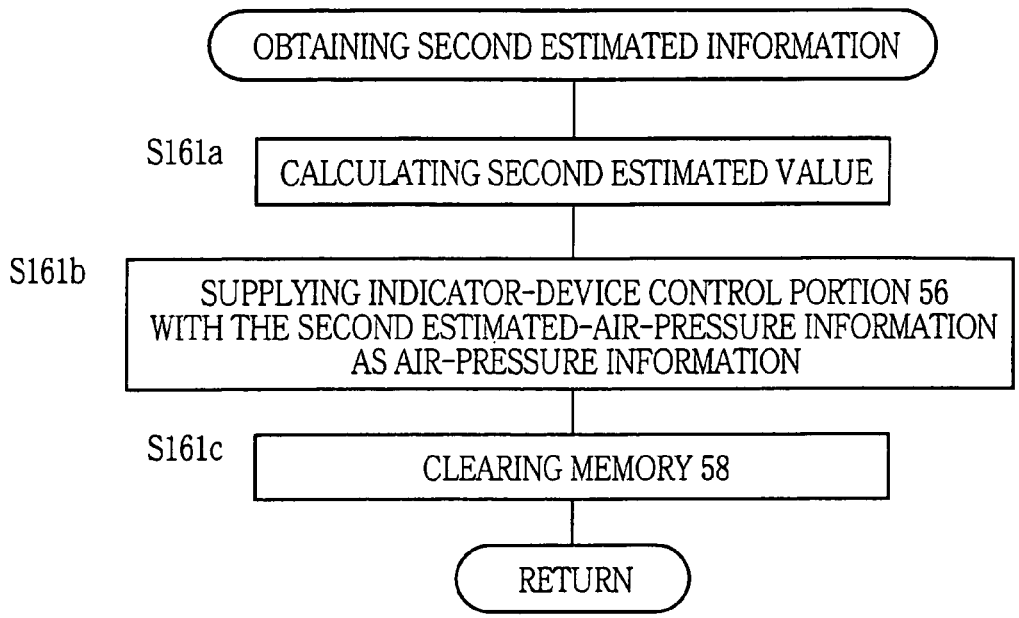
FIG. 17 is a flow chart showing a portion of the program of FIG. 16.

If an affirmative decision (YES) is obtained in step S157 or S158, the control flow goes to steps S160 and S161 to supply the reception processing portion 54 with information to use the second estimated-air-pressure information as the air-pressure information, and to obtain the second estimated-air-pressure information according to the second estimating rule, that is, according to a program illustrated in the flow chart of FIG. 17, which is executed by a second estimating portion 54*b* of the estimating portion 54. Namely, step S161*a* is implemented to obtain the second estimated-air-pressure information representative of a second estimated value (corresponding to the provisional estimated value in the first embodiment of FIG. 1) on the basis of a plurality of sets of speed data of the wheel in question stored in the memory 58. Step S161*a* is followed by step S161*b* to supply the indicator-device control portion 56 with the obtained second estimated-air-pressure information as the air-pressure information. Step S161*c* is then implemented to clear the memory 58.

Figure 18:
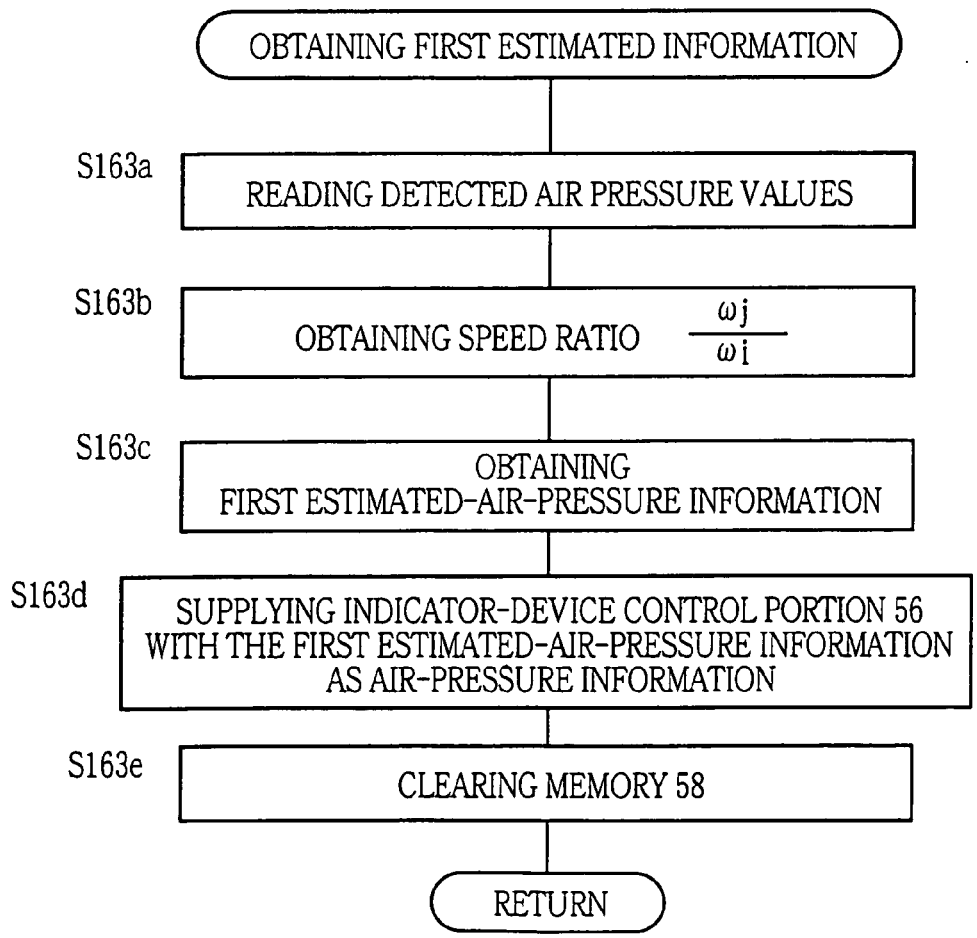
FIG. 18 is a flow chart showing another portion of the program of FIG. 16.

If a negative decision (NO) is obtained in step S157 or S158, the control flow goes to steps S162 and S163 to supply the reception processing portion 52 with information to use the first estimated-air-pressure information as the air-pressure information, and to obtain the first estimated-air-pressure information according to the first estimating rule, that is, according to a program illustrated in the flow chart of FIG. 18, which is executed by a first estimating portion 54*a* of the estimating portion 54. Namely, step S163*a* is implemented to read the detected air pressure values received from the reception processing portion 52. Step S163*a* is followed by step S163*b* to obtain the ratio of the rotating speeds of the two wheels in question. Then, step S163*c* is implemented to obtain the first estimated-air-pressure information on the basis of the obtained ratio. Then, the control flow goes to step S163*d* to supply the indicator-control portion 56 with information to use the thus obtained first estimated-air-pressure information as the air-pressure information, and to step S163*e* to clear the memory 58. In step S163*c*, the air pressure of one wheel is estimated as in the embodiment of FIG. 12, or the air pressure values of two or more wheels are estimated in the embodiment of FIG. 14. Step S163*a* may be formulated to read the air pressure value or values of the wheel or wheels selected to estimate the air pressure value of the wheel in question, or to read the last detected air pressure value.

Figure 19:
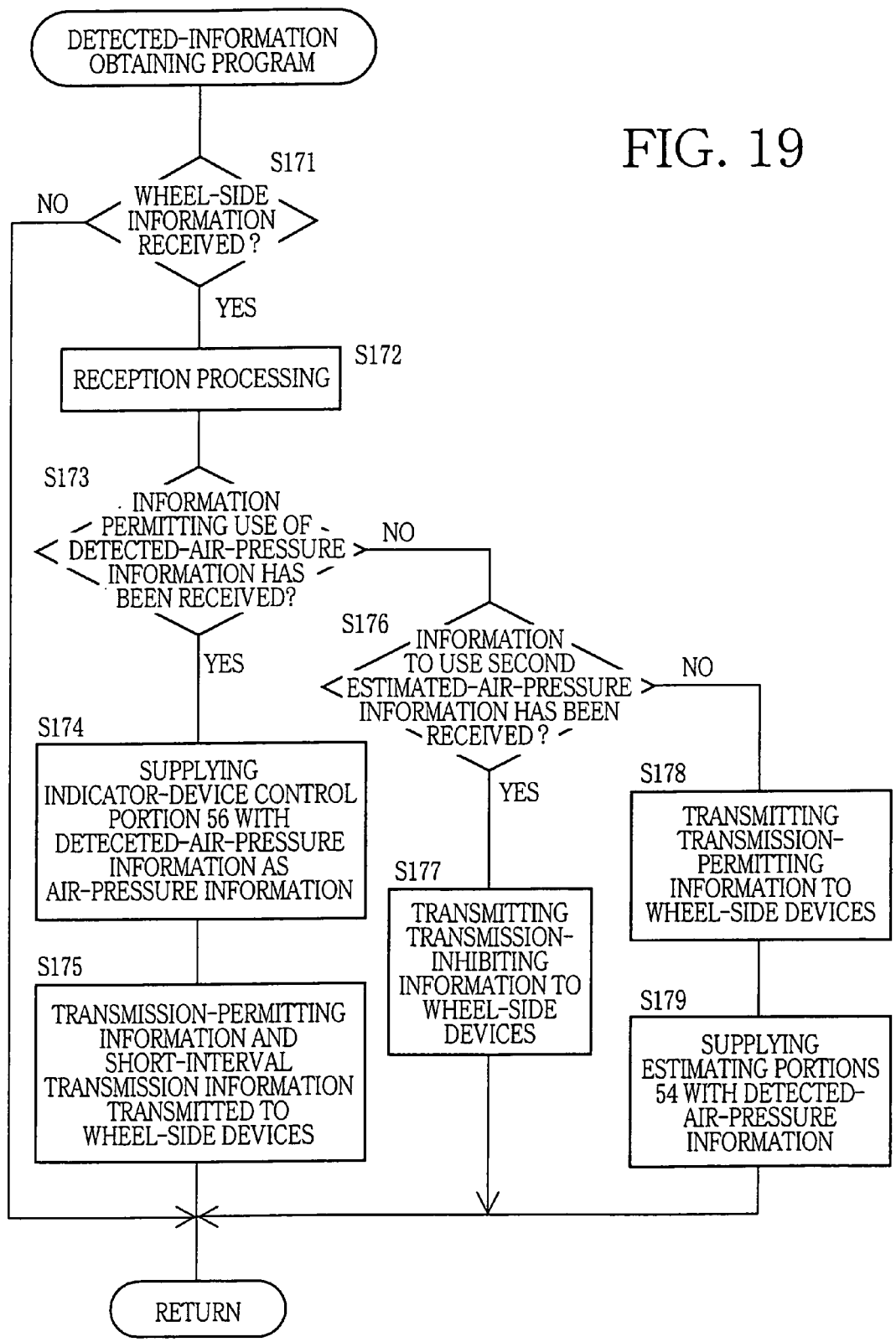
FIG. 19 is a flow chart illustrating a detected-information obtaining program stored in the body-side device of the apparatus of FIG. 15.

The reception processing portion 52 is arranged to execute a detected-information obtaining program illustrated in the flow chart of FIG. 19. The program is initiated with step S171 to determine whether the wheel-side information has been received by the corresponding receiver antenna. If an affirmative decision (YES) is obtained in step S171, the control flow goes to step S172 to process the received wheel-side information and extract the air-pressure value. Step S172 is followed by step S173 to determine whether the information permitting the use or determination of the detected-air-pressure information as the air-pressure information has been received. If an affirmative decision (YES) is obtained in step S173, the control flow goes to step S174 to supply the indicator-device control portion 5 with the detected-air-pressure information as the air-pressure information, and then to step S175 to transmit transmission-state-control information such as transmission-permitting information and short-interval transmission information to the wheel-side devices through the transmitter/receiver antennas 20*b*–26*b*.

If a negative decision (NO) is obtained in step S173, the control flow goes to step S176 to determine whether the information to use the second estimated-air-pressure information has been received. If an affirmative decision (YES) is obtained in step S176, the control flow goes to step S177 to transmit transmission-inhibiting information to all of the wheel-side devices 10*b*–16*b* through the transmitter/receiver antennas 20*b*–26*b*. If a negative decision (NO) is obtained in step S176, the control flow goes to step S178 to transmit the transmission-permitting information to all of the wheel-side devices 10*b*–16*b* through the transmitter/receiver antennas 20*b*–26*b*, and then to step S179 to supply the estimating portion 54 with the detected-air-pressure information.

Steps S176–S179 may be implemented when the wheel-side information has not been received, that is, when a negative decision (NO) is obtained in step S171.

Figure 20:
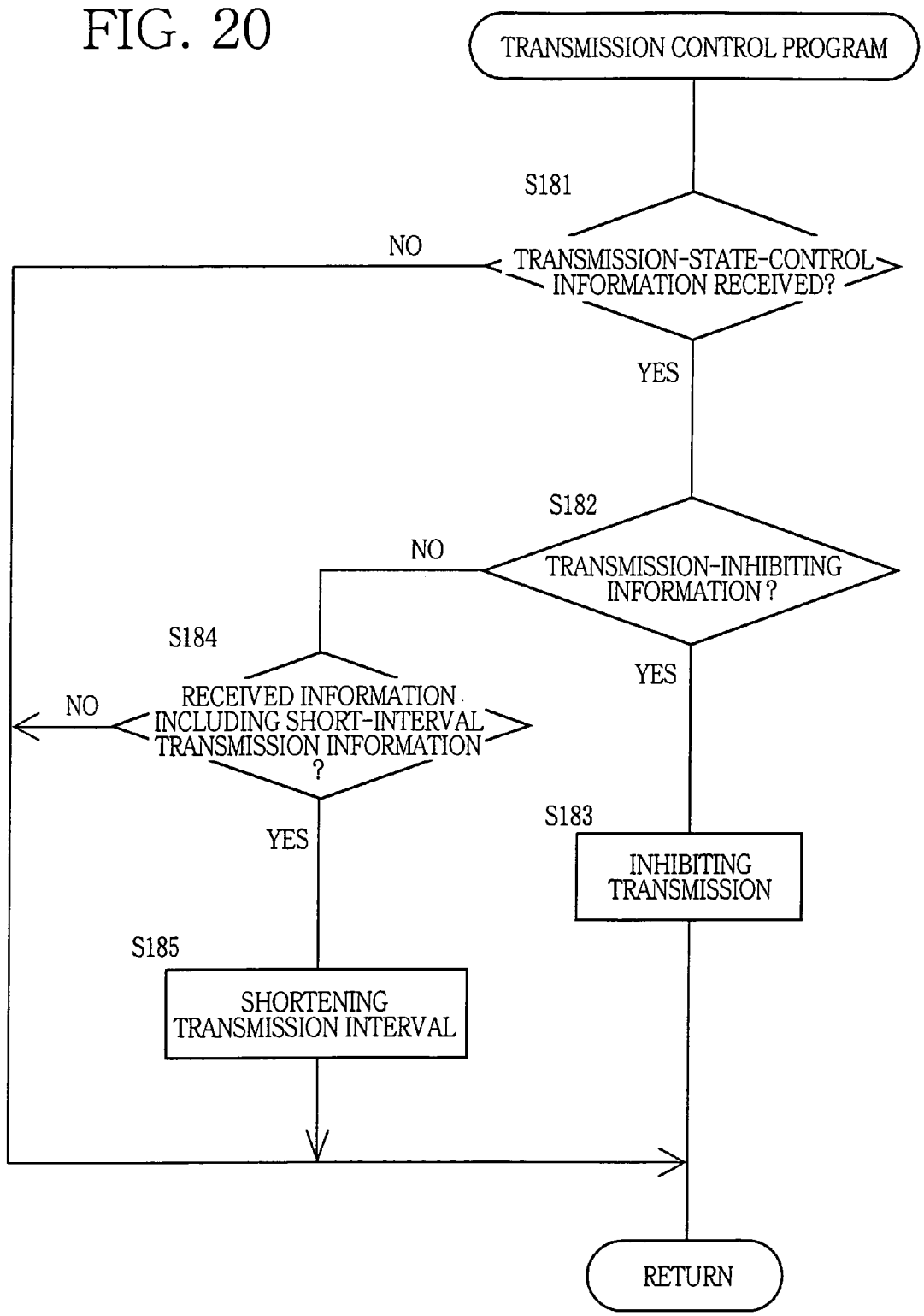
FIG. 20 is a flow chart illustrating a transmission control program stored in the body-side device of the apparatus of FIG. 15.

Each of the wheel-side devices 10*b*–16*b* is arranged to execute a transmission-control program illustrated in the flow chart of FIG. 20. The program is initiated with step S181 to determine whether the transmission-state-control information has been received by the transmitter/receiver antenna 26*b*. If an affirmative decision (YES) is obtained in step S181, the control flow goes to step S182 to determine whether the transmission-inhibiting information has been received. If an affirmative decision (YES) is obtained in step S182, the control flow goes to step S183 to inhibit the transmission of the wheel-side information through the transmitter/receiver antenna 36*b*. In this case, the detection of the air pressure of the corresponding wheel and the generation of the wheel-side information may also be inhibited. However, this inhibition is not essential.

If a negative decision (NO) is obtained in step S182, this means that the received transmission-state-control information includes the transmission-permitting information. In this case, the control flow goes to step S184 to determine whether the received transmission-state-control information includes the short-interval transmission information. If an affirmative decision (YES) is obtained in step S184, the control flow goes to step S185 to shorten the transmission interval of the wheel-side device 10*b*–16*b*. If a negative decision (NO) is obtained in step S184, the transmission at the normal transmission interval is permitted.

As described above, the transmission of the wheel-side information from the wheel-side device 10*b*–16*b* is inhibited when the estimated-air-pressure information is used as the air-pressure information, so that the electric energy stored in the battery 38 can be saved, resulting in a prolonged service life of the battery 38. In the present embodiment of FIGS. 15–20, the reception processing portion 52 functions as a detected-air-pressure information obtaining portion operable to obtain the detected-air-pressure information, and a transmission-state-control-information transmitting portion operable to transmit the transmission-state-control information to the wheel-side devices 10*b*–16*b*.

In the present embodiment, it is not essential that one of the first estimated-air-pressure information and the second estimated-air-pressure information is obtained as the estimated-air-pressure information, depending upon the running state of the vehicle. Namely, the embodiment may be arranged such that one of the estimated-air-pressure information and the detected-air-pressure information is used as the air-pressure information.

Where one of the second estimated-air-pressure information and the detected-air-pressure information is used as the air-pressure information, steps S157, S158, S160, S162, S163, S176, S178 and S179 are not necessary. Where one of the first estimated-air-pressure information and the detected-air-pressure information is used as the air-pressure information, the detected-air-pressure information is used when the affirmative decision (YES) is obtained in steps S157 and S158. That is, step S159 is implemented when the affirmative decision is obtained in steps S157 and S158. In this case, steps S150, S161, S162, S176 and S177 are not necessary, and the transmission of the transmission-permitting information to the wheel-side device 10*b*–16*b* is not essential.

Further, the body-side device 18*b* may be arranged to transmit to the wheel-side devices 10*b*–16*b* transmission-requesting information requesting the transmission of the wheel-side information, so that the wheel-side devices 10*b*–16*b* transmit the wheel-side information to the body-side device 18*b*, in response to the transmission-requesting information.

In the embodiments of FIGS. 15–20, one of the estimated-air-pressure information and the detected-air-pressure information is used or determined as the air-pressure information, depending upon whether the vehicle is running on a bad roadway, whether the vehicle running speed is held within the predetermined range, and whether the amount of slipping of any wheel is larger than the upper limit. However, this arrangement is not essential. For example, one of the estimated-air-pressure information and the detected-air-pressure information may be used depending upon one or two of the above-indicated three conditions, or depending upon any other conditions, or depending upon the above-indicated three conditions and any other additional condition or conditions.

Further, one of the detected-air-pressure information and the estimated-air-pressure information may be used depending upon the state of change of the estimated air pressure value of the wheel in question.

Figure 21:
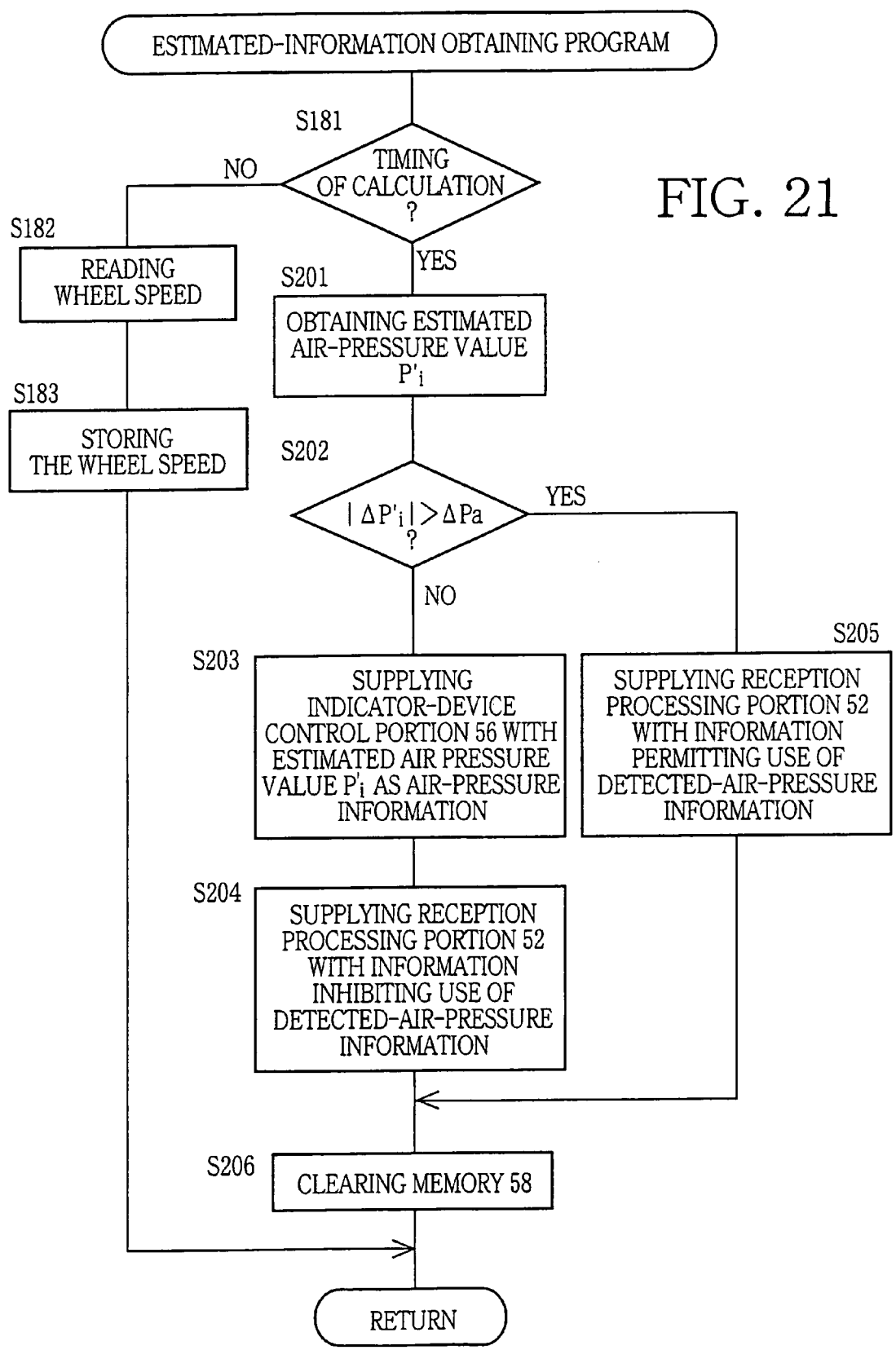
FIG. 21 is a flow chart illustrating an estimated-information obtaining program stored in the body-side device of a wheel-state obtaining apparatus according to a further embodiment of this invention.

For instance, the estimating portion 54 is arranged to execute an estimated-information obtaining program illustrated in the flow chart of FIG. 21. This program is initiated with step S181 to determine whether the present point of time is the predetermined timing of calculation of the estimated air pressure value. If an affirmative decision (YES) is obtained in step S181, the control flow goes to step S201 to estimate the air pressure value P'i of the wheel in question on the basis of a plurality of speed values of the wheel stored in the memory 58, and then to step S202 to determine whether an absolute value of an amount of change $\Delta P'i$ of the estimated air pressure value (a difference between the air pressure values estimated in the last and present cycles of execution of the program) is larger than a predetermined value $\Delta Pa$. If a negative decision (NO) is obtained in step S202, the control flow goes to step S203 to determine the estimated-air-pressure information as the air-pressure information, and supply the indicator-device control portion 56 with the estimated-air-pressure information. Step S203 is followed by step S204 to supply the reception processing portion 52 with the information inhibiting the use of the detected-air-pressure information. If an affirmative decision (YES) is obtained in step S202, the control flow goes to step S205 to supply the reception processing portion 52 with the information permitting the use of the detected-air-pressure information.

Figure 22:
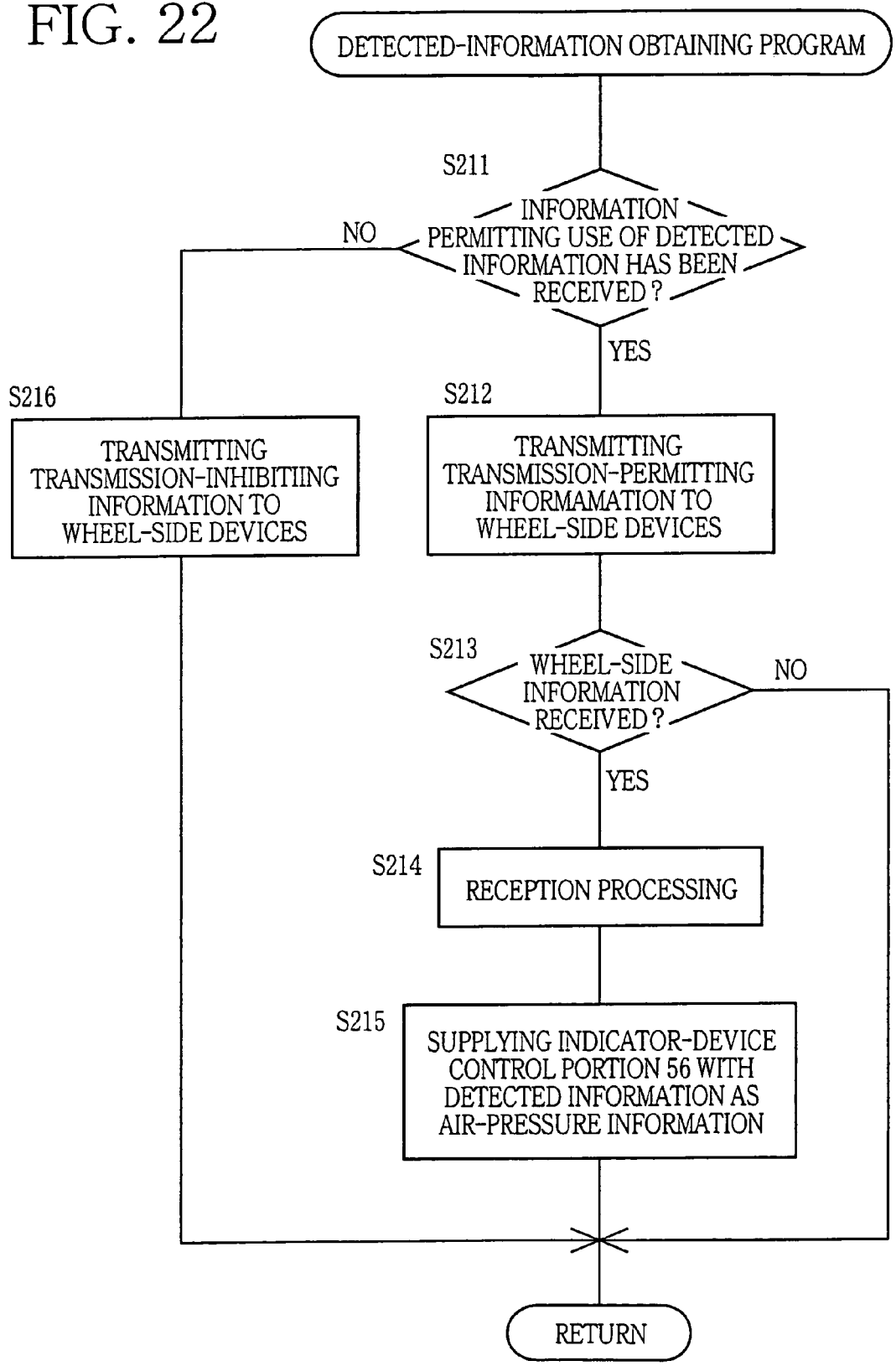
FIG. 22 is a flow chart illustrating an estimated-information obtaining program stored in the body-side device of the apparatus of FIG. 21.

On the other hand, the reception processing portion 52 is arranged to execute a detected-information obtaining program illustrated in the flow chart of FIG. 22. This program is initiated with step S211 to determine whether the information permitting the use of the detected-air-pressure information has been received. If an affirmative decision (YES) is obtained in step S212, the control flow goes to step S212 to transmit the transmission-permitting information to the wheel-side device 10b–16b through the transmitter/receiver antenna 20b–26b. Step S212 is followed by step S213 to determine whether the wheel-side information has been received. If an affirmative decision (YES) is obtained in step S213, the control flow goes to step S214 to process the received wheel-side information, and to step S215 to supply the indicator-device control portion 56 with the detected-air-pressure information as the air-pressure information.

If the information inhibiting the use of the detected-air-pressure information, rather than the information permitting the use, has been received, a negative decision (NO) is obtained in step S211, and the control flow goes to step S216 to transmit the transmission-inhibiting information to the wheel-side device 10b–16b, so that the wheel-side information is not transmitted to the reception processing portion 52.

In the present embodiment, the detected-air-pressure information is determined as the air-pressure information when the absolute value of the amount of change of the estimated air pressure value (provisional estimated value) is larger than the predetermined value. This is because the detected-air-pressure information more accurately represents the actual air pressure when the absolute value of the amount of change of the estimated air pressure value is larger than the predetermined value. The estimated-air-pressure information is obtained for each of the wheels, and the determination as to whether the estimated-air-pressure information or the detected-air-pressure information should be used is effected for each of the wheels whose air pressure values have been estimated. Accordingly, the transmission-permitting information or the transmission-inhibiting information is transmitted from the transmitter/receiver antenna 20b–26b corresponding to each wheel. In the present embodiment, it is possible that the detected-air-pressure information is used for some of the wheels, while the estimated-air-pressure information is used for the other wheel or wheels.

While the preceding embodiments described above are basically arranged so as to determine or use one of the estimated-air-pressure information and the detected-air-pressure information as the air-pressure information, the present invention is not limited to the details of those embodiments. For example, the estimated-air-pressure information and the detected-air-pressure information may be alternately used, or the estimated-air-pressure information or detected-air-pressure information which has been once used is repeatedly used for two or more cycles of execution of the program. Further, it is possible to diagnose the devices provided to obtain the detected-air-pressure information, and the devices provided to obtain the estimated-air-pressure information, and use the detected-air-pressure information or estimated-air-pressure information which is obtained by the devices which have been diagnosed to be normal. If the devices to obtain the detected-air-pressure information and the devices to obtain the estimated-air-pressure information are both normal, it is preferable to use the detected-air-pressure information, which usually represents the actual air pressure value more accurately.

In the embodiments described above, the indicator device 70 is controlled according to the air-pressure information obtained by the air-pressure-information obtaining device 28.

Figure 23:
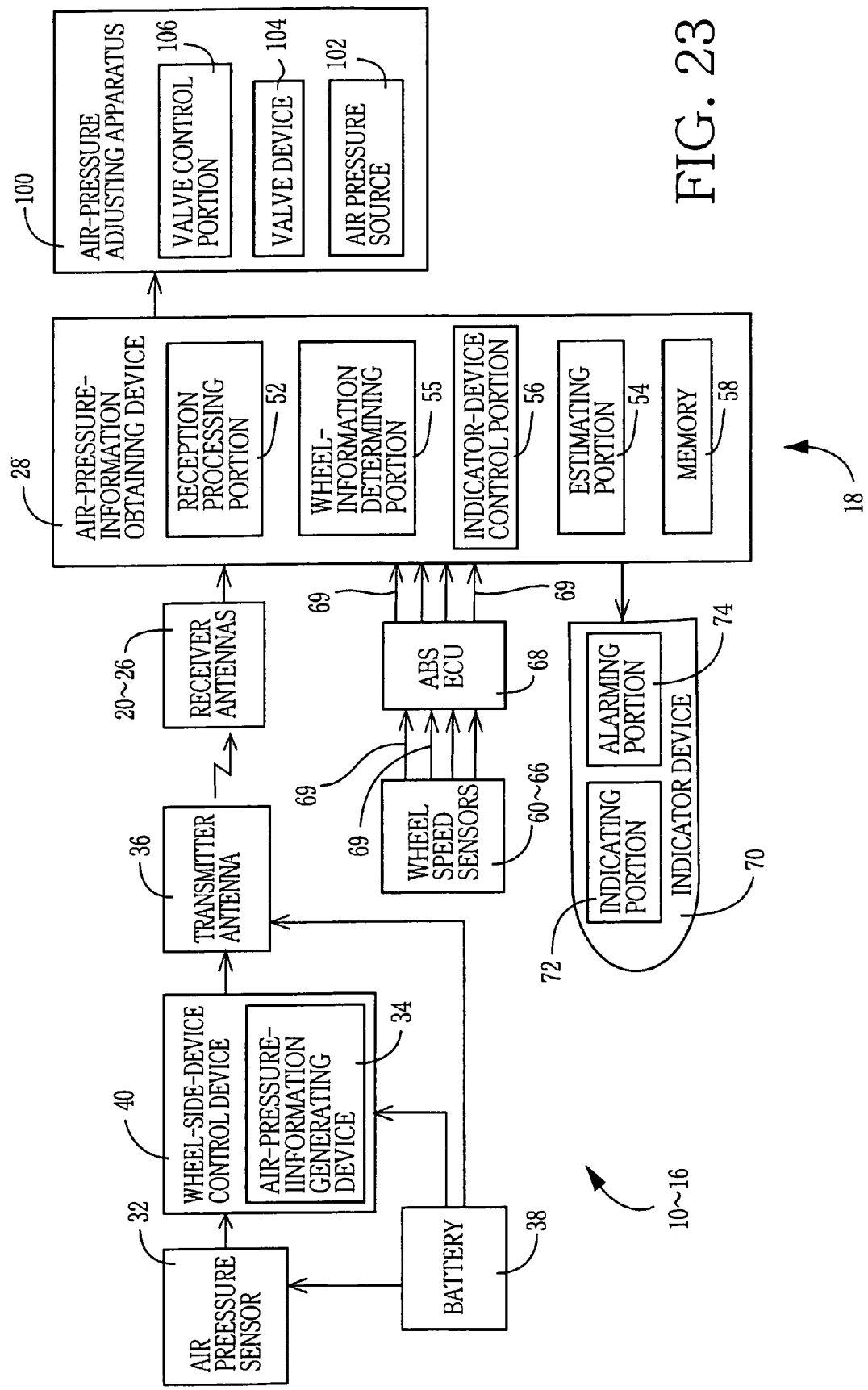
FIG. 23 is a block diagram schematically illustrating the wheel-state obtaining apparatus of FIG. 2, and an air-pressure adjusting apparatus, according to a still further embodiment of the invention.

However, the wheel-state obtaining apparatus of the present invention is not limited to this arrangement. For instance, the tire air pressure of each wheel may be adjusted such that the tire air pressure represented by the air-pressure information obtained by the air-pressure-information obtaining device 28 is held within a predetermined optimum range. An example of this modification is shown in FIG. 23, wherein an air-pressure adjusting apparatus 100 is connected to the air-pressure-information obtaining device 28. The air-pressure adjusting apparatus 100 includes an air pressure source 102 operable to apply a pressurized air to the tires 31, a valve device 104 operable to control the pressure of the pressurized air to be applied to the tires 31, and a valve control portion 106 operable to control the valve device 104 for adjusting the air pressure in each tire 31.

The air-pressure-information obtaining device 28 is arranged to supply the air-pressure adjusting apparatus 10 with the obtained air-pressure information, so that the valve control portion 106 controls the valve device 104 such that the air pressure value represented by the air-pressure information is held within the predetermined optimum range. The air-pressure adjusting apparatus 100 is supplied with either the detected-air-pressure information or the estimated-air-pressure information. Since the air-pressure-information obtaining device 28 is arranged to obtain the estimated-air-pressure information even when the detected-air-pressure information cannot be obtained, the air-pressure adjusting apparatus 100 can be supplied with the air-pressure information at least at the predetermined timing of reception of the wheel-side information by the device 28. Where the air-pressure-information obtaining device 28 is arranged to obtain the estimated-air-pressure information during the period (ΔT1 indicated in FIG. 4) of reception of the wheel-side information (between the adjacent moments of reception of the wheel-side information), the air-pressure adjusting apparatus 100 can be supplied with the air-pressure information at a time interval shorter than the reception interval of the wheel-side information, so that the actual tire air pressure can be more intricately controlled by the apparatus 100.

Figure 24:
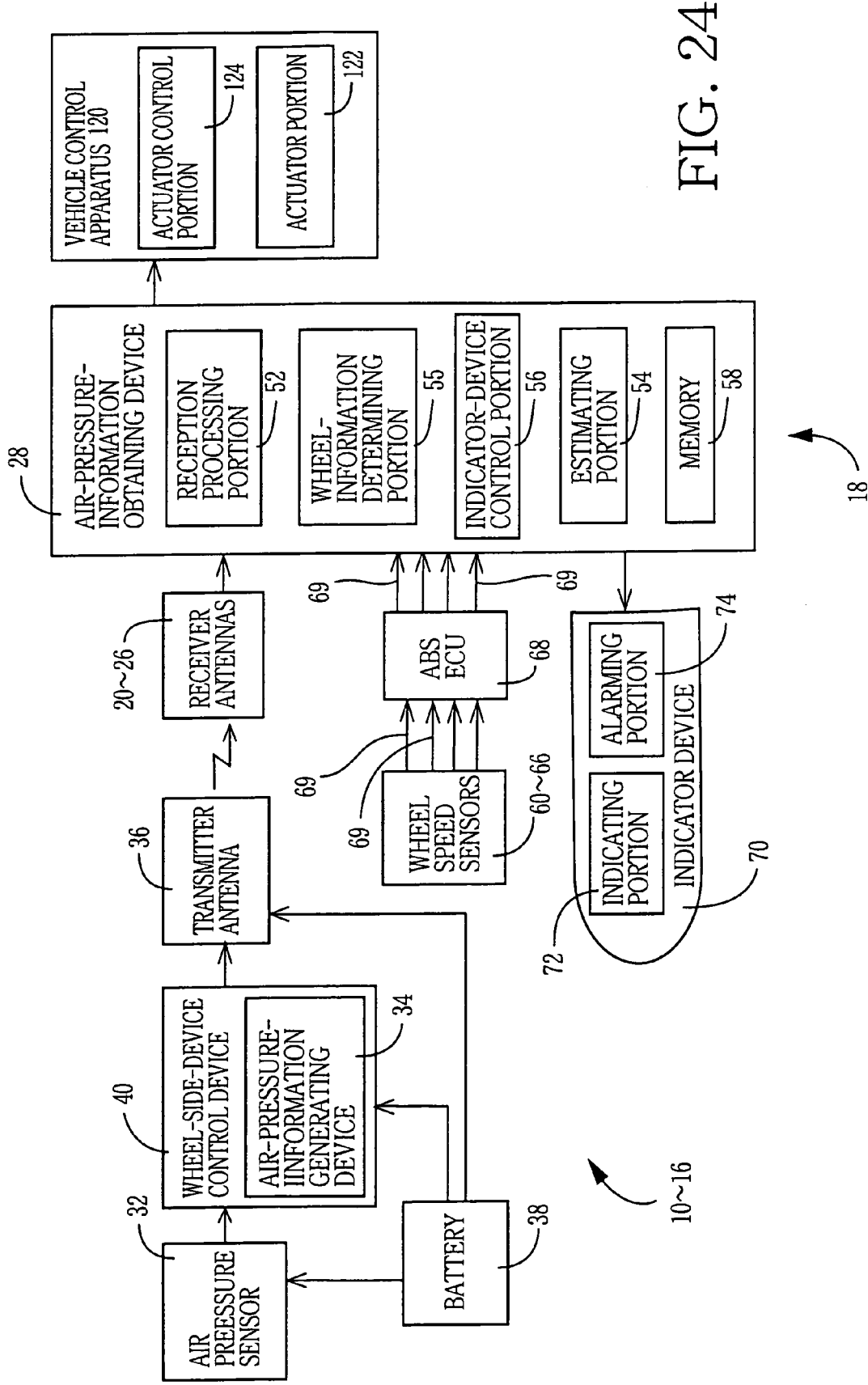
FIG. 24 is a flow chart schematically illustrating the wheel-state obtaining apparatus of FIG. 2, and a vehicle control apparatus, according to another embodiment of the invention.

Further, the air-pressure information obtained by the air-pressure-information obtaining device 28 may be used to control any other devices of the vehicle, such as a suspension system, a steering system, a braking system, a vehicle drive system and a power transmission system. An example of this modification is shown in FIG. 24, wherein a vehicle control apparatus 120 is connected to the air-pressure-information obtaining device 28. The vehicle control apparatus 120 includes a control actuator portion 122, and an actuator control portion 124 which is principally constituted by a computer. The vehicle control apparatus 120 is arranged to receive output signals of various sensors and switches, which do not directly relate to the prevent invention and will not be further described.

The vehicle control apparatus 120 uses the air-pressure information as a main control input under some condition, or as an auxiliary control input under some other condition. In the former case, a control target value is directly determined by the air pressure value of each wheel represented by the air-pressure information. In the latter case, the control target value is determined by the main control input such as a vehicle running state, and the thus determined control target value is compensated or changed by the air pressure value used as the auxiliary control input, or a threshold value used to initiate the control or a control rule is changed on the basis of the air pressure value.

For example, the air pressure value is used as the main control input to control the suspension system of the vehicle such that the vehicle floor level is elevated or the damping effect of the shock absorbers is increased, when the air pressure is lower than a predetermined threshold. The air pressure value is also used as the main control input to control the rear steering angle of a rear steering system of the vehicle, so as to reduce a yaw moment which arises from a difference in the tire air pressure between the right and left tires. In these cases, the vehicle control apparatus 120 is a suspension control apparatus or a rear-steering-angle control apparatus, and the actuator portion 122 is a floor-level adjusting actuator, a shock-absorber damping-effect adjusting valve device or a rear-steering-angle adjusting actuator, while the actuator control portion 124 is a floor-level control unit (electronic control unit: ECU), a damping-effect control unit (suspension control ECU) or a rear-steering-angle control unit (ECU).

For example, the air pressure value is used as the auxiliary control input to control the braking system or the rear steering system. In a braking force control to regulate the braking force of each wheel such that the actual slip ratio of each wheel coincides with a target value, for instance, the target slip ratio of one of the right and left wheels the tire air pressure of which is relatively low is determined to be lower than that of the other wheel the tire air pressure of which is relatively high, so as to reduce the yaw moment of the vehicle which arises from a higher coefficient of friction between the road surface and the right or left tire having the relatively low air pressure, than a coefficient of friction between the road surface and the other tire having the relatively high air pressure. In a vehicle stability control of the braking system to regulate the braking force of each wheel so as to reduce an understeering or oversteering tendency of the vehicle during turning or cornering of the vehicle, for example, the air pressure value is used to change the moment of initiation of the vehicle stability control, such that the vehicle stability control is initiated at an earlier point of time for the wheel having a relatively low tire air pressure, than for the wheel having a relatively high tire air pressure, so as to minimize the forces acting on the tires during the vehicle stability control. In the control of the rear steering system to determine the rear steering angle on the basis of the angle of the steering wheel and the vehicle running speed, for example, the rate of change of the rear steering angle is made lower when the tire air pressures of the rear wheels are relatively low than when the rear tire air pressure are relatively high. This control is effective to prevent abrupt application of a large load to the tires having the relatively low air pressures. The air pressure may also be used to control the vehicle drive system or power transmission system, so as to reduce a vehicle drive torque to be applied to the vehicle driving wheels, when the tire air pressures of the driving wheels are relatively low. This control is effective to reduce the forces acting on the tires of the driving wheels in the longitudinal direction of the vehicle when the air pressures of the tires are relatively low.

In the above cases, the vehicle control apparatus 120 is a braking-force control apparatus, a rear-steering-angle control apparatus, a drive-force control apparatus or a power-transmission control apparatus, and the actuator portion 122 is a braking-force control actuator, a rear-steering actuator, a driver circuit for a throttle-angle control valve or electric motor, or a power-transmission-ratio control valve, while the actuator control portion 124 is a braking-force control unit (ECU), a rear-steering-angle control unit (ECU) or a drive-force control ECU.

In the embodiments described above, the air pressure value is obtained as the first state of each wheel (one state of the vehicle), and the rotating speed of the wheel is obtained as the second state of the wheel (another state of the vehicle). However, the wheel-state obtaining apparatus or vehicle-state obtaining apparatus of this invention may be arranged to obtain any other state of the wheels or the vehicle.

For instance, the wheel-state obtaining apparatus may be arranged to obtain a temperature of the tire of each wheel as the first state of the wheel, or the vehicle-state obtaining apparatus may be arranged to obtain, as states of the vehicle, a load acting on each wheel of the vehicle, a running time or distance of the vehicle after the ignition switch is turned ON (from the OFF state to the ON state), and a temperature of the vehicle (ambient temperature). One example of this modification is shown in FIG. 25.

Figure 25:
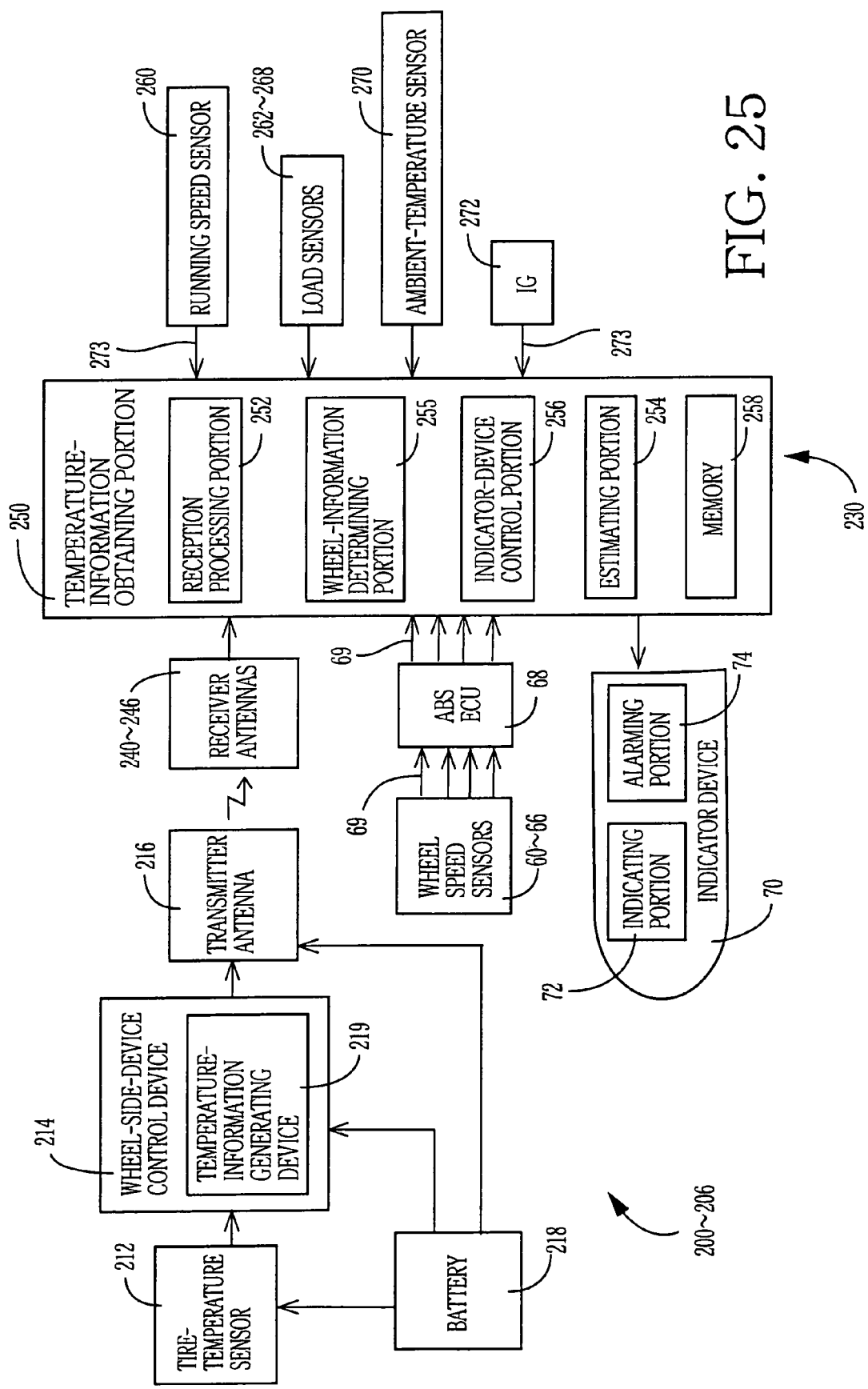
FIG. 25 is a flow chart schematically illustrating a tire-temperature obtaining apparatus provided as a wheel-state obtaining apparatus according to still another embodiment of the present invention.

In the embodiment of FIG. 25, the four wheels are provided with respective wheel-side devices 200–206, each of which includes a tire-temperature sensor 212, a wheel-side-device control device 214, a transmitter antenna 216, and a battery 218. The wheel-side-device control device 214 includes a tire-information generating device in the form of a temperature-information generating device 219, which is arranged to generate wheel-side information (transmitted information) representative of a tire temperature of each wheel, on the basis of the tire temperature detected by the tire-temperature sensor 212. The wheel-side information is transmitted to a body-side device 230 through the transmitter antenna 216.

The body-side device 230 includes four receiver antennas 240–260 corresponding to the respective four wheels, and a temperature-information obtaining device 250. Like the air-pressure-information obtaining device 28 described above, the temperature-information obtaining device 250 includes a reception processing portion 252, an estimating portion 254, a wheel-information determining portion 255, an indicator-device control portion 256, and a memory 258. To the temperature-information obtaining device 250, there are connected a running speed sensor 270, load sensors 362–268 operable to detect loads acting on the respective wheels, an ambient-temperature sensor 270, and an ignition switch 272, through signal lines 273.

The load sensors 262–268 are provided for the respective four wheels, and arranged to detect the loads acting on the wheels, on the basis of strains of non-rotary or stationary bodies in the form of suspension members of the vehicle which are located close to the wheels. The load sensors 262–268 may be provided on the wheels, which are rotary bodies. In this case, the outputs of the load sensors are transmitted to the temperature-information obtaining device 250 through transmitter antennas. The load acting on each wheel may be estimated on the basis of the weight and running state (attitude) of the vehicle. On the basis of a change in the attitude of the vehicle, an amount of shifting of the vehicle load can be obtained, and the load presently acting on each wheel can be estimated on the basis of a standard or normal load on the wheel and the obtained amount of shifting of the vehicle load.

The reception processing portion 252 is arranged to extract, from the wheel-side information received by the receiver antennas 240–246, a tire temperature value detected by the tire temperature sensor 212 for each wheel, and generate detected-tire-temperature information indicative or representative of the detected tire temperature.

The estimating portion is arranged to estimate the tire temperature of each wheel on the basis of the output signals of the ambient temperature sensor 260, load sensors 262–268 and running speed sensor 260, such that the estimated tire temperature increases with an increase in the detected ambient temperature, in the average load on the tires and in the total or cumulative running time or distance of the vehicle. The cumulative running time may be a sum of times after the ignition switch 272 is turned from the OFF state to the ON state, and during which the vehicle running speed is higher than a predetermined threshold value. The cumulative running distance is a sum of running times after the ignition switch 272 is turned ON.

The wheel-information determining portion 255 is arranged to determine one of the detected-tire-temperature information and the estimated-tire-temperature information as tire-temperature information. In the present embodiment, the detected-tire-temperature information is used as the tire-temperature information when the wheel-side information has been received by the receiver antenna 240–246, and the estimated-tire-temperature information is used as the tire-temperature information when the wheel-side information has not been received.

The indicator-device control portion 256 is arranged to determine whether the tire temperature represented by the tire-temperature information is higher than a predetermined upper limit or not. If the tire temperature is determined to be higher than the upper limit, the indicator-device control portion 256 activates the alarming portion 74 of the indicator device 70. As in the preceding embodiments, the indicator device 70 includes the alarming portion 74, and the indicating portion 72 operable to indicate the detected tire temperatures.

In the embodiment of FIG. 25, the tire-temperature information is obtained at least at the predetermined timing of reception of the wheel-side information, which is short enough to prevent delayed activation of the alarming portion 74 to indicate that the tire has an excessively high temperature.

The wheel-information determining portion 255 may be arranged to determine, in principle, the estimated-tire-temperature information as the tire-temperature information, and determine the detected-tire-temperature information as the tire-temperature information only the rate of change of the detected ambient temperature or the wheel load is higher than a predetermined threshold.

When the vehicle has left a garage or has run into or left a tunnel, the ambient temperature of the vehicle may change at a relatively high rate. When the vehicle is running on a bad roadway and the vehicle attitude is considerably changing, the wheel loads may change at a relatively high rate. Under these conditions, the tire temperature estimated on the basis of the changing ambient temperature or wheel load may considerably fluctuate, depending upon the specific rule of estimation of the tire temperature. For this reason, it is desirable to use the detected-tire-temperature information when the rate of change of the ambient temperature or wheel load is higher than the predetermined upper limit.

The determination as to whether the rate of change of the wheel load is higher than the upper limit may be effected on the basis of the output signal of the load sensor 262–268. However, it is possible to determine that the rate of change of the wheel load is higher than the upper limit, when it is determined that the vehicle is running on a bad roadway.

Figure 26:
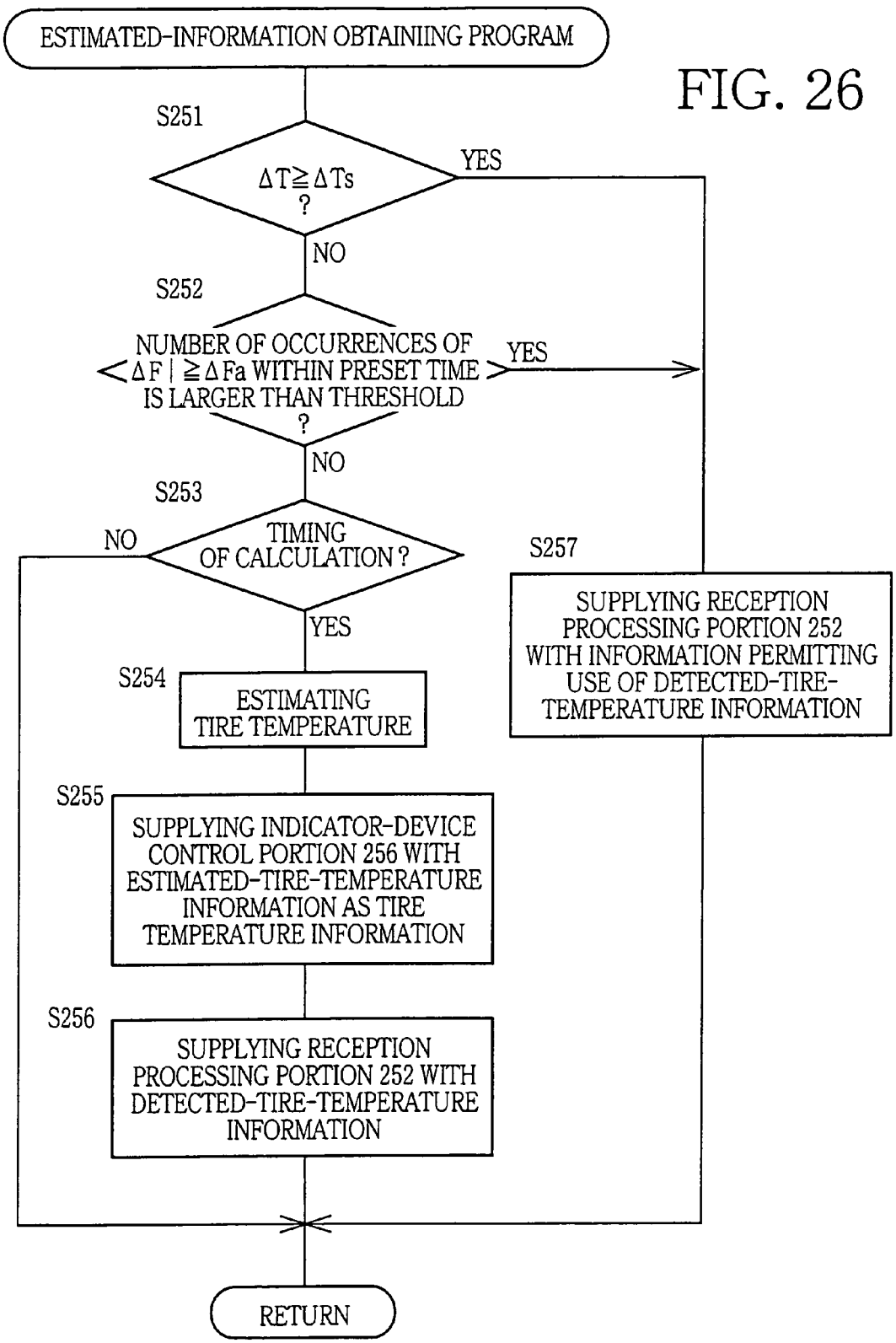
FIG. 26 is a flow chart illustrating an estimated-information obtaining program stored in the body-side device of the tire-temperature obtaining apparatus of FIG. 25.
Figure 27:
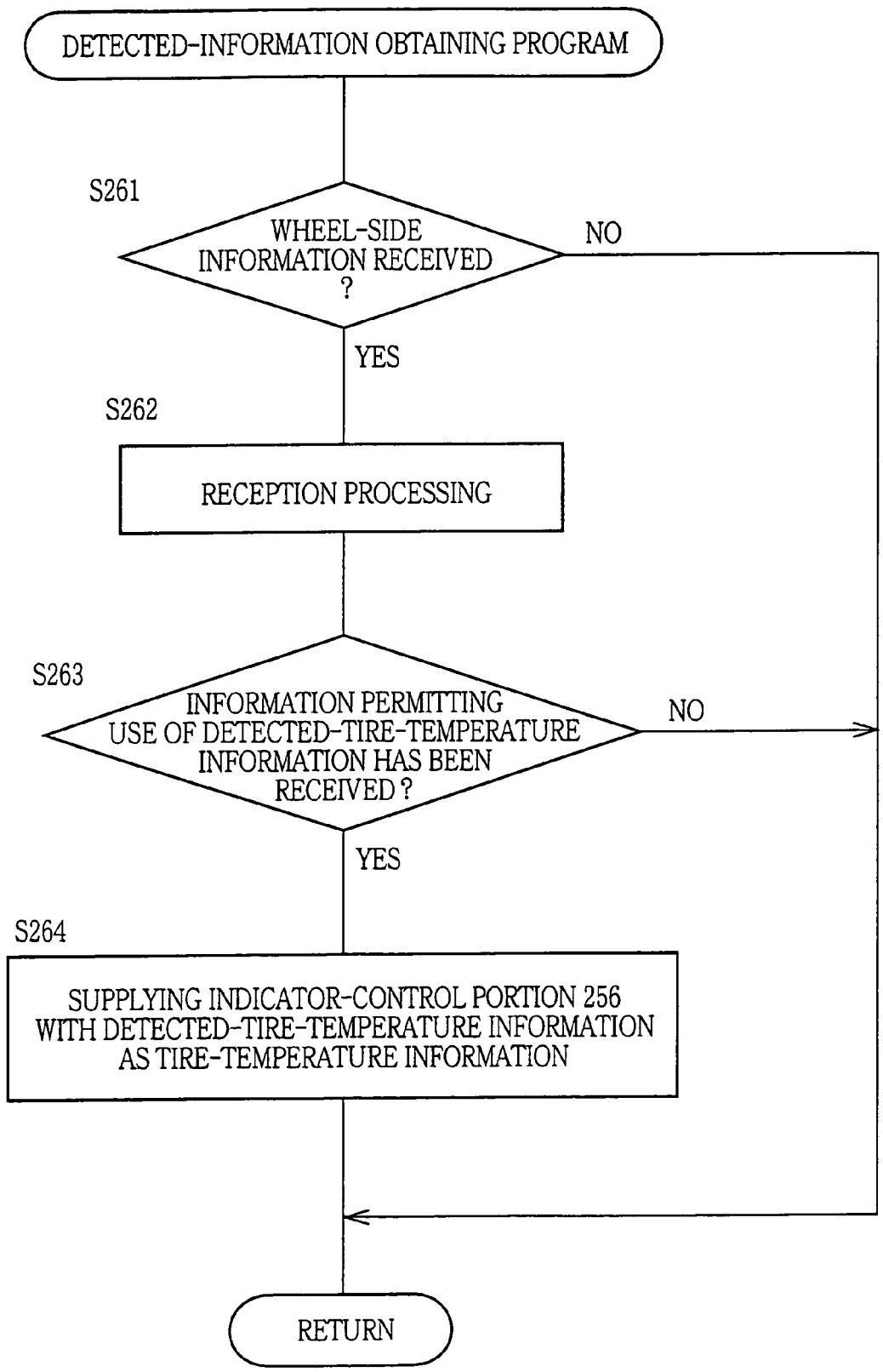
FIG. 27 is a flow chart illustrating a detected-information obtaining program stored in the body-side device of the apparatus of FIG. 25.

The estimating portion 254 is arranged to execute an estimated-information obtaining program illustrated in the flow chart of FIG. 26, while the reception processing portion 252 is arranged to execute a detected-information obtaining program illustrated in the flow chart of FIG. 27. These programs will be described only briefly, since the programs are similar to those described above with respect to the preceding embodiments.

The estimated-information obtaining program of FIG. 26 executed by the estimating portion 254 is initiated with steps S251 and S252 to determine whether the amount of change of the ambient temperature is equal to or larger than a predetermined value, and whether the number of occurrences within a preset time of a condition in which the absolute value of the amount of change of the wheel load is equal to or larger than a predetermined value is larger than a predetermined threshold value. If a negative decision (NO) is obtained in both steps S251 and S252, the control flow goes to step S253 to determine whether the present point of time is the predetermined timing of calculation of the estimated value of the tire temperature. If an affirmative decision (YES) is obtained in step S253, the control flow goes to steps S254 and S255 to estimate the tire temperature of the wheel in question and supply the indicator-device control portion 256 with the estimated-tire-temperature information as the tire-temperature information. Step S255 is followed by step S256 to supply the reception processing portion 252 with information inhibiting the use of the detected-tire-temperature information. If an affirmative decision (YES) is obtained in either one of steps S251 and S252, the control flow goes to step S257 to supply the reception processing portion 252 with the information permitting the use of the detected-tire-temperature information.

In the detected-information obtaining program in FIG. 27, an affirmative decision (YES) is obtained in step S263 when the reception processing portion 252 has received from the estimating portion 254 the information permitting the use of the detected-tire-temperature information. In this case, the control flow goes to step S264 to supply the indicator-device control portion 256 with the detected-tire-temperature information as the tire-temperature information.

As described above, the embodiment of FIGS. 25–27 is arranged to determine or use the detected-tire-temperature information as the tire-temperature information when the accuracy of estimation of the estimated-tire-temperature information is relatively low. Thus, the tire-temperature can be accurately obtained.

The first state of each wheel in the form of the tire temperature of the wheel can be estimated on the basis of the vehicle state in the form of the running time or distance of the vehicle after the ignition switch 272 has been turned ON. In other words, estimation as to whether the tire has been overheated may be based on the total or cumulative running time or distance of the vehicle. More specifically described, it is possible to estimate that the tire has been overheated, when the cumulative vehicle running time or distance has reached a predetermined value.

The tire temperature may also be estimated on the basis of the rotating speed of the wheel, rather than the vehicle running speed. That is, the cumulative running time or distance of the vehicle can be estimated on the basis of the cumulative peripheral speed of the wheel, so that the tire temperature can be estimated on the basis of the thus estimated cumulative vehicle running time or distance. Further, the condition in which the wheel is braked or accelerated may be detected on the basis of the state of change of the rotating speed of the wheel. The tire temperature of the wheel can be estimated on the basis of the repeated braking or accelerating operations of the wheel. It is possible to estimate that the tire temperature is higher where the number of repetition of the braking or accelerating operations of the wheel is relatively large than where the number of repetition is relatively small. The braking and accelerating operations may be detected on the basis of the outputs of a longitudinal acceleration sensor provided to detect the longitudinal acceleration value of the vehicle.

The first state of each wheel may be forces acting on its tire, while the state of the vehicle may be braking, accelerating and wheel steering conditions of the vehicle. An example of this modification is illustrated in FIG. 28.

Figure 28:
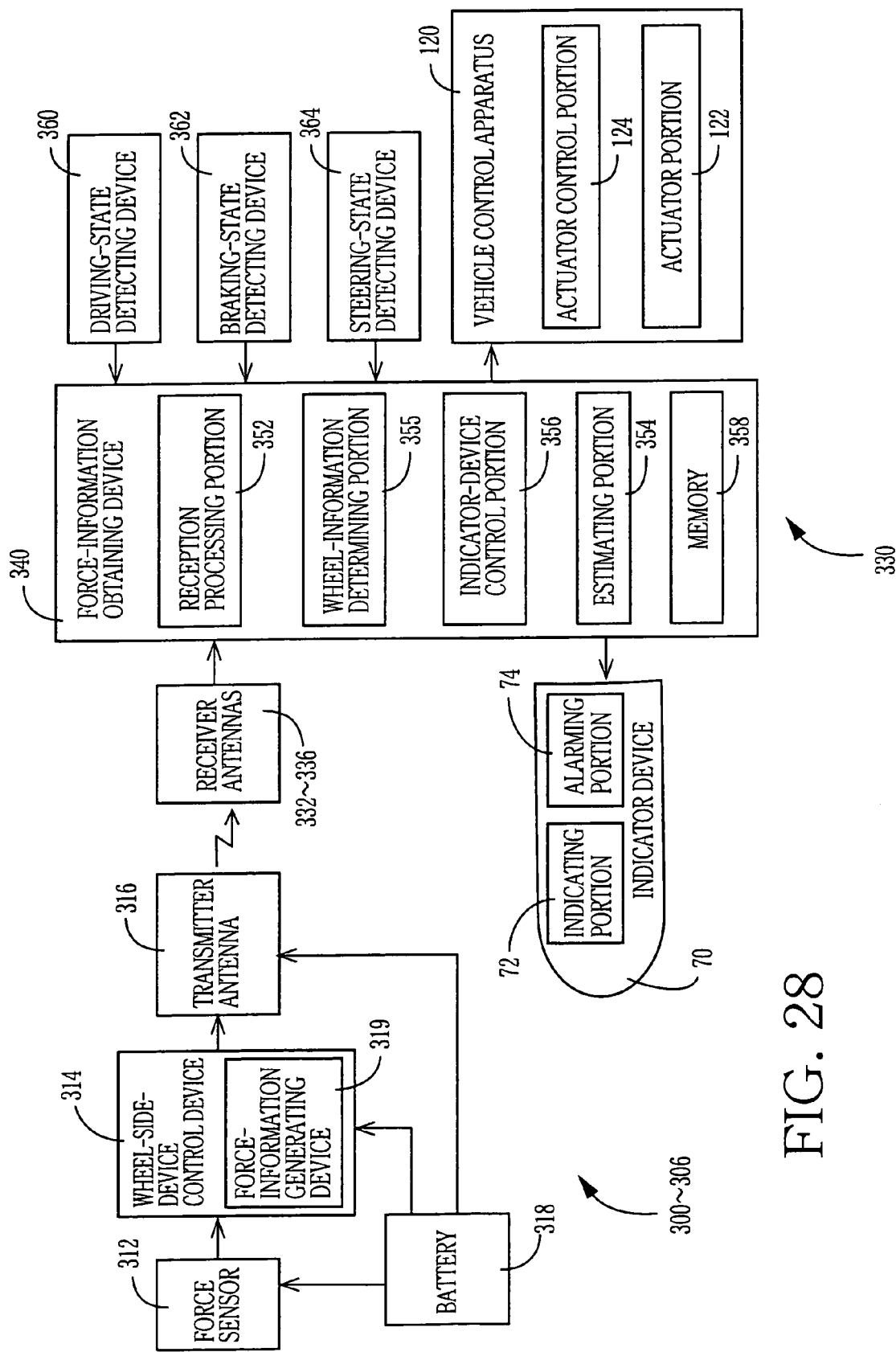
FIG. 28 is a block diagram schematically illustrating a tire-forces obtaining apparatus provided as a wheel-state obtaining apparatus according to another embodiment of this invention.

In the embodiment of FIG. 28, the four wheels are provided with respective wheel-side devices 300–306, each of which includes a force sensor 312, a wheel-side-device control device 314, a transmitter antenna 316 and a battery 318. The wheel-side-device control device 314 includes a tire-information generating device in the form of a force-information generating device 319. The force sensor 312 is operable to detect forces which respectively act on the corresponding tire in the longitudinal, lateral and vertical directions of the vehicle. The force sensor 312 is provided on a rotary body, and includes a plurality of strain detectors. Where the strain detectors consist of three strain detectors arranged to be deformed by forces acting thereon in the respective longitudinal, vertical and lateral directions and not to be deformed by other forces, these three strain detectors detect those forces acting on the tire in the longitudinal, vertical and lateral directions. Where the strain detectors consist of a strain detector arranged to detect a force acting thereon in the lateral direction of the vehicle, and strain detectors arranged to detect forces acting thereon in directions parallel to the plane of the wheel, the forces acting on the tire in the longitudinal and vertical directions of the vehicle can be detected on the basis of the outputs of the strain detectors and an angle of rotation of the wheel.

The forces acting on the tire in the longitudinal, vertical and lateral directions detected by the force sensor 312 are received by the wheel-side-device control device 314, and transmitted through the transmitter antenna 316 to a body side device 330. However, those forces detected by the strain detectors of the force sensor 312 may be directly received by the body-side device 330.

The body-side device 330 includes receiver antennas 332–338 corresponding to the respective four wheels, and a force-information obtaining device 340. Like the air-pressure-information obtaining device 28, 28b and the temperature-information obtaining device 250 provided in the preceding embodiments, the force-information obtaining device 340 includes a reception processing portion 352, an estimating portion 354, a wheel-information determining portion 355, an indicator-device control portion 356, and a memory 358. To the force-information obtaining device 340, there are connected a driving-state detecting device 360 operable to detect a driving or accelerating state of the vehicle, a braking-state detecting device 362 operable to detect a braking-state of the vehicle, and a steering-state detecting device 364 operable to detect a steering-state of the wheels.

The driving-state detecting device 360 includes at least one of a drive-system-state detecting device operable to detect an operating state of a vehicle drive system, a power-transmission-system-state detecting device operable to detect an operating state of a vehicle power-transmission system, and an accelerator-pedal-state detecting device operable to detect an operating state of an accelerating member in the form of an accelerator pedal. The driving or accelerating state of the vehicle can be detected on the basis of the detected operating state of the vehicle drive system or power-transmission system or the operating state of the accelerating member. Where the vehicle drive system includes an internal combustion engine, the operating state of the vehicle drive system may be detected on the basis of the detected amount of opening of a throttle valve or the detected speed of the engine. Where the vehicle drive system includes an electric motor, the operating state of the vehicle drive system may be detected on the basis of the detected state of a driver circuit provided to control an electric current to be applied to the electric motor. The detected operating state of the power-transmission system indicates the state in which vehicle drive power is transmitted to the drive wheels of the vehicle. The driving state of the vehicle indicates the state in which the drive wheels are driven or not.

Where the braking system of the vehicle is arranged to force a friction member onto a rotor rotating with each wheel of the vehicle, the braking-state detecting device 362 includes at least one of a force detector operable to detect a braking force with which the friction member is forced onto the rotor, and a brake-pedal-state detecting device operable to detect an operating state of a brake operating member in the form of a brake pedal. Where the braking system is hydraulically operated, the braking force can be detected on the basis of a hydraulic pressure applied to activate the friction member. Where the braking system includes an electric motor, the braking force can be detected on the basis of a force produced by the electric motor. Where the braking system includes a hydraulically operated brake cylinder, the braking-state detecting device 362 may be arranged to detect the hydraulic pressure in the brake cylinder, or any hydraulic pressure equivalent to the pressure in the brake cylinder, for instance, the pressure in a master cylinder. The braking-state detecting device 362 is arranged to detect the braking state of each wheel.

The steering-state detecting device 364 may include a steering-angle sensor operable to detect the steering angle of the steering wheel of the vehicle, and a running-speed detecting device operable to detect the running speed of the vehicle. Alternatively, the steering-state detecting device 364 may include a detecting device operable to detect the operating state of the power steering system of the vehicle, or a yaw rate sensor or a lateral acceleration sensor which is arranged to detect the yaw rate or the lateral acceleration of the vehicle. The steering angle, running speed, yaw rate and lateral acceleration value of the vehicle indicate the state in which the vehicle is turning, and the steering state of each wheel can be estimated on the state of turning of the vehicle. The steering-state detecting device 364 may be referred to as a turning-state detecting device operable to detect the state of turning of the vehicle.

The reception processing portion 352 is arranged to obtain detected-force information indicative or representative of the forces acting on each wheel, on the basis of the wheel-side information received through the receiver antennas 332–338.

The estimating portion 354 is arranged to estimate the forces on the wheel in the longitudinal, lateral and vertical directions, on the basis of the driving state of each drive wheel, the braking state of each wheel, and the steering state of each wheel.

For example, the force acting on the wheel in the longitudinal direction of the vehicle can be estimated on the basis of the driving state or braking state of the wheel. Further, a shift of a load on the vehicle may be estimated by estimating the acceleration or deceleration value of the vehicle on the basis of the accelerating or braking state of each wheel. The amount of the load shift with respect to a predetermined reference load value is added to the force which acted on the wheel in the vertical direction and which was detected by the force sensor 312. Thus, the force currently acting on each wheel in the vertical direction can be estimated. Further, the force acting on each wheel in the lateral direction may be estimated on the basis of the steering state of the wheel. The amount of the load shift may also be estimated on the basis of outputs of a floor-level sensing device arranged to detect the floor level of the vehicle.

While the wheel-state obtaining apparatus may be provided with means for informing the vehicle operator of the thus estimated vertical, longitudinal and lateral forces acting on each wheel, the provision of this means is not essential. For example, the apparatus may be provided with means for indicating whether the friction coefficient of the roadway surface or the state of turning of the vehicle is highly likely to reach a critical value or state.

For instance, the friction coefficient of the roadway surface is obtained on the basis of the longitudinal and vertical forces acting on each other, and the obtained friction coefficient may be indicated on the indicating portion 72 of the indicator device 70. The indicator-device control portion 356 may be arranged to determine whether the obtained friction coefficient is lower than a predetermined lower limit, and activate the indicating portion 72 when the friction coefficient is lower than the lower limit, that is, when the roadway surface is excessively or extremely slippery.

The indicator-device control portion 356 may be arranged to: obtain a target value of the lateral force acting on the wheel, on the basis of the steering angle of the steering wheel and the vehicle running speed and yaw rate; calculate a difference of a detected or estimated value of the lateral force with respect to the obtained target value; determine whether the difference (=target value−detected or estimated value) is smaller than a predetermined threshold; and if the difference is smaller than the threshold, activate the indicator device 70 to indicate that the difference is smaller than the threshold.

The estimation as to whether the turning state of the vehicle is critical or not may be effected on the basis of a relationship between the cornering force and the steering angle. The cornering force (force acting on the wheel in a direction perpendicular to the running direction of the vehicle) can be obtained on the basis of the lateral force acting on the wheel in a direction perpendicular to the longitudinal direction of the vehicle, and the steering angle. When the rate of increase of the cornering force is lower than the rate of increase of the steering angle, the turning state of the vehicle is more critical than when the former is higher than the latter.

Further, cornering power may be obtained on the basis of the cornering force and the steering angle, and a self-aligning torque may be obtained on the basis of the lateral force, friction force and lateral slipping angle of the wheel. The lateral slipping angle is considered to be held substantially equal to the steering angle before the turning state of the vehicle has become critical.

The wheel-information determining portion 355 is arranged to determine the detected-force information as tire-force information when the wheel-side information has been received by the receiver antenna 332–338, and determine estimated-force information as the tire-force information when the wheel-side information has not been received.

Thus, the force-information obtaining device 340 obtains the tire-force information indicative or representative of the forces acting on the tire of each wheel at the predetermined timing of reception of the wheel-side information, making it possible to regularly inform the vehicle operator of the necessary information.

The wheel-information determining portion 355 may be arranged to inhibit the use of the estimated-force information when the amount of slipping or locking of each wheel in the longitudinal or lateral direction is larger than a predetermined threshold, since the accuracy of estimation of the estimated-force information is low in such slipping or locking state of the wheel. When the braking system or drive system is in operation to effect an anti-lock, traction or vehicle stability control, the wheel-information determining portion 355 may be arranged to also inhibit the use of the estimated-force information during the anti-lock, traction or vehicle stability control. The force sensor 312 and the force-information obtaining device 340 need not be arranged to detect or obtain all of the forces acting on each wheel in the above-indicated three directions, and may be arranged to detect or obtain at least one of the three forces in the respective longitudinal, vertical and lateral directions.

To the force-information obtaining device 340, there are connected the vehicle control apparatus 120, which includes the actuator portion 122 and the actuator control portion 124, as described above with respect to the embodiment of FIG.

24. The vehicle control device apparatus 120 is supplied with the detected-force information or the estimated-force information.

The vehicle control apparatus 120 is arranged to control the state of the vehicle, on the basis of the longitudinal, vertical and lateral forces acting on each wheel (tire). In this case, too, the forces of the wheels are used as a main control input under some conditions, or an auxiliary control input under some other conditions.

For example, the actuator portion 122 of the vehicle control apparatus 120 may be a braking-force control actuator which is controlled to control the braking force to be applied to each wheel such that the longitudinal force acting on each wheel under braking coincides with a target value. Alternatively, the actuator portion 122 may be a rear-steering actuator which is controlled to control the rear steering system such that the lateral force acting on each wheel during turning of the vehicle coincides with a target value.

The control rule used for the anti-lock braking control of each wheel may be changed depending upon the friction coefficient of the roadway surface as estimated on the basis of the vertical and longitudinal forces of the wheel. Namely, the rate of increase in the braking pressure applied to the wheel is made higher when the friction coefficient is relatively high, and the rate of reduction in the braking pressure is made higher when the friction coefficient is relatively low.

In each of the preceding embodiments, the wheel-side information representative of the state of each wheel is transmitted in a wireless fashion or by radio or wireless communication, and the wheel state is detected by the device disposed on the rotary member in the form of the wheel. However, this wheel-state detecting device may be disposed on a stationary member, rather than a rotary member such as the wheel. Even where the detecting device is disposed on the stationary member, the wheel-side information may be transmitted by radio communication, if it is difficult to connect the detecting device and information-processing or obtaining device of the body-side device by signal lines. An example of this modification is shown in FIG. 29.

Figure 29:
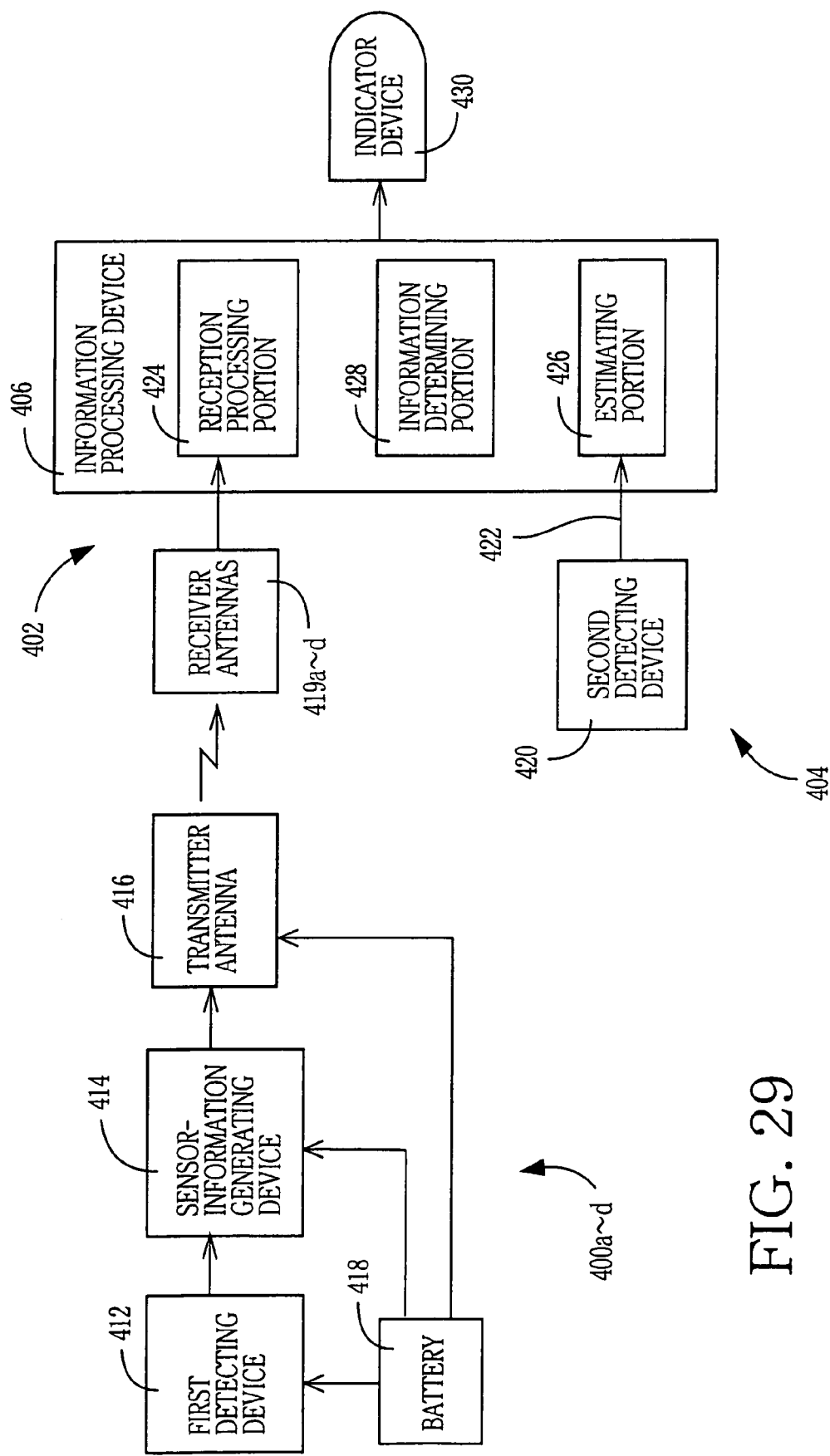
FIG. 29 is a block diagram schematically illustrating a braking-torque obtaining apparatus provided as a wheel-state obtaining apparatus according to yet another embodiment of the invention.

A vehicle-state obtaining apparatus shown in FIG. 29 includes four remote detecting devices 400a–400d, a remote-information obtaining device 402, a wire-transmission-dependent-information obtaining device 404, and an information-processing device 406. The remote detecting devices 400a–400d are provided for the respective four wheels, and arranged to detect braking torques applied to the respective wheels. These remote detecting devices 400a–400d are not disposed on rotary members, but are disposed on stationary members in the form of brake calipers, which are unsprung members of the vehicle.

Each of the remote detecting devices 400a–400d includes a first detecting device in the form of a braking-torque sensor 412, a sensor-information generating device 414, a transmitter antenna 416, and a battery 418. The sensor-information generating device 414 is arranged to generate sensor information on the basis of the output of the braking-torque sensor 412, and the generated sensor information is transmitted through the transmitter antenna 416. The sensor information indicates or represents the braking torque as detected by the braking-torque sensor 412.

The information-processing device 406 includes four receiver antennas 419a–419d corresponding to the respective wheels, a reception processing portion 424, an estimating portion 426 and an information-determining portion 428. To the estimating portion 426, there is connected through a signal line 422 a second detecting device in the form of a master-cylinder pressure sensor 420. The information-processing device 406 is disposed on a sprung member of the vehicle.

The reception processing portion 424 is arranged to obtain remote information indicative of the braking torque values, on the basis of the information received by the receiver antennas 419a–410d. The receiver antennas 419a–419d and the reception processing portion 424 constitute a major part of the remote-information obtaining device 402.

The estimating portion 416 is arranged to estimate the braking force of each wheel on the basis of the sensor information which represents the master cylinder pressure and which is received through the signal line 422, and obtain wire-transmission-dependent information representative of the estimated braking torque. The wire-transmission-dependent-information obtaining device 404 is constituted by the master-cylinder-pressure sensor 420, signal line 422 and estimating portion 416.

The information-determining portion 428 is arranged to determine, as braking-torque information, one of the remote information representative of the detected braking torque and the wire-transmission-based information representative of the estimated braking torque. For example, the information-determining portion 428 determines the remote information as the braking-torque information when the information has been received through the receiver antenna 419a–419d, and determine the wire-transmission-dependent information as the braking-torque information when the information has not been received through the receiver antenna 419a–419d. Further, the information-determining portion 428 determines the remote information as the braking-torque information when the amount of slipping of the wheel under braking is relatively large, and determines the wire-transmission-dependent information as the braking-torque information when the amount of slipping of the wheel is relatively small. It is noted that the accuracy of estimation of the braking torque based on the detected master cylinder pressure is low, when the amount of slipping of the wheel under braking is relatively large. The indicator device 430 is supplied with the braking-torque information selected by the information-determining portion 428.

In the embodiment of FIG. 28, each remote detecting device 400a–400d is disposed on the brake caliper and arranged to detect the braking torque of the corresponding wheel. However, each remote detecting device may be disposed on a stationary member adjacent to the corresponding wheel, and arranged to detect the rotating speed of the wheel. The rotating speed of a driving wheel may be estimated on the basis of the rotating sate of the output shaft of a vehicle-drive system, or an operating state of a power-transmission system. In this case, the remote information representative of the detected wheel speed, or the information representative of the wheel speed estimated on the basis of the operating state of the vehicle drive system or power-transmission system may be used as wheel-speed information. It is not essential provide a plurality of remote detecting devices. Namely, the vehicle-state obtaining apparatus may use only one remote detecting device. Further, each remote detecting device need not be arranged to detect the state of the corresponding wheel.

Figure 30:
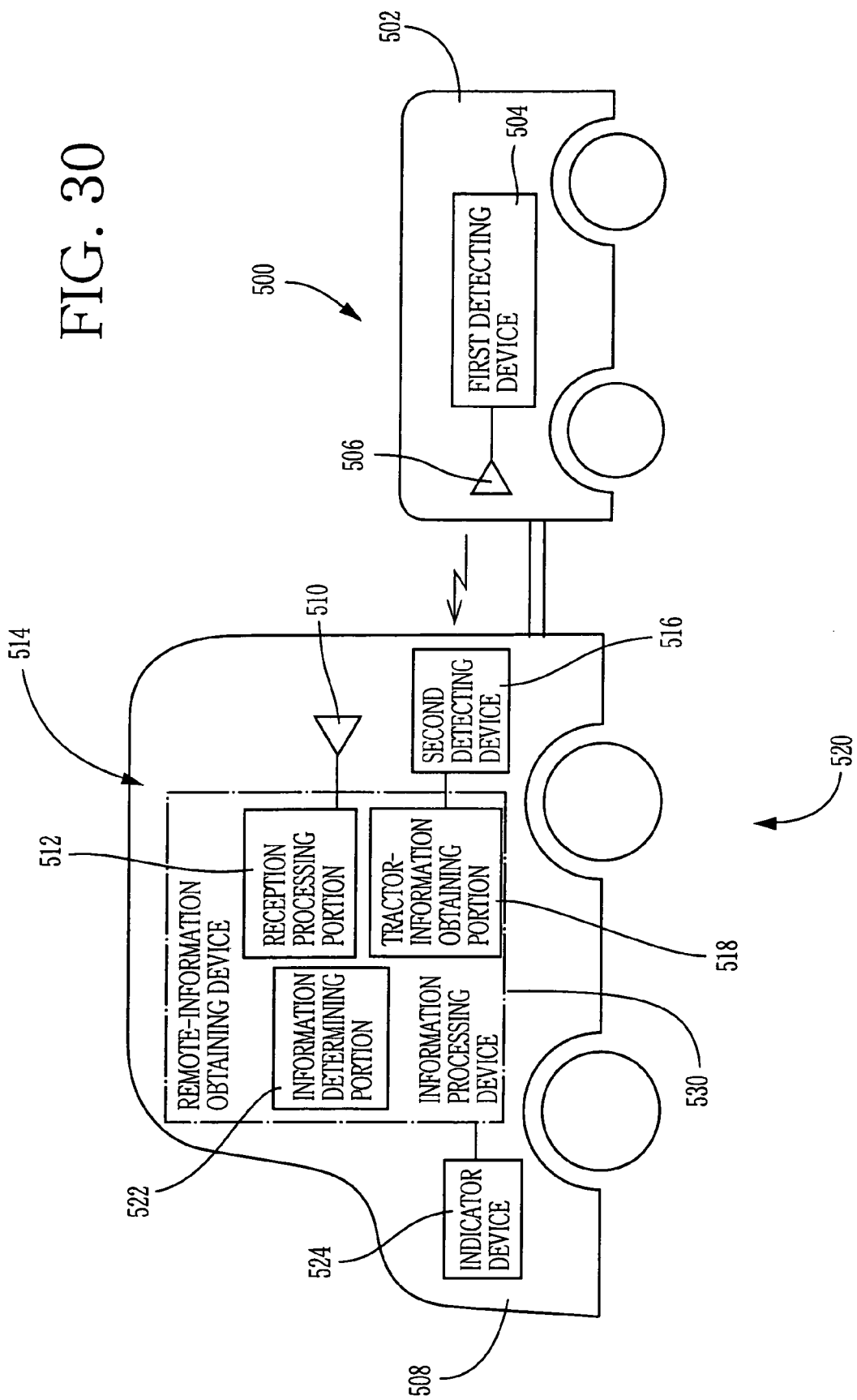
FIG. 30 is a view schematically showing a vehicle-state obtaining apparatus according to still another embodiment of this invention.

Further, a remote detecting device 500 may be provided on a towed vehicle 502, as shown in FIG. 30. The remote detecting device 500 includes a first detecting device 504 arranged to detect the state of the towed vehicle 502 (e.g., running speed, wheel rotating speeds, braking forces generated by a braking system), and a transmitter antenna 506 operable to transmit information representative of the detected state of the towed vehicle 502.

On the other hand, a tractor vehicle 508 is provided with (a) a remote-information obtaining device 514 including an receiver antenna 510 and a reception processing portion 512, (b) a wire-transmission-dependent-information obtaining device 520 including a second detecting device 516 arranged to detect the state of the tractor vehicle 508, like the first detecting 502 of the towed vehicle 508, and a tractor-information obtaining portion 518 which is connected through a signal line to the second detecting device 516 and which processes the information received from the second detecting device 516, to obtain wire-transmission-dependent information representative of the detected state of the tractor vehicle 508, (c) an information determining portion 522, and (d) an indicator device 524. The remote-information obtaining device 514, the wire-transmission-dependent-information obtaining device 520, and the information determining portion 522 constitute a major part of an information processing device 530. In the present embodiment, the information determining portion 522 determines, as towed-vehicle-information, one of the remote information representative of the detected state of the towed vehicle 502 and the wire-transmission-dependent information obtained by the tractor-information obtaining portion 518. In this case, both of the remote information and the wire-transmission-dependent information are detected information representative of the states of the towed vehicle 502 and the tractor vehicle 508. Namely, the state of the tractor vehicle 508 is considered to represent the state of the towed vehicle 502, and is used to estimate the state of the towed vehicle 502.

It will be understood that the present invention may be embodied with various other changes, modifications and improvements, such as those described in the DISCLOSURE OF THE INVENTION, which may occur to those skilled in the art.

The invention claimed is:

1. A wheel-state obtaining apparatus comprising:
a wheel-side device provided for each of at least one of a plurality of wheels of a vehicle and including a first-wheel-state detecting device operable to detect a first state of the corresponding wheel and a wheel-side-information transmitting device operable to transmit, in a wireless fashion at a time interval, wheel-side information representative of said first state of said corresponding wheel detected by said first-wheel-state detecting device; and
a body-side device disposed on a body of the vehicle and including (a) a detected-information obtaining device operable to obtain detected information representative of the first state of said corresponding wheel detected by said first-wheel-state detecting device, (b) a vehicle-state detecting device operable to detect a state of the vehicle, (c) an estimated-information obtaining device operable to estimate said first state of said corresponding wheel on the basis of at least the state of the vehicle detected by said vehicle-state detecting device, and obtain estimated information representative of the estimated first state, and (d) a determining device operable to determine one of said detected information and said estimated information, as wheel-state information representative of said first state of said corresponding wheel,
and wherein said estimated-information obtaining device is operable to obtain said estimated information, during a period between a moment of last reception of said wheel-side information by said body-side device from said wheel-side-information transmitting device, and a moment which is said time interval after said moment of last reception, said determining device including a first determining portion operable to determine, as said wheel-state information, said estimated information obtained during said period.

2. A wheel-state obtaining apparatus according to claim 1, wherein said determining device includes an individually determining portion operable for each of said plurality of wheels, independently of each other, such that one of said detected information and said estimated information is determined as said wheel-state information for each of said plurality of wheels.

3. A wheel-state obtaining apparatus according to claim 1, wherein said determining device includes an overall determining portion operable for all of said plurality of wheels, such that one of said detected information and said estimated information is determined as said wheel-state information, commonly for all of said plurality of wheels.

4. A wheel-state obtaining apparatus according to claim 1, wherein said determining device includes a detection-failure estimated-information obtaining portion operable to determine said detected information as said wheel-state information when said first state of said corresponding wheel has been detected by said first-wheel-state detecting device, and determine said estimated information as said wheel-state information when said first state has not been detected by said first-wheel-state detecting device.

5. A wheel-state obtaining apparatus according to claim 1, wherein said wheel-side device further includes an electric power source operable to supply said wheel-side-information transmitting device and said first-wheel-state detecting device with an electric energy, and said body-side device further includes a receiving device operable to receive said wheel-side information transmitted from said wheel-side device, said detected-information obtaining device including a detected-information extracting portion operable to extract from said wheel-side information said detected information representative of the first state of said corresponding wheel.

6. A wheel-state obtaining apparatus according to claim 5, wherein said determining device includes a reception-condition-dependent determining portion operable to determine one of said detected information and said estimated information as said wheel-state information, on the basis of a condition of reception of said wheel-side information by said receiving device.

7. A wheel-state obtaining apparatus according to claim 5, wherein said determining device further includes a second determining portion operable to determine said estimated information as said wheel-state information when said wheel-side information has not been normally received by said receiving device, due to at least one of an abnormality of said wheel-side device, an abnormality of said receiving device, and a noise included in said wheel-side information, and determine said detected information as said wheel-state information when said wheel-side information has been normally received by said receiving device.

8. A wheel-state obtaining apparatus according to claim 7, wherein said determining portion determines said estimated information as said wheel-state information when said wheel-side information received by said receiving device is abnormal, and determines said estimated information as said wheel-state information when said wheel-state information received by said receiving device is normal.

9. A wheel-state obtaining apparatus according to claim 5, wherein said determining device includes a reception-failure estimated-information determining portion operable to determine said estimated information as said wheel-state information when said wheel-side information has not been received by said receiving device, at a predetermined timing of reception of said wheel-side information by said receiving device.

10. A wheel-state obtaining apparatus according to claim 9, wherein said wheel-side-information transmitting device includes a periodically transmitting portion operable to transmit said wheel-side information at a predetermined interval of transmission.

11. A wheel-state obtaining apparatus according to claim 5, wherein said wheel-side-information transmitting device includes a periodically transmitting portion operable to transmit said wheel-side information at a predetermined interval of transmission, and said estimated-information obtaining device is operable to obtain said estimated information during a predetermined interval of reception of said wheel-side information by said receiving device.

12. A wheel-state obtaining apparatus according to claim 5, wherein said determining device includes a reception-condition determining portion operable to determine whether a ratio of reception of said wheel-side information by said receiving device is relatively high or low, and a reception-condition-dependent determining portion operable to determine said detected information as said wheel-state information when said reception-condition determining portion determines that said ratio of reception is relatively high, and determine said estimated information as said wheel-state information when said reception-condition determining portion determines that said ratio of reception is relatively low.

13. A wheel-state obtaining apparatus according to claim 5, wherein said estimated-information obtaining device includes a detected-state estimating portion operable to estimate said first state of said corresponding wheel after last reception of said wheel-side information by said receiving device, on the basis of at least said first state of said corresponding wheel represented by the wheel-side information received last by said receiving device.

14. A wheel-state obtaining apparatus according to claim 13, wherein said vehicle-state detecting device includes a second-wheel-state detecting device operable to detect a second state of each of at least one of said plurality of wheels, said second state being different from said first state, and said detected-state estimating portion estimates said first state of said corresponding wheel, on the basis of said first state represented by the wheel-side information received last by said receiving device, and said second state detected by said second-wheel-state detecting device.

15. A wheel-state obtaining apparatus according to claim 5, wherein said wheel-side device further includes a transmission control device operable to control a state of transmission of said wheel-side information from said wheel-side-information transmitting device.

16. A wheel-state obtaining apparatus according to claim 15, wherein said transmission control device includes at least one of (a) a transmission permitting/inhibiting portion operable to permit or inhibit transmission of said wheel-side information from said wheel-side-information transmitting device, on the basis of a state of change of said first state of said corresponding wheel detected by said first-wheel-state detecting device, and (b) a transmission restricting portion operable to restrict the transmission of said wheel-side information from said wheel-side-information transmitting device, when the change of said first state detected by said first-wheel-state detecting device is slower than a predetermined threshold.

17. A wheel-state obtaining apparatus according to claim 15, wherein said wheel-side device further includes (a) a wheel-side-information generating device operable to generate said wheel-side information on the basis of said first state of said corresponding wheel detected by said first-wheel-state detecting device, and (b) a generating-device control device operable to control said wheel-side-information generating device on the basis of a state of change of said first state detected by said first-wheel-state detecting device.

18. A wheel-state obtaining apparatus according to claim 15, wherein said body-side device further includes a transmission-state-control-information generating device operable to transmit to said wheel-side device transmission-state control information indicative of a state of transmission of said wheel-side information from said wheel-side-information transmitting device, and said wheel-side device further includes a body-side-information receiving device operable to receive information from said body-side device, said transmission control device controlling said wheel-side-information transmitting device according to said transmission-state control information received by said body-side-information receiving device.

19. A wheel-state obtaining apparatus according to claim 18, wherein transmission-state-control-information transmitting device is operable to transmit to said wheel-side device at least one of (a) information which permits the transmission of said wheel-side information, and (b) information which requires the transmission of said wheel-side information, when an accuracy of said estimated information obtained by said estimated-information obtaining device is lower than a predetermined threshold.

20. A wheel-state obtaining apparatus according to claim 1, wherein said vehicle-state detecting device includes a second-wheel-state detecting device operable to detect a second state of each of at least one of said plurality of wheels, said second state being different from said first state.

21. A wheel-state obtaining apparatus according to claim 20, wherein said detected-state estimating portion includes an estimating portion operable to estimate said first state of said corresponding wheel, according to a predetermined rule on the basis of said second state of each of said at least one of said plurality of wheels detected by said second-wheel-state detecting device, and a rule-changing portion operable to change said predetermined rule on the basis of said first state of said corresponding wheel represented by said detected information which has been extracted by said detected-information obtaining device from the last received wheel-side information.

22. A wheel-state obtaining apparatus according to claim 20, wherein said detected-state estimating portion includes a provisionally estimating portion operable to obtain a provisional estimated value of said first state of said corresponding wheel on the basis of said second state of each of said at least one of said plurality of wheels detected by said second-wheel-state detecting device, and an estimated-information obtaining portion operable to compensate said provisional estimated value of said first state on the basis of said first state represented by said detected information extracted from said wheel-side information which has been received last by said receiving device, said estimated-information obtaining portion determining the compensated provisional estimated value of said first state as said estimated information.

23. A wheel-state obtaining apparatus according to claim 20, wherein said detected-state estimating portion includes a provisionally estimating portion operable to obtain a provisional estimated value of said first state of said corresponding wheel on the basis of said second state of each of said at least one of said plurality of wheels detected by said second-wheel-state detecting device, and a final-estimated-value obtaining portion operable to compensate said provisional estimated value of said first state on the basis of a predetermined relationship between said first state represented by said detected information extracted from said wheel-side information received last by said receiving device, and the provisional estimated value obtained at a moment substantially coincident with a moment at which said wheel-side information was received last by said receiving device, said final-estimated-value obtaining portion determining the compensated provisional estimated value of said first state as a final estimated value of said first state.

24. A wheel-state obtaining apparatus according to claim 1, wherein said estimated-information obtaining device includes an other-wheel-dependent estimating portion operable to estimate said first state of said corresponding wheel on the basis of said first state of at least one other wheel of said plurality of wheels, for obtaining the estimated information representative of the estimated first state.

25. A wheel-state obtaining apparatus according to claim 24, wherein said first-wheel-state detecting device is provided for each of at least two wheels of said plurality of wheels, and said vehicle-state detecting device includes a second-wheel-state detecting device operable to detect a second state of each of said at least two wheels, which second state is different from said first state, said other-wheel-dependent estimating portion obtaining said estimated information of one of two wheels of said plurality of wheels, by estimating said first state of said one of said two wheels, on the basis of said second state of said two wheels detected by said second-wheel-state detecting device, and said first state of the other of said two wheels detected by said first-wheel-state detecting device.

26. A wheel-state obtaining apparatus according to claim 1, wherein said vehicle-state detecting device includes a second-wheel-state detecting device operable to detect a second state of each of at least one of said plurality of wheels, said at least one of said plurality of wheels including another wheel different from said corresponding wheel, said second state being different from said first state, and wherein said estimated-information obtaining device includes a relation-dependent estimated-information obtaining portion operable to estimate said first state of said corresponding wheel to obtain said estimated information representative of the estimated first state of said corresponding wheel, on the basis of at least said second state of said another wheel detected by said second-wheel-state detecting device, and on the basis of a predetermined relationship between the second states of said corresponding wheel and said another wheel.

27. A wheel-state obtaining apparatus according to claim 1, wherein said vehicle-state detecting device includes a second-wheel-state detecting device operable to detect a quantity of a second state of each of at least two wheels of said plurality of wheels, said at least two wheels including said corresponding wheel, said second state being different from said first state, and wherein said estimated-information obtaining device includes an estimated-information obtaining portion operable to estimate said first state of said corresponding wheel to obtain said estimated information representative of the estimated first state of said corresponding wheel, on the basis of at least a relationship between the quantity of said second state of said corresponding wheel detected by said second-wheel-state detecting device, and an average of the quantities of said second states of said at least two wheels detected by said second-wheel-state detecting device.

28. A wheel-state obtaining apparatus according to claim 1, wherein said vehicle-state detecting device includes a second-wheel-state detecting device operable to detect a second state of said corresponding wheel, said second state being different from said first state, and said estimated-information obtaining device includes (a) a first-estimated-information obtaining portion operable to estimate said first state of said corresponding wheel on the basis of said first state of at least one other wheel of said plurality of wheels, to obtain first estimated information, and (b) a second-estimated-information obtaining portion operable to estimate said first state of said corresponding wheel on the basis of said second state of said corresponding wheel, to obtain second estimated information, and wherein said determining device includes a selecting portion operable to select one of said first estimated information and said second estimated information, when said determining device determines said estimated information as said wheel-state information.

29. A wheel-state obtaining apparatus according to claim 1, wherein said determining device includes (a) a vehicle-state detecting portion operable to detect a state of the vehicle, and (b) a vehicle-state-dependent determining portion operable to determine one of said detected information and said estimated information as said wheel-state information, on the basis of the state of the vehicle detected by said vehicle-state detecting portion.

30. A wheel-state obtaining apparatus according to claim 29, wherein said vehicle-state detecting portion includes a vehicle-running-state detecting device operable to detect a running state of the vehicle, and said vehicle-state-dependent determining portion includes a vehicle-running-state-dependent determining portion operable to determine one of said detected information and said estimated information as said wheel-state information, on the basis of the running state of the vehicle detected by said vehicle-running-state detecting portion.

31. A wheel-state obtaining apparatus according to claim 1, wherein said determining device includes (a) a roadway-surface detecting portion operable to detect a condition of a roadway surface on which the vehicle is running, and (b) a roadway-condition-dependent determining portion operable to determine one of said detected information and said estimated information as said wheel-state information, on the basis of the condition of said roadway surface detected by said roadway-surface detecting portion.

32. A wheel-state obtaining apparatus according to claim 1, wherein said determining device further includes a third determining portion operable to determine said estimated information as said wheel-state information, when a state of change of said estimated information as obtained by said estimated-information obtaining device is smaller than a predetermined state.

33. A wheel-state obtaining apparatus according to claim 1, wherein said determining device includes an independently determining portion operable to determine one of said detected information and said estimated information as said wheel-state information representative of said first state of each of said plurality of wheels, such that said detected information is selected as said wheel-state information of at least one of said plurality of wheels, while said estimated information is selected as said wheel-state information of the other of said plurality of wheels.

34. A wheel-state obtaining apparatus according to claim 1, wherein said first-wheel-state detecting device includes at least one of (a) an air-pressure-state detecting device operable to detect a state of an air pressure in a tire of said corresponding wheel, (b) a temperature-state detecting device operable to detect a state of a temperature of said tire, (c) a force-state detecting device operable to detect a state of forces acting on said corresponding wheel, and (d) a rotation-state detecting device operable to detect a state of rotation of said corresponding wheel.

35. A wheel-state obtaining apparatus according to claim 1, wherein said first-wheel-state detecting device includes an air-pressure-state detecting device operable to detect a state of an air pressure in a tire of each of at least one of said plurality of wheels, and said vehicle-state detecting device includes a speed detecting device operable to detect a rotating speed of each of at least one of said plurality of wheels, said estimated-information obtaining device including an estimated-air-pressure-information obtaining portion operable to estimate the air pressure of each of said at least one of the plurality of wheels on the basis of the rotating speed detected by said speed detecting device, to obtain estimated-air-pressure information representative of the estimated air pressure.

36. A wheel-state obtaining apparatus according to claim 1, wherein said first-wheel-state detecting device includes a temperature-state detecting device operable to detect a state of a temperature of a tire of each of at least one of said plurality of wheels, and said vehicle-state detecting device includes a running-time/distance detecting device operable to detect at least one of a cumulative running time and a cumulative running distance of the vehicle, said estimated-information obtaining device including an estimated-temperature-state-information obtaining portion operable to estimate the state of the temperature of the tire of each of said at least one of the plurality of wheels, on the basis of at least one of said cumulative running time and distance detected by said running-time/distance detecting device, to obtain estimated-temperature-state information representative of the estimated state of the temperature.

37. A wheel-state obtaining apparatus according to claim 1, wherein said first-wheel-state detecting device includes a temperature-state detecting device operable to detect a state of a temperature of a tire of each of at least one of said plurality of wheels, and said vehicle-state detecting device includes (a) a load detecting device operable to detect a load acting on each of said at least one of the plurality of wheels, (b) a running-state detecting device operable to detect a running state of the vehicle, and (c) an ambient-temperature detecting device operable to detect an ambient temperature of the vehicle, said estimated-information obtaining device including an estimated-temperature-state-information obtaining portion operable to estimate the state of the temperature of the tire of each of said at least one of the plurality of wheels, on the basis of the detected load acting on said each wheel and the detected ambient temperature and running state of the vehicle, to obtain estimated-temperature-state information representative of the estimated state of the temperature.

38. A wheel-state obtaining apparatus according to claim 1, wherein said first-wheel-state detecting device includes a force-detecting device operable to detect at least one force acting on each of said at least one of said plurality of wheels, and said vehicle-state detecting device includes at least one of (a) a driving-state detecting device operable to detect a driving state of the vehicle, (b) a braking-state detecting device operable to detect a braking state of the vehicle, and (c) a turning-state detecting device operable to detect a turning state of the vehicle, said estimated-information obtaining device including an estimated-force-information obtaining portion operable to estimate said at least one force acting on each of said at least one of the plurality of wheels on the basis of at least one of the detected accelerating, braking and turning states of the vehicle, to obtain estimated-force information representative of the estimated at least one force.

39. A vehicle-state indicating apparatus comprising:
a wheel-state obtaining apparatus as defined in claim 1;
a judging device operable to determine whether said first state of said corresponding wheel is normal or not; and
an indicator device operable, when said judging device determines that said first state of said corresponding wheel is not normal, to provide an indication that said first state is not normal.

40. A vehicle-state control apparatus comprising:
a wheel-state obtaining apparatus as defined in claim 1;
an actuator portion operable to control a state of the vehicle; and
an actuator control portion operable to control said actuator portion on the basis of said first state of said corresponding wheel obtained by said wheel-state obtaining apparatus.

41. A wheel-state control apparatus comprising:
a wheel-state obtaining apparatus as defined in claim 1;
an actuator portion operable to control said first state of said corresponding wheel; and
an actuator control portion operable to control said actuator portion such that said first state of said corresponding wheel obtained by said wheel-state obtaining apparatus is held within a predetermined range.

42. A wheel-state obtaining device according to claim 1, wherein said estimated-information obtaining device obtains said estimated information at at least two points of time during said period.

43. A wheel-state obtaining apparatus comprising:
a wheel-side device provided for each of at least one of a plurality of wheels of a vehicle and including (a) a first-wheel-state detecting device operable to detect a first state of the corresponding wheel, and (b) a wheel-side-information transmitting device operable to transmit, in a wireless fashion at a time interval, wheel-side information representative of said first state of said corresponding wheel detected by said first-wheel-state detecting device; and
a body-side device disposed on a body of the vehicle and including (c) a receiving device operable to receive said wheel-side information transmitted from said wheel-side device, (d) a detected-information obtaining device operable to obtain received-information representative of the first state of said corresponding wheel, from said wheel-side information received by said receiving device, (e) a vehicle-state detecting device operable to detect a state of the vehicle, (f) an estimated-information obtaining device operable to estimate said first state of said corresponding wheel, on the basis of at least the state of the vehicle detected by said vehicle-state detecting device, and obtain estimated information representative of the estimated first state, and (g) an obtaining-device selecting portion operable to select one of said estimated-information obtaining device and said detected- information obtaining device,
and wherein said estimated-information obtaining device is operable to obtain said estimated information, during a period between of a moment of last reception of said wheel-side information by said body-side device, and a moment which is said timer interval after said moment of last reception, said obtaining-device selecting portion being operable to select said estimated- information obtaining device during said period.

44. A wheel-state obtaining device according to claim 43, wherein said estimated-information obtaining device obtains said estimated information at at least two points of time during said period.

45. A vehicle-state obtaining apparatus comprising:
a remote detecting device including a first detecting device, and a transmitting device operable to transmit, in a wireless fashion at a time interval, first-detecting-device information including information indicative of an output of said first detecting device; and
an information processing device including (a) a remote-information obtaining device including a receiving device operable to receive said first-detecting-device information transmitted in a wireless fashion from said remote detecting device, said remote-information obtaining device being operable to obtain remote information representative of a state of the vehicle, on the basis of said first-detecting-device information received by said receiving device, (b) a wire-transmission-dependent-information obtaining device including a second detecting device and operable to obtain wire-transmission-dependent information representative of said state of the vehicle, on the basis of second-detecting-device information which has been transmitted from said second detecting device through a signal line and which includes information indicative of an output of said second detecting device, and (c) an information determining device operable to determine one of said wire-transmission-dependent information and said remote information, as vehicle-state information representative of said state of the vehicle,
and wherein said wire-transmission-dependent-information obtaining device is operable to obtain said wire-transmission-dependent information, during a period between a moment of last reception of said first-detecting-device information by said remote-information receiving device, and a moment which is said time interval after said moment of last reception, said information determining device being operable to determine, as said vehicle-state information, said wire-transmission-dependent information obtained during said period.

46. A vehicle-state obtaining apparatus according to claim 45, wherein said first detecting device is operable to detect one state of said vehicle as said state of the vehicle, while said second detecting device is operable to detect another state of the vehicle which is different from said one state, and said wire-transmission-dependent-information obtaining device includes an estimating portion operable to estimate said one state of the vehicle on the basis of said another state of the vehicle detected by said second detecting device.

47. A vehicle state obtaining apparatus according to claim 45, wherein said remote detecting device is provided on a sprung member of the vehicle, while said information processing device is provided on an unsprung member of the vehicle.

48. A vehicle-state obtaining apparatus according to claim 45, wherein said remote detecting device is provided on a wheel of the vehicle.

49. A vehicle-state obtaining apparatus according to claim 45, wherein said information determining device is operable to determine said wire-transmission-dependent information as said vehicle-state information, when said remote information has not been received by said remote-information obtaining device.

50. A wheel-state obtaining device according to claim 45, wherein said wire-transmission-dependent-information obtaining device obtains said wire-transmission- dependent information at at least two points of time during said period.

* * * * *